(12) United States Patent
Harutyunyan et al.

(10) Patent No.: US 12,381,275 B2
(45) Date of Patent: Aug. 5, 2025

(54) STRETCHABLE AND FLEXIBLE LITHIUM ION BATTERY

(71) Applicant: HONDA MOTOR CO., LTD., Tokyo (JP)

(72) Inventors: Avetik R. Harutyunyan, Santa Clara, CA (US); Oleg A. Kuznetsov, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 693 days.

(21) Appl. No.: 17/532,464

(22) Filed: Nov. 22, 2021

(65) Prior Publication Data

US 2022/0085441 A1    Mar. 17, 2022

Related U.S. Application Data

(63) Continuation of application No. PCT/US2020/043017, filed on Jul. 22, 2020, which is
(Continued)

(51) Int. Cl.
*H01M 50/105* (2021.01)
*H01M 10/0525* (2010.01)
(Continued)

(52) U.S. Cl.
CPC ..... *H01M 50/105* (2021.01); *H01M 10/0525* (2013.01); *H01M 10/0585* (2013.01);
(Continued)

(58) Field of Classification Search
CPC ............ H01M 50/121; H01M 50/211; H01M 50/105; H01M 50/538; H01M 50/54;
(Continued)

(56) References Cited

U.S. PATENT DOCUMENTS 3,513,034 A    5/1970   Fischbach et al.
3,772,084 A    11/1973  Scholle
(Continued)

FOREIGN PATENT DOCUMENTS

CN    1922347 A    2/2007
CN    1972739 A    5/2007
(Continued)

OTHER PUBLICATIONS

Xu et al., "Stretchable batteries with self-similar serpentine interconnects and integrated wireless recharging systems", Nature Communications, pp. 1-8 (Year: 2013).*
(Continued)

*Primary Examiner* — Allison Bourke
*Assistant Examiner* — Robert Gene West
(74) *Attorney, Agent, or Firm* — ArentFox Schiff LLP; Mark Duell

(57) ABSTRACT

The present disclosure relates to stretchable and flexible lithium ion batteries that can store high energy density. The stretchable and flexible lithium ion battery can comprise flexible battery pouch cells connected in a serial, parallel, flat, or 3D configuration by, for example, stretchable, flexible, twistable, and durable material, which may include stretchable and flexible conductive connections.

24 Claims, 38 Drawing Sheets

Related U.S. Application Data a continuation-in-part of application No. 16/777,629, filed on Jan. 30, 2020, now abandoned, which is a continuation-in-part of application No. 16/560,747, filed on Sep. 4, 2019.

(60) Provisional application No. 62/895,831, filed on Sep. 4, 2019, provisional application No. 62/877,165, filed on Jul. 22, 2019, provisional application No. 62/798,938, filed on Jan. 30, 2019.

(51) Int. Cl.
    *H01M 10/0585*     (2010.01)
    *H01M 50/121*      (2021.01)
    *H01M 50/136*      (2021.01)
    *H01M 50/211*      (2021.01)
    *H01M 50/238*      (2021.01)
    *H01M 50/538*      (2021.01)
    *H01M 50/54*       (2021.01)

(52) U.S. Cl.
    CPC ....... *H01M 50/121* (2021.01); *H01M 50/136* (2021.01); *H01M 50/211* (2021.01); *H01M 50/238* (2021.01); *H01M 50/538* (2021.01); *H01M 50/54* (2021.01)

(58) Field of Classification Search
    CPC ............ H01M 50/136; H01M 50/238; H01M 10/0525; H01M 10/0585
    USPC ......................................................... 429/163
    See application file for complete search history.

(56) References Cited

U.S. PATENT DOCUMENTS

| | | |
|---|---|---|
| 4,119,771 A | 10/1978 | Saridakis |
| 5,985,175 A | 11/1999 | Fan et al. |
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,658,651 B2 | 5/2020 | Pierce et al. |
| 10,957,939 B2 | 3/2021 | Zhi et al. |
| 2001/0033962 A1 | 10/2001 | Suzuki |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0213954 A1* | 10/2004 | Bourdelais ............ H05K 3/107 428/119 |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1 | 7/2005 | Reiter et al. |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0228289 A1 | 10/2006 | Harutyunyan et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2009/0317710 A1 | 12/2009 | Douglas et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0178543 A1 | 7/2010 | Gruner et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0096465 A1 | 4/2011 | Zhou et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0174519 A1 | 7/2011 | Shah et al. |
| 2011/0177393 A1 | 7/2011 | Park et al. |
| 2011/0281156 A1 | 11/2011 | Boren et al. |
| 2011/0311874 A1 | 12/2011 | Zhou et al. |
| 2012/0034516 A1 | 2/2012 | Koo et al. |
| 2012/0105370 A1 | 5/2012 | Moore |
| 2012/0107683 A1 | 5/2012 | Kim et al. |
| 2012/0121986 A1 | 5/2012 | Balu et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hocke et al. |
| 2012/0156034 A1 | 6/2012 | Sabannavar et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0295161 A1 | 11/2012 | Wang et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |

(56) References Cited

U.S. PATENT DOCUMENTS

| | | |
|---|---|---|
| 2013/0089790 A1* | 4/2013 | Byon .................... H01G 11/50 361/503 |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |
| 2013/0323583 A1 | 12/2013 | Phares |
| 2014/0005960 A1 | 1/2014 | Anderson et al. |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0093769 A1 | 4/2014 | Busnaina et al. |
| 2014/0141248 A1 | 5/2014 | Noyes |
| 2014/0170490 A1 | 6/2014 | Izuhara et al. |
| 2014/0178543 A1 | 6/2014 | Russell et al. |
| 2014/0255782 A1 | 9/2014 | Jabbour et al. |
| 2014/0287304 A1 | 9/2014 | Netz |
| 2014/0326181 A1 | 11/2014 | Kim |
| 2014/0342209 A1* | 11/2014 | He ...................... H01M 10/056 429/101 |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0261818 A1 | 9/2018 | Roumi |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2019/0288332 A1* | 9/2019 | Hotta ................. H01M 10/0565 |
| 2019/0393486 A1 | 12/2019 | He et al. |
| 2020/0006772 A1 | 1/2020 | Yu et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 101627494 A | 1/2010 |
| CN | 101801394 A | 8/2010 |
| CN | 101809790 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 102856579 A | 1/2013 |
| CN | 102945947 A | 2/2013 |
| CN | 103187573 A | 7/2013 |
| CN | 103187574 A | 7/2013 |
| CN | 103187575 A | 7/2013 |
| CN | 103204492 A | 7/2013 |
| CN | 102674316 B | 5/2014 |
| CN | 104064725 A | 9/2014 |
| CN | 204072059 U | 1/2015 |
| CN | 104752651 A | 7/2015 |
| CN | 103219467 B | 11/2015 |
| CN | 103715394 B | 1/2016 |
| CN | 105513823 A | 4/2016 |
| CN | 105765764 A | 7/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 106602012 A | 4/2017 |
| CN | 104362326 B | 8/2017 |
| CN | 107004827 A | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 109326765 A | 2/2019 |
| CN | 109509866 A | 3/2019 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |

(56) References Cited

FOREIGN PATENT DOCUMENTS

| | | |
|---|---|---|
| JP | 2008-305608 A | 12/2008 |
| JP | 2009-091604 A | 4/2009 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015138777 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-2009-0125681 A | 12/2009 |
| KR | 10-2010-0120298 A | 11/2010 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| TW | 201140915 A | 11/2011 |
| WO | WO 2005/052053 A1 | 6/2005 |
| WO | WO 2005/096089 A1 | 10/2005 |
| WO | WO 2011/030821 A1 | 3/2011 |
| WO | WO 2012/156297 A2 | 11/2012 |
| WO | WO 2013/052704 A1 | 4/2013 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WO 2016/178210 A1 | 11/2016 |
| WO | WO 2017/052248 A1 | 3/2017 |
| WO | WO 2017/083566 A1 | 5/2017 |
| WO | WO 2017/120391 A1 | 7/2017 |
| WO | WO 2017/131451 A1 | 8/2017 |
| WO | WO-2017/199884 A1 | 11/2017 |
| WO | 2018110776 A1 | 6/2018 |
| WO | WO 2018/110933 A1 | 6/2018 |
| WO | WO 2018/194414 A1 | 10/2018 |
| WO | WO 2018/194415 A1 | 10/2018 |
| WO | WO 2019/027147 A1 | 2/2019 |

OTHER PUBLICATIONS

Office Action dated Jun. 28, 2022, issued by the Korean Patent Office in Korean Application No. 10-2022-0057879.
Ye, Huating, et al., "A true cable assembly with a carbon nanotube sheath and nickel wire core: a fully flexible electrode integrating energy storage and electrical conduction", Journal of Materials Chemistry A 2018; 6: pp. 1109-1118, The Royal Society of Chemistry, (2018).
Communication dated Feb. 28, 2023 from the Japanese Patent Office in application No. 2021-509213.
Communication dated May 6, 2022, from the State Intellectual Property Office of People's Republic of China in Chinese Application No. 201710150360.3.
Shan Jiang et al., "Series in Science Communication by Chinese Academy of Sciences: Nanometer", Popular Science Press, pp. 155-157, Sep. 2013.(Cited in CN Application No. 201710150360.3, dated May 6, 2022).
Yurong Liu, "Applications of Carbon Materials in Supercapacitor", National Defense Industry Press,(p. 142, 2 pages total) , Jan. 2013.(Cited in CN Application No. 201710150360.3, dated May 6, 2022).
Communication dated Mar. 22, 2022, from the State Intellectual Property Office of People's Republic of China in Application No. 201811076414.7.
Office Action in CN201980058530.2, mailed Dec. 28, 2023, 23 pages.
Office Action in CN202080051895.5, mailed Dec. 27, 2023, 24 pages.
Office Action in KR20180088457, mailed Jan. 15, 2024, (16 pages Total).
Office Action in CN202010002766.9, mailed Jun. 1, 2023, 19 pages.
Communication dated Oct. 19, 2022, from the State Intellectual Property Office of People's Republic of China in Application No. 201811076414.7.
Communication dated Mar. 22, 2022, from the Japanese Patent Office in application No. 2018-142355.
Ying Shi et al., "Graphene-based integrated electrodes for flexible lithium ion batteries", 2D Materials 2 (2015): 024004. (Year: 2015), (9 Pages Total).
Fenghua Su et al., "High-Performance Two-Ply Yarn Supercapacitors Based on Carbon Nanotube Yarns Dotted with CO3O4 and NiO Nanoparticles", Small 2015, 11, No. 7, pp. 854-861 with Supporting Information(12 Pages Total), www.small-journal.com, (Year: 2015).
Communication dated Nov. 11, 2022, from the Chinese Patent Office in Chinese Application No. 202010079226.0.
Cha, Seung I., et al., "Mechanical and electrical properties of cross-linked carbon nanotubes." Carbon 46.3 (2008): pp. 482-488 (Year: 2008).
Communication dated Oct. 9, 2022, from the Chinese Patent Office in Chinese Application No. 202010002766.9.
Communication dated Feb. 23, 2022, from the State Intellectual Property Office of People's Republic of China in Application No. 202010079226.0.
First Office Action dated Aug. 25, 2022, from the State Intellectual Property Office of People's Republic of China in Application No. 201810503719.5.
Ling-ling Gu et al., "Preparation and Applications of Carbon Nanotube/ Polymer Composites" Polymer Materials Science and Engineering, vol. 25 , No. 11, (Nov. 2009), (5 Pages Total, abstract on p. 5).
Mallakpour et al., "Carbon nanotube-metal oxide nanocomposites: Fabrication, properties and applications," Chemical Engineering Journal, Oct. 2016, vol. 302, pp. 344-367.
Shah et al., "A layered Carbon Nanotube Architecture for High Power Lithium Ion Batteries," Journal of the Electrochemical Society, May 2014, vol. 161, No. 6, pp. A989-A995.
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A.J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in related European Application No. 18194454.7.
Danafar, F. et al., "Fluidized bed catalytic chemical vapor deposition synthesis of carbon nanotubes—A review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in related European Application No. 18184002.6 dated Nov. 30, 2018.

(56) References Cited

OTHER PUBLICATIONS

Extended European Search Report issued in related European Patent Application No. 18194469.5 dated Dec. 4, 2018.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
International Search Report and Written Opinion, issued by International Searching Authority in related International Application No. PCT/US19/49923, mailed on Jan. 23, 2020.
Jenax Inc., Flexible Lithium Polymer Battery J . Flex, Copyright 2014, (6 Pages Total).
Joo-Seong Kim et al., Supporting Information, A Half Millimeter Thick Coplanar Flexible Battery with Wireless Recharging Capability, Nano Letters 2015 15 (4), 9 Pages Total, (2015).
Kim et al., "A Half Millimeter Thick Coplanar Flexible Battery with Wireless Recharging Capability", Nano Letters, American Chemical Society, 2015, (9 Pages Total).
Kun Kelvin Fu et al., "Flexible Batteries: From Mechanics to Devices", 2016 American Chemical Society, ACS Publications, ACS Energy Letters 1, pp. 1065-1079, (2016).
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sau Yen Chew et al., "Flexible free-standing carbon nanotube films for model lithium-ion batteries", Carbon 47, pp. 2976-2983, (2009).
Sebastian Anthony., LG produces the first flexible cable-type lithium-ion battery, Extreme Tech, Aug. 30, 2012, (9 Pages Total).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
The Extended European Search Report issued in related European Patent Application No. 18186402.6 dated Oct. 11, 2018.
The Swatch Group Ltd., A revolutionary battery by Belenos: The Watchmaker Swatch Group Has Signed An Agreement With The Chinese Geely Group For Use Of Its Innovative New Battery., as accessed on May 29, 2019, (3 Pages Total), https://www.swatchgroup.com/en/ swatch-group/innovation-powerhouse/industry-40/revolutionary-battery-belenos.
Vishwam Sankaran., Samsung is reportedly developing a curved battery for its foldable phone, Jul. 4, 2018, (4 Pages Total).
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Zhao, M.Q. et al., "Towards high purity graphene/single-walled carbon nanotube hybrids with improved electrochemical capacitive performance," Carbon, vol. 54, pp. 403-411, 2013.
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Aminy E. Ostfeld et al., "High-performance flexible energy storage and harvesting system for wearable electronics", www.nature.com/scientificreports Scientific Reports, 6:26122, DOI: 10.1038/srep26122, (2016), (10 Pages Total).
Communication dated Aug. 26, 2019, from the European Patent Office in related European Application No. 18186402.6.
Communication dated Dec. 22, 2020, from the Japanese Patent Office in related application No. 2020-002026.
Communication dated Feb. 4, 2020, from the European Patent Office in related European Application No. 18 173 644.8.
Communication dated Jan. 6, 2021, from the Japanese Patent Office in related application No. 2020-002545.
Communication dated Jul. 27, 2021, issued by the Korean Intellectual Property Office in related Korean Application No. 10-2020-0005929.
Communication dated Nov. 9, 2021, from the Japanese Patent Office in related application No. 2018-172178.
Communication dated Sep. 26, 2021, issued by the Korean Intellectual Property Office in related Korean Application No. 10-2018-0058433.
Communication issued by International Searching Authority in related International Application No. PCT/US19/49923, mailed on Nov. 13, 2019 (PCT/ISA/206).
David Schiller, "Development of a Stretchable Battery Pack for Wearable Applications", submitted by David Schiller, BSc., Johannes Kepler University Linz, Diss. Universit't Linz, Nov. 2019, 28 Pages Total, https://epub.jku.at/obvulihs/content/titleinfo/4605900/full.pdf.
Extended European Search Report issued in related European Patent Application No. 18173644.8 dated Oct. 12, 2018.
Extended Search Report of related EP Application No. 18 19 4454 dated Jul. 23, 2019.
International Search Report and Written Opinion, issued by International Searching Authority in related International Application No. PCT/US2020/020993, mailed on Jul. 2, 2020.
International Search Report and Written Opinion, issued by International Searching Authority in related International Application No. PCT/US2020/039821, mailed on Sep. 30, 2020.
International Search Report and Written Opinion, issued by International Searching Authority in related International Application No. PCT/US2020/043017, mailed on Dec. 14, 2020.
Notice of Reasons for Rejection dated Aug. 17, 2021, from the Japanese Patent Office in related application No. 2020-002545.
Notification of the First Office Action dated Jul. 16, 2021, from the State Intellectual Property Office of People's Republic of China in related Application No. 201710151455.7.
O.M. Marago, et al., "Optical trapping of carbon nanotubes", Physica E, 40 (2008), pp. 2347-2351.
Office Action issued by the European Patent Office in related European Patent Application No. 18184002.6, dated May 13, 2020.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).

(56) References Cited

OTHER PUBLICATIONS

Communication dated Jan. 27, 2022, from the State Intellectual Property Office of People's Republic of China in related Application No. 201710150360.3.

* cited by examiner

As prepared self standing material
(LiNMC+0.8wt% CNT)

After pressing (7ton)

Side view 1. and 2. Flexible battery
3. and 4. Electrodes of battery
5. Array of various sensors
6. Electronics
7. Processor
8. Antenna

STRETCHABLE AND FLEXIBLE LITHIUM ION BATTERY

CROSS REFERENCE TO RELATED APPLICATIONS

This application is a continuation of international application number PCT/US2020/043017, titled "STRETCHABLE AND FLEXIBLE LITHIUM ION BATTERY" filed Jul. 22, 2020, which claims priority to U.S. Provisional Application No. 62/895,825, filed Sep. 4, 2019, U.S. Provisional Application No. 62/895,831, filed Sep. 4, 2019, and U.S. Provisional Application No. 62/877,165, filed Jul. 22, 2019, and is a continuation-in-part of U.S. application Ser. No. 16/777,629, filed Jan. 30, 2020, which claims priority to U.S. Provisional Application No. 62/798,938, filed Jan. 30, 2019, U.S. Provisional Application No. 62/877,165, filed Jul. 22, 2019, and U.S. Provisional Application No. 62/895,831, filed Sep. 4, 2019, and is a continuation-in-part of U.S. patent application Ser. No. 16/560,747, filed Sep. 4, 2019, which claims priority to U.S. Provisional Application No. 62/798,938 filed Jan. 30, 2019. The disclosures of the above applications are all hereby incorporated by reference herein in their entirety.

BACKGROUND

Advances in flexible electronics have increased the development of smart wearable devices for healthcare, the internet of things, and more. Particularly, exploitation of low-dimensional materials shows promise for development of light, transparent, and flexible wearable intelligent systems that enhance human-machine relationships. However, these intelligent systems, consisting of sensing, processing, and acting components, impose very demanding energy requirements, primarily dictated by power consumption of embedded devices such as sensors, actuators, chips, and antennas.

Progress in wearable electronics may be related to the parallel development of flexible power devices such as flexible batteries. The latter should combine large energy density with a high tolerance for various types of mechanical forces. Although battery active material (e.g. Li metal) itself may possess high energy density (43.1 MJ/kg) the energy densities of corresponding primary and secondary batteries are in the range of 1.3-1.8 MJ/kg and 0.36-0.87 MJ/kg, respectively. These order of magnitude losses of the specific energy values are the result of the use of electrochemically inactive components that compose current battery architectures, such as metal-based current collectors, separators, electrolyte, binder, conductive additives, and packaging. Therefore, exclusion of any of these components could enhance the energy density of the battery. In addition to high energy density, batteries for wearable devices should be stretchable and flexible and tolerate reasonable mechanical stress arising because of everyday human activities, as well as being comfortable for wearing. Therefore, there is a growing need for high energy density, flexible, and stretchable wearable batteries.

SUMMARY

The present disclosure is directed to stretchable and flexible lithium ion batteries capable of storing high energy density. According to some aspects, the stretchable and flexible lithium ion batteries include one or more flexible battery pouch cells connected in a serial, parallel, flat, or 3D configuration by, for example, stretchable, flexible, foldable, compressible, twistable, and durable material, which can include stretchable, compressible, and flexible electrical connections between or among the flexible battery pouch cells. In some embodiments, the flexible battery pouch cells can be connected in custom configurations or shapes to form a stretchable and flexible lithium ion battery for various applications, for example, wearable applications, bendable, stretchable, foldable, durable, compressible, and twistable applications. According to some aspects, the flexible battery pouch cells include two or more flexible self-standing electrodes that can be current collector and binder free, that can be separated from each other either by a separator membrane (if a liquid electrolyte is used) or by solid (gel) electrolyte, and these elements are enclosed by a flexible material packaging. High energy density can be obtained from the lack of electrochemically inactive components, for example, and from the interconnected architecture of the flexible battery pouch cells to form the stretchable and flexible lithium ion battery. These aspects and other embodiments of the present disclosure are presented herein using various non-limiting examples directed to provide a stretchable and flexible lithium ion battery, methods of making, elements therein, devices including or embedded in the stretchable and flexible lithium ion battery, methods of use, and various applications.

DETAILED DESCRIPTION

The present disclosure is directed to stretchable and flexible lithium ion batteries capable of storing high energy density and associated aspects. In some embodiments, methods of making a stretchable and flexible lithium ion battery are disclosed. According to some aspects, a flexible battery pouch cell is disclosed, including flexible self-standing electrodes with electrolyte contained inside flexible material packaging and stretchable and flexible battery tabs extending from the flexible battery pouch cell. The stretchable and flexible battery tabs are conductive and can be connected to other flexible battery pouch cells in any variety of configurations to form a stretchable and flexible lithium ion battery in flat, 3D, or any variety of forms for applications large or small. The stretchable and flexible lithium ion battery is not limited and can include processors, various sensors, color indicators, embedded devices, global positioning system (GPS) devices, Wi-Fi, accessibility devices, display screens, LEDs, or audio devices as non-limiting examples. The stretchable and flexible lithium ion battery can be wearable, implantable, or can be configured for deployment in various environments. In some embodiments, the flexible material packaging of the flexible battery pouch cell can have components or processors imprinted into or embedded, for example, various miniature (microscale, nanoscale) components. The flexible material packaging, the stretchable flexible battery tabs, and the interconnecting flexible stretchable materials can be mechanically or electrically responsive, powered, mobile, twistable, compressible, wearable, implantable, biocompatible, waterproof, thermally insulating, able to hold a fixed shape after being formed to a fixed shape, have the ability to return from a deformed shape (temporary shape) to an original (permanent) shape induced by, for example, response to an environmental change or force applied.

Figure 1:
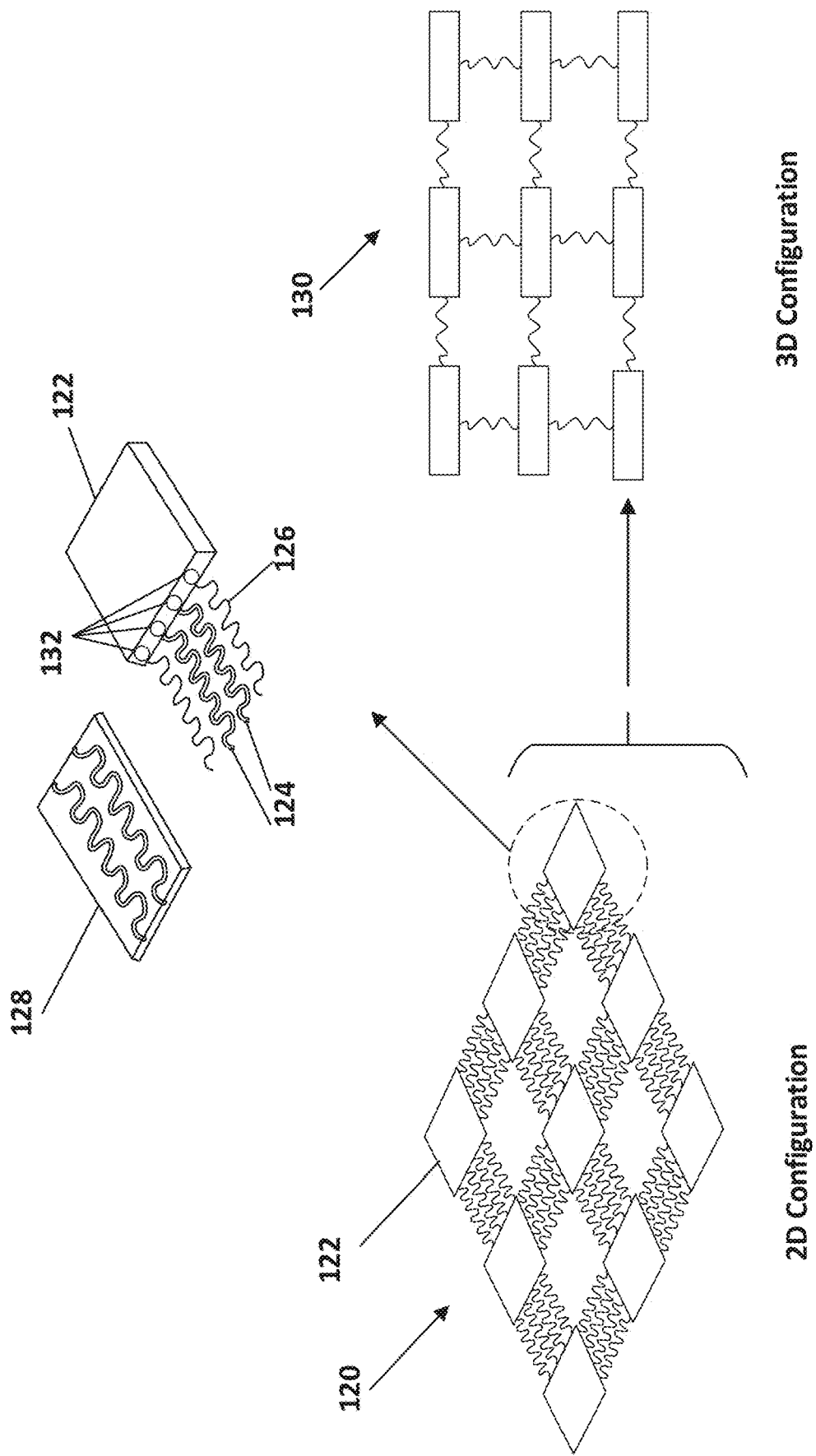
FIG. 1 is an illustration of stretchable, compressible, and flexible lithium ion batteries including flexible battery pouch cells in a 2D configuration and in a 3D configuration, with conductive and stretchable battery tabs shown connected to flexible battery pouch cells with, for example, surrounding springs or a stretchable polymer matrix, according to some embodiments of the present disclosure.

A non-limiting illustration of stretchable and flexible batteries 110 according to various embodiments of the present disclosure is shown in FIG. 1. A 2D configuration 120 includes, for example, nine flexible battery pouch cells 122 interconnected by conductive battery tabs 124 and springs 126. The 2D configuration is stretchable, compressible, and flexible. A stretchable configuration may allow elongation of 5% or more without breaking. A compressible configuration may allow compression of 5% or more. A flexible configuration may allow deflection of 5 degrees or more without breaking. Any suitable material (e.g. polymers, fabrics, elastics, rubbers) can be used in place of or surrounding the springs that are shown. As illustrated, the battery tabs may be located between pairs of the springs. In some embodiments, the battery tabs 124 can be surrounded by the springs 126 or a stretchable (e.g., polymer) matrix 128. In some embodiments, the stretchable and flexible battery tabs 124 can be made of spring metals, conductive composites, or any suitably conductive, stretchable, and flexible material. Optionally, the stretchable and flexible battery tabs 124 can be the sole connection between two or more flexible battery pouch cells. In some embodiments, the conductive battery tabs 124 can include stretchable and flexible battery tab attachments connected to the conductive battery tabs at joints 132, with the stretchable and flexible battery tab attachments extending from one flexible battery pouch cell to another. The number of flexible battery pouch cells included in one stretchable and flexible battery according to the present disclosure is not limited. A 3D configuration 130 illustrates, for example, that the battery tabs 124, interconnecting the flexible battery pouch cells 122, can extend from any side or surface of each flexible battery pouch cell. Springs and a stretchable polymer matrix are non-limiting examples of materials that, in some embodiments, can be utilized along with the interconnecting battery tabs.

Figure 2:
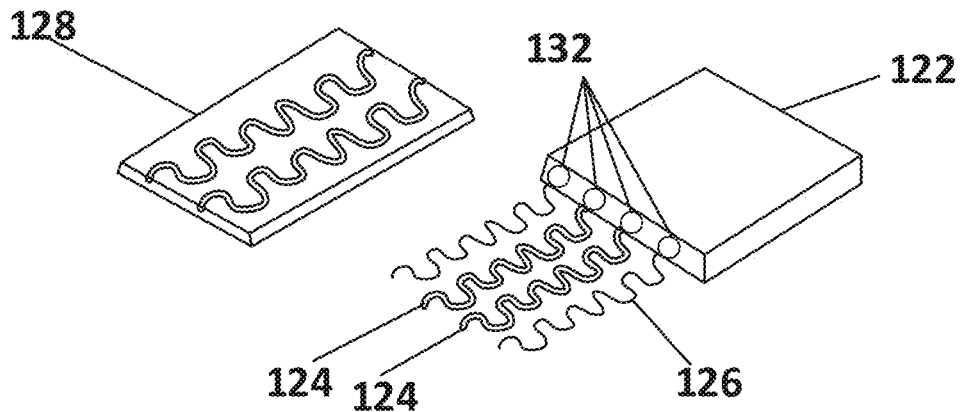
FIG. 2 is an illustration of a flexible battery pouch cell with optional joints to stretchable, flexible, compressible, conductive battery tabs illustrated with, for example, springs or a surrounding stretchable polymer matrix, according to some embodiments of the present disclosure.

In FIG. 2, the joints 132 illustrate optional junctions where the stretchable and flexible battery tabs 124 extend out from the internal battery electrodes, which are contained inside the flexible battery pouch cell. According to some aspects, the joints 132 can increase tolerance for high mechanical forces applied to stretchable and flexible lithium ion batteries while wearing, for example, and increase water resistance while washing. Depending on the location of each flexible battery pouch cell 122 within the architecture of the stretchable and flexible battery, the number of connections to other flexible battery pouch cells can vary. For example, in FIG. 3, a flexible battery pouch cell 300 with four pairs of battery tabs 322 extending from the flexible battery pouch cell 300 is shown as a non-limiting example. Each pair of battery tabs 322 may be surrounded by a pair of springs 324 or polymer stretchable materials. The number of (battery tab) connections extending from one flexible battery pouch cell can be one or more, depending on the location of the flexible battery pouch cell and the overall architecture of the stretchable and flexible battery.

Figure 3:
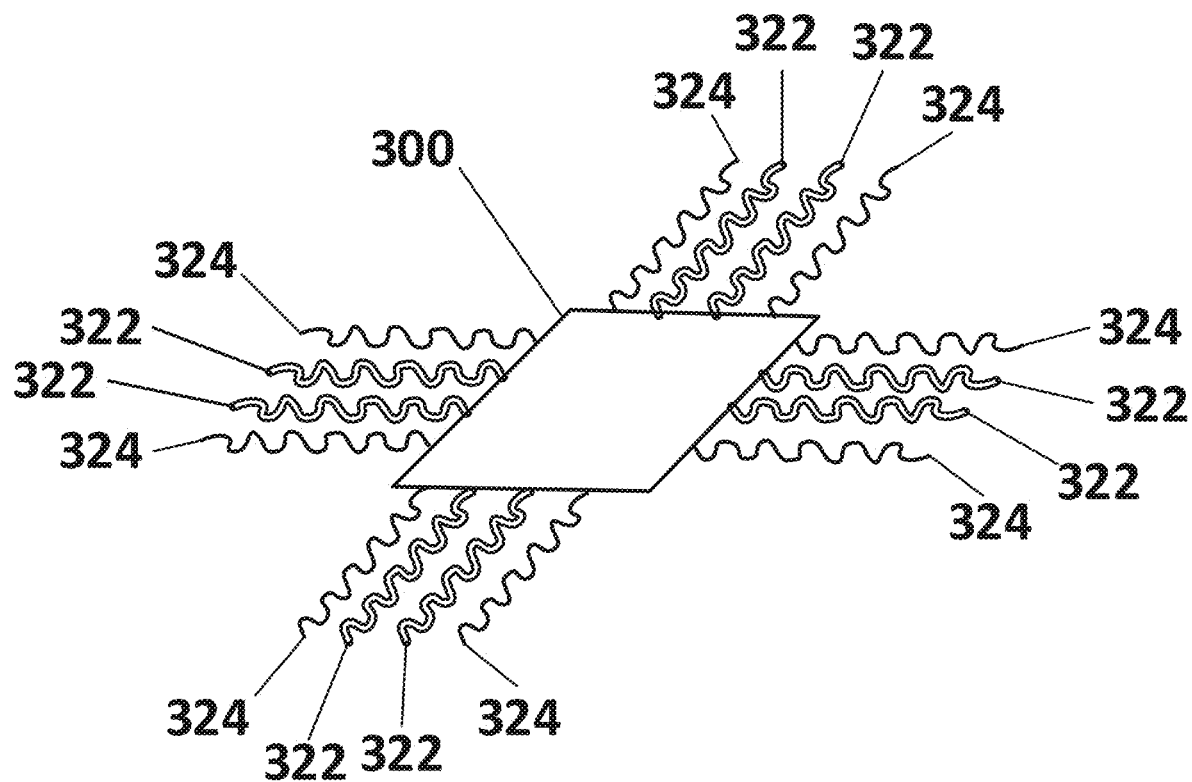
FIG. 3 is an illustration of a flexible battery pouch cell with battery tabs and stretchable (and compressible) material extending for connection to one or more other flexible battery pouch cells.
Figure 4:
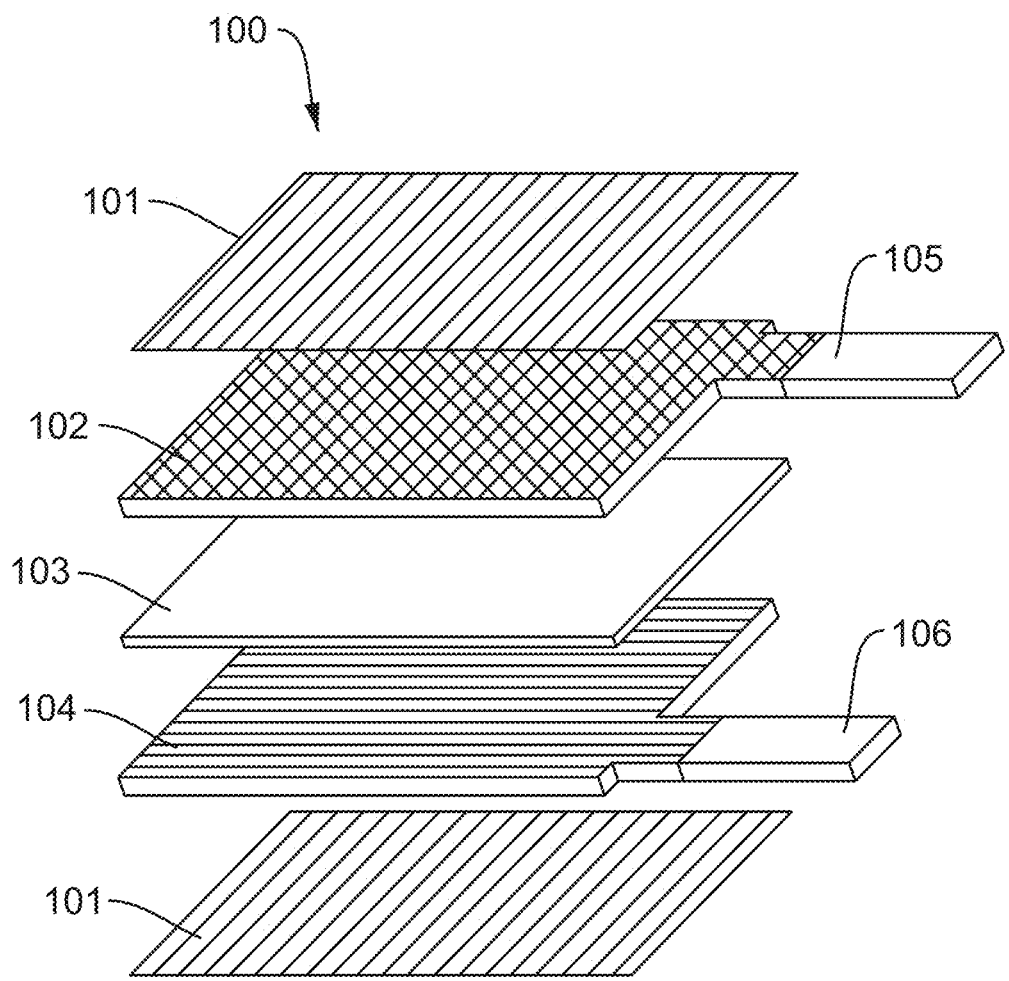
FIG. 4 is an expanded view of a flexible battery pouch cell showing a non-limiting example of the flexible self-standing electrodes contained therein and protruding stretchable and flexible battery tabs from the electrodes illustrated according to some embodiments of the present disclosure.

In a non-limiting example as shown in FIG. 4, a flexible battery pouch cell (unit, 100) is expanded to show a flexible material packaging 101 a flexible self-standing anode 102 including a conductive battery tab attached 105, which is optionally stretchable and flexible and which can have a stretchable and flexible battery tab attachment; a flexible self-standing cathode 104, including a conductive battery tab attached 106, which is optionally stretchable and flexible and which can have attached a stretchable and flexible battery tab attachment. The electrolyte 103 is illustrated between the anode and cathode, and a solid electrolyte can function as both an electrolyte and a separator between the anode and cathode, thus eliminating the need for a separator membrane that is an electrochemically inactive component (that does not function as an active electrolyte). It should be understood that in some embodiments, the battery tabs shown in FIG. 4 can be in any configuration and can be surrounded by (or be central to), for example, a stretchable polymer matrix or by springs as shown in FIGS. 1-3. In some embodiments, the conductive battery tabs shown in FIG. 4 are points of attachment for flexible battery tab attachments, which are attached to the battery tabs and extend further from the flexible self-standing electrode. The flexible material packaging may have joints (FIGS. 1-2) at points of contact with battery tabs or other flexible battery tab attachments. The joints can, for example, aid to seal the flexible material packaging, increase strength, support the flexible battery tab attachments, and increase durability of the stretchable and flexible lithium ion battery.

According to some aspects, methods of making flexible self-standing electrodes are disclosed (FIGS. 5-6), wherein a solid electrolyte with high ionic conductivity can be introduced either by, for example, coating (depositing), or immersing in the case of gel, (FIG. 7) on or into the surface of the corresponding flexible self-standing electrodes optionally followed by compressing two electrodes together. Optionally, each electrode can be pressed separately. The electrolyte can be introduced by any suitable means, for example, and can be added to the flexible battery pouch cell after assembly. Currently, there are different types of Li-ion solid electrolytes, for example, NASICON, garnet, perovskite, LISICON, LiPON, $Li_3N$, sulfide, argyrodite, or anti-perovskite. In some embodiments, a solid electrolyte can be shape conformable, flexible, and with high ionic conductivity. Polymer based thin (comparable with a thickness of a separator membrane, about 10 microns) electrolytes are feasible for this purpose. It should be understood that the flexible self-standing electrodes can be treated by various methods, and pressing is used herein as a non-limiting example of a mechanical treatment.

Figure 5:
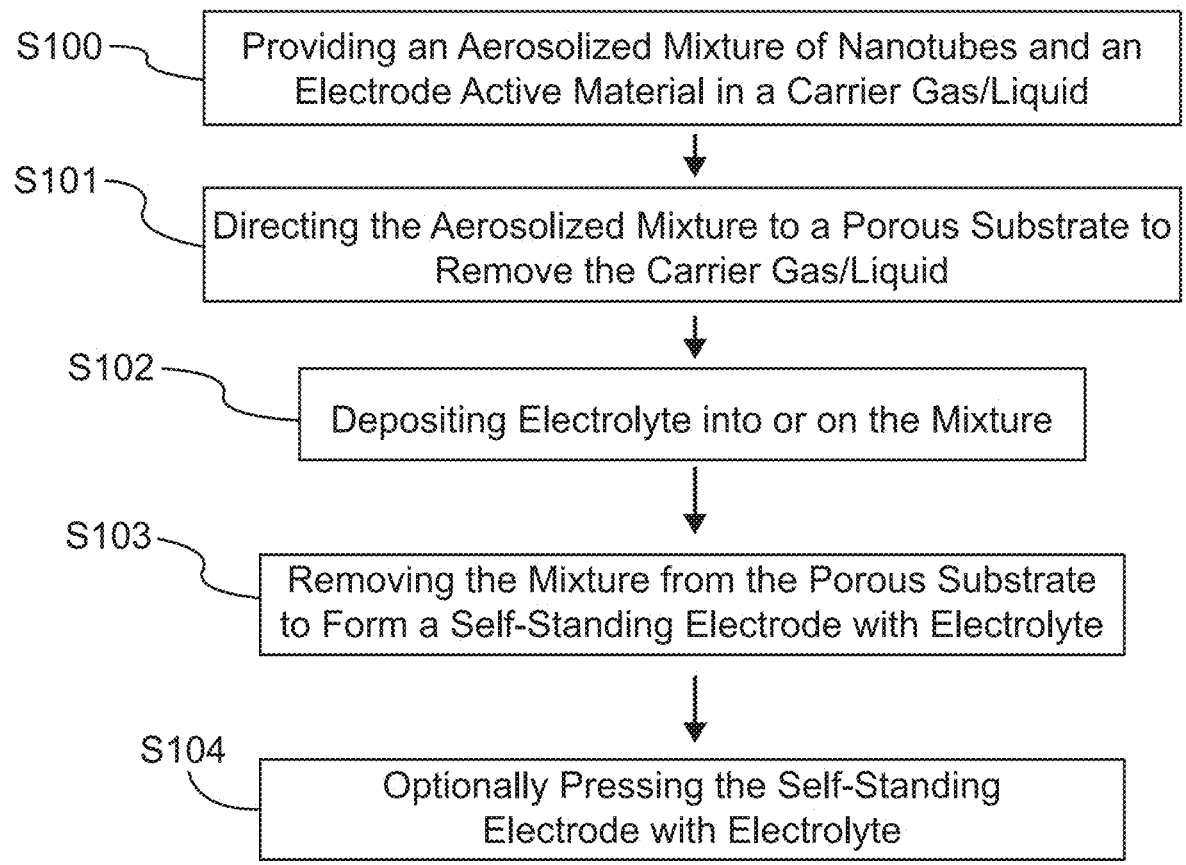
FIG. 5 is a flow diagram illustrating steps of a method for making a flexible self-standing electrode, wherein electrolyte is deposited into or on a mixture of nanotubes and electrode active material, according to some embodiments of the present disclosure.
Figure 11:
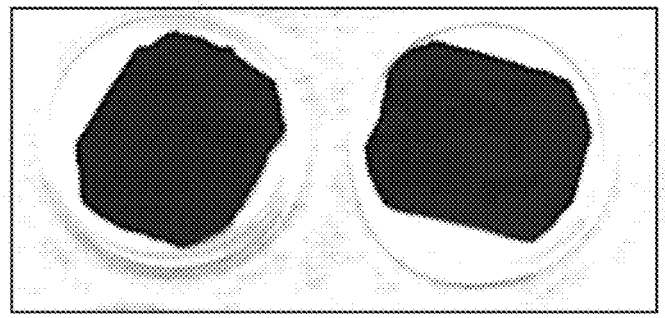
FIG. 11 shows flexible self-standing electrodes as collected from a porous surface or substrate.
Figure 12:
FIG. 12 shows flexible self-standing electrodes after treating (or pressing) to increase the density.
Figure 13:
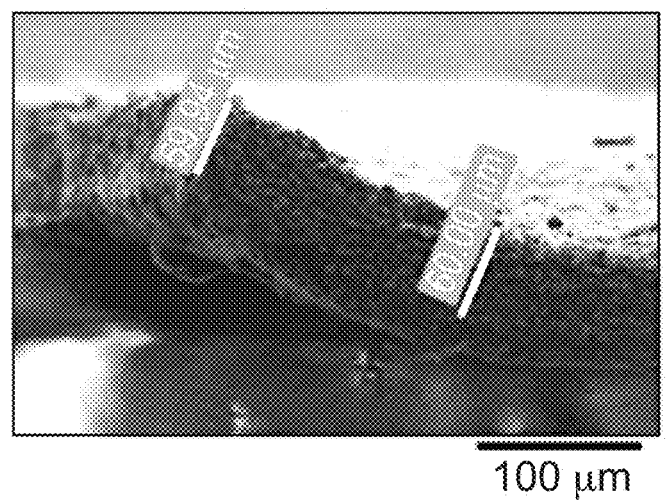
FIG. 13 is a magnified side view of a treated self-standing electrode with flexibility shown by an uplifted corner of the electrode.
Figure 14:
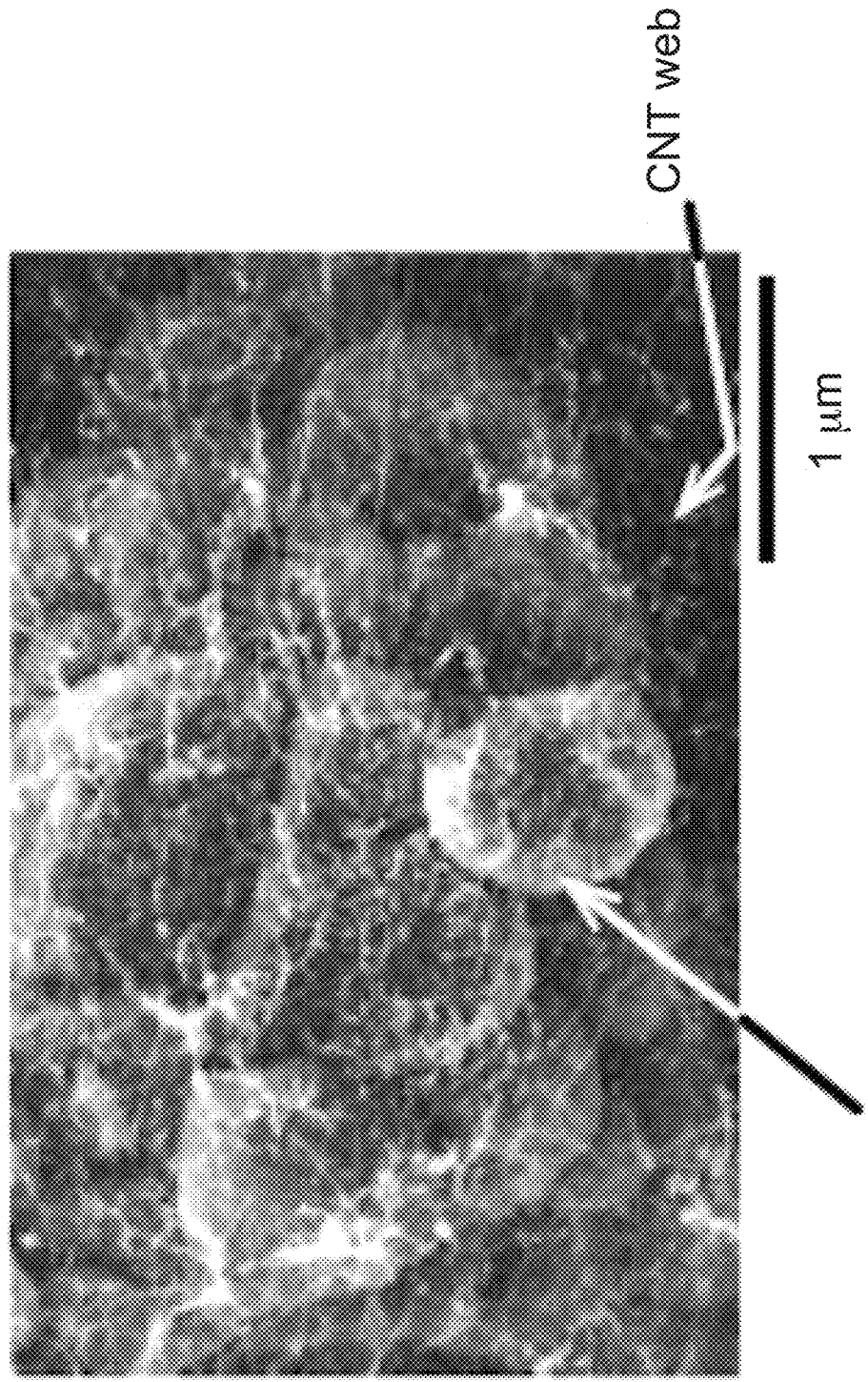
FIG. 14 is a magnified overhead view of the treated flexible self-standing electrode with a scale bar of 1 micron shown.

In a non-limiting example as shown in FIG. 5, self-standing electrodes for Li-ion batteries are prepared by providing an aerosolized (or fluidized/dispersed) mixture of carbon nanotubes and electrode active materials at step S100 and directing the aerosolized mixture to a porous substrate at step S101 to form a composite of self-standing electrode material of a desired thickness thereon that includes the mixed carbon nanotubes and the electrode active materials upon the porous substrate. Electrolyte is deposited, by any means, upon the composite at step S102. Optionally, electrolyte can be dispersed at step S100. The mixture is removed from the porous substrate at step S103, to form a flexible self-standing electrode with electrolyte (FIG. 11). Optionally, the self-standing electrode can be treated at step S104 to, for example, increase the density of the self-standing electrode (FIG. 12). The self-standing electrode is self-supported, flexible, and can optionally be cut to the desired dimensions and shapes of a battery electrode (FIG. 13). The self-standing electrode is optionally free of binder, optionally free of separator, and optionally can be used without a metal-based current collector (typically alumina or copper depending on the electrode type). As shown in FIG. 14, a magnified view of the flexible self-standing electrode (scale bar=1 micron), a carbon nanotube webbed morphology includes electrode active material and interconnected spaces for electrolyte, while the carbon nanotube web morphology enables various aspects, for example, flexibility of the self-standing electrode.

It should be understood that various embodiments of methods for production of flexible self-standing electrodes disclosed herein (e.g. FIGS. 5-6) do not significantly degrade the length or aspect ratio of the carbon nanotubes during formation of the flexible self-standing electrodes at least due to the non-destructive aerosolizing and deposition steps. The length and aspect ratio of the carbon nanotubes enable to carbon nanotubes to overlay in a webbed morphology during formation of the flexible self-standing electrode contributing to final flexibility and other aspects. As used herein, "significantly degrade the length or aspect ratio" means reducing the length or aspect ratio by 50% or more.

Figure 6:
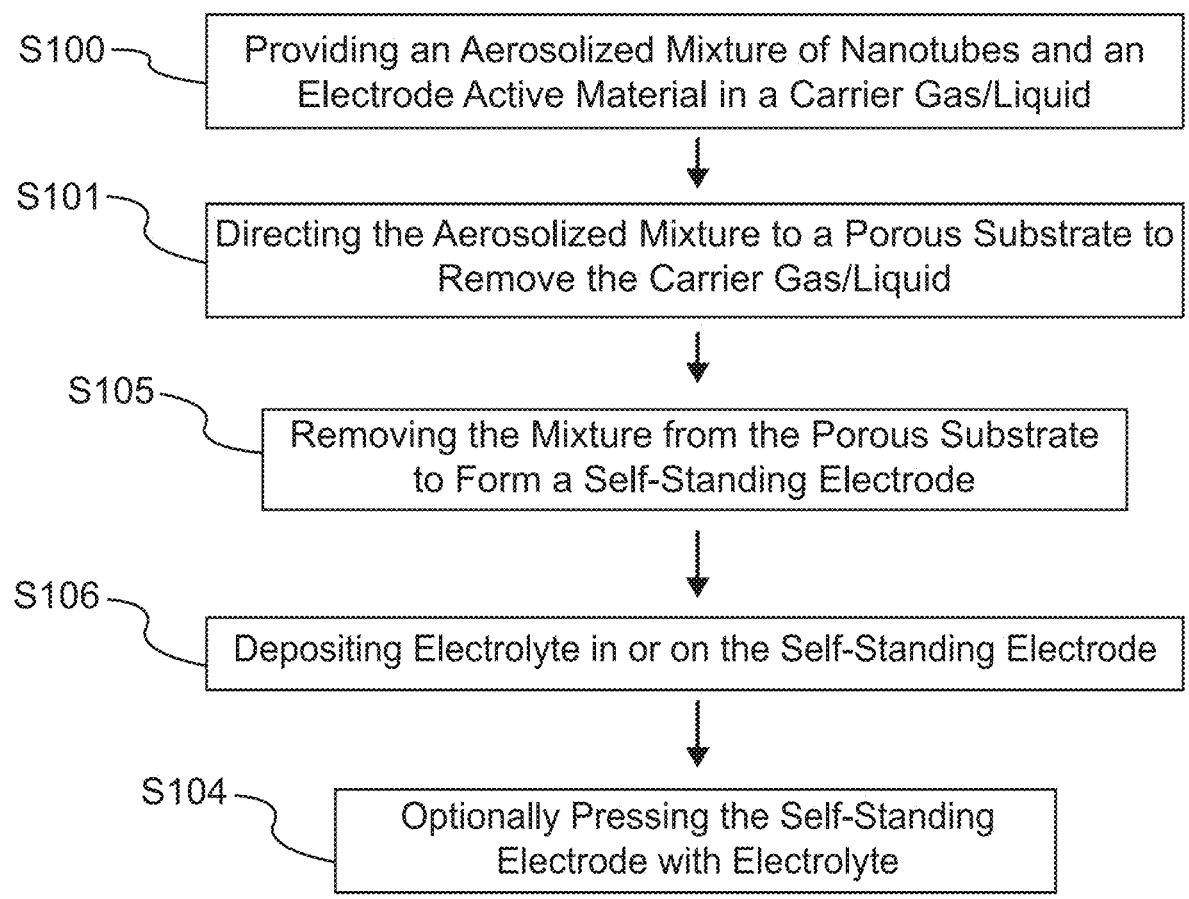
FIG. 6 is a flow diagram illustrating steps of a method for making a flexible self-standing electrode, wherein electrolyte is deposited in or on a flexible self-standing electrode, according to some embodiments of the present disclosure.

In a non-limiting example as shown in FIG. 6, self-standing electrodes for Li-ion batteries are prepared by providing an aerosolized mixture of carbon nanotubes and electrode active materials at step S100, and directing the aerosolized mixture to a porous substrate at step S101 to form a composite of self-standing electrode material of a desired thickness thereon that includes the mixed carbon nanotubes and the electrode active materials upon the porous substrate. The mixture is removed from the porous substrate at step S105, to form a flexible self-standing electrode. Electrolyte is deposited, by any means, upon or in the flexible self-standing electrode at step S106. Optionally, the self-standing electrode can be treated at step S104 to, for example, increase the density of the self-standing electrode. As shown in the non-limiting example of FIG. 7, immersion can be used to deposit electrolyte. In various embodiments, electrolyte can be introduced by any suitable method and at any stage of production. The self-standing electrode is self-supported, flexible, and can optionally be cut to the desired dimensions of a battery electrode. The self-standing electrode is optionally free of binder, optionally free of separator, and optionally can be used without a metal-based current collector (typically alumina or copper depending on the electrode type).

Figure 10:
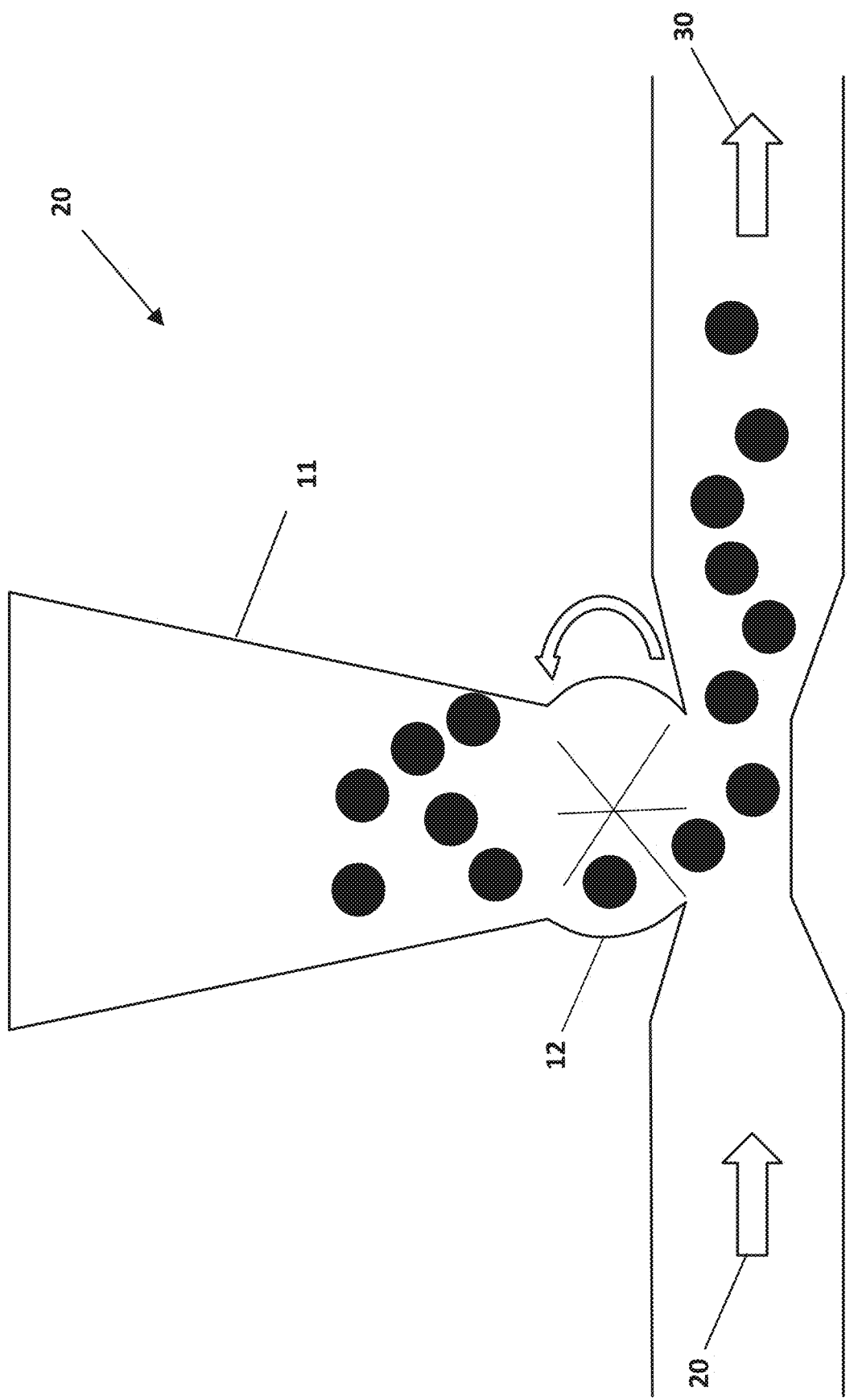
FIG. 10 is a schematic view illustrating a vessel that can be used for dispersion according to an embodiment of the present disclosure.

The apparatus for providing the aerosolized (or fluidized/dispersed) mixture of carbon nanotubes and electrode active materials, either separately or combined, with or without electrolyte, is not limited in any way. In an illustrative example as shown in FIG. 10, a vessel 10 may be a pneumatic powder feeder, such as a venturi feeder that includes a hopper 11 for receiving the nanotubes and the electrode active material therein. The vessel 10 may also include a rotary valve 12 that feeds the nanotubes and the electrode active material into contact with a carrier gas 20 that is introduced to the vessel 10 to form the mixed aerosolized stream 30. According to some aspects, more than one vessel 10 may be utilized to combine nanotubes and electrode active material (either separately or pre-combined) into various carrier gases or gas streams. In some embodiments, an electrolyte can be dispersed, aerosolized, or fluidized separately or with the nanotubes and electrode active material. In some embodiments, the nanotubes and the electrode active material can be individually aerosolized before mixing and combined with an electrolyte upon a porous substrate.

Figure 8:
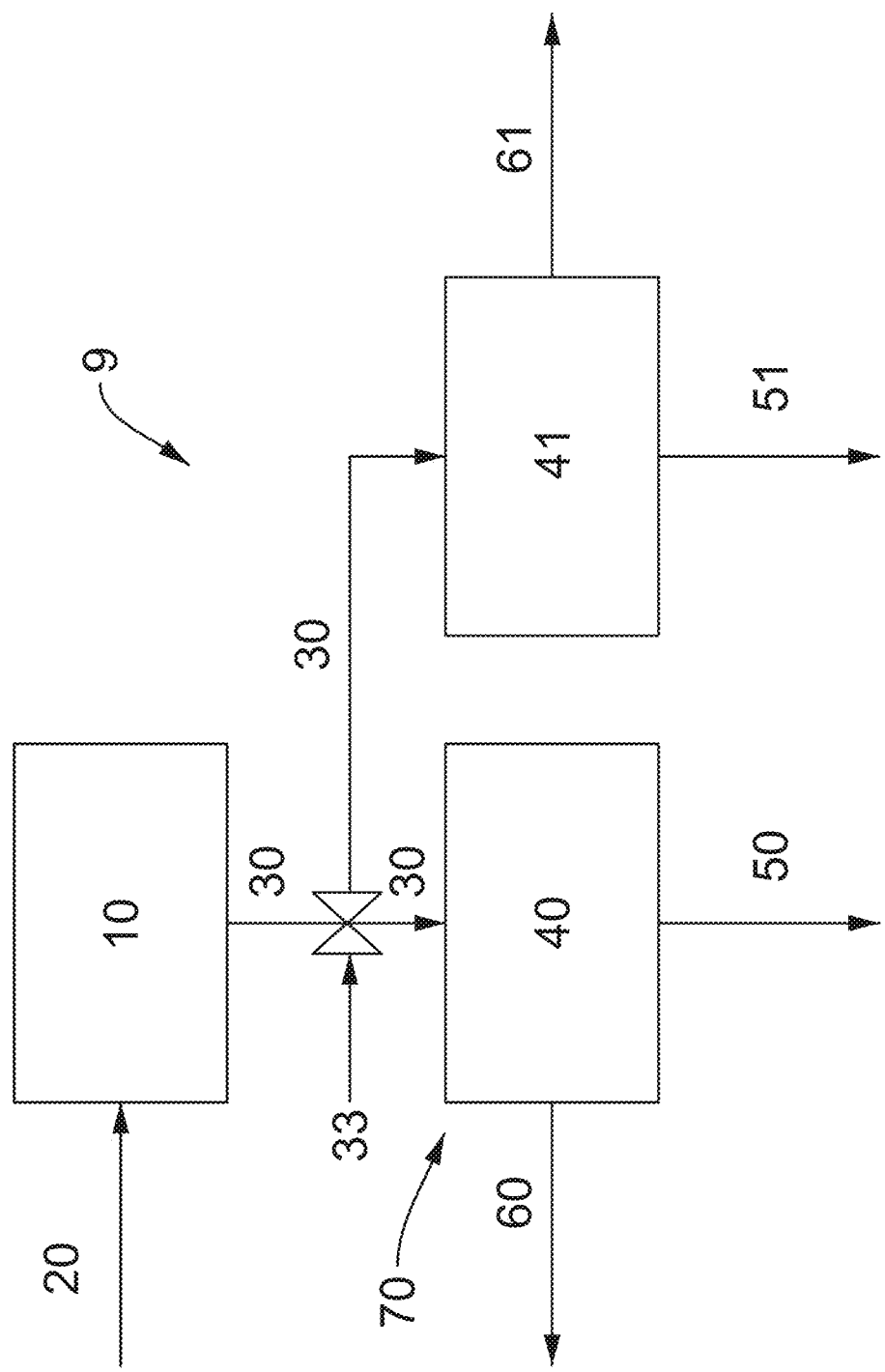
FIG. 8 is a flow diagram illustrating an exemplary apparatus for making a self-standing electrode according to an embodiment of the present disclosure.

In a non-limiting example as shown in FIG. 8, an apparatus 9 for the production of self-standing electrodes is provided. The carbon nanotubes and the electrode active materials are added to a vessel 10. The carbon nanotubes and the electrode active materials may be individually collected from their respective manufacturing processes and directly or indirectly introduced from such processes into the vessel 10 at a desired ratio for a self-standing electrode. One or more carrier gases 20 may then be introduced to the vessel 10 to aerosolize the mixture of the nanotubes and electrode active materials. The resulting mixed aerosolized stream 30 including the nanotubes and the electrode active materials entrained in the carrier gas is directed to a porous substrate 40, such as a filter. The carrier gas passes through the porous substrate 40 as gas stream 50 while the mixture of the nanotubes and the electrode active material is captured on the surface of the porous substrate 40 to form the self-standing electrode 60 upon the porous surface. Any electrolyte, 70, can be introduced either before, during, or after the flexible self-standing electrode (upon the porous substrate) forms. The self-standing electrode 60 can be removed from the porous substrate 40 when it reaches the desired thickness to form the flexible self-standing electrode.

Optionally, the apparatus 9 (FIG. 8) may include a plurality of porous substrates 40, 41 to allow for the continuous production of self-standing electrodes 60, 61 upon porous surfaces. Although only two porous substrates are shown, it is to be understood than any number of porous substrates may be included in the apparatus 9. In a non-limiting example, when the flow of the mixed aerosolized stream 30 across the porous substrate 40 produces the self-standing electrode 60 of the desired thickness, a valve 33 may be adjusted to transfer the flow of the mixed aerosolized stream 30 to a second porous substrate 41. The self-standing electrode 60 may be removed from the first porous substrate 40 during formation of the self-standing electrode 61 on the porous substrate 41. When the flow of the mixed aerosolized stream 30 across the second porous substrate 41 produces the self-standing electrode 61 of a desired thickness, the valve 33 may be adjusted to transfer the flow of the mixed aerosolized stream 30 back to the first porous substrate 40. The thickness and/or cross-sectional area of the self-standing electrode 61 may be the same, or different, than the cross-sectional area of the self-standing electrode 60. For example, the self-standing electrode 61 may have a greater thickness and/or cross-sectional area than the self-standing electrode 60.

It is to be understood that a variety of different methods may be used for automatically switching the valve 33 to redirect the flow of the mixed aerosolized stream 30 from one porous substrate to the other. Illustrative examples of systems that may be used to adjust the valve 33 to redirect the flow of the mixed aerosolized stream 30 include one or more sensors for detecting the thickness of the self-standing electrodes 60 and 61, one or more pressure sensors for monitoring a pressure drop across the porous substrates 40 and 41 that corresponds to a desired thickness of the self-standing electrodes 60 and 61, a timer that switches the valve 33 after a set time corresponding to a desired thickness of the self-standing electrodes 60 and 61 for a given flow rate of the mixed aerosolized stream 30, and any combination thereof; after the one or more pressure sensors measures a pressure drop associated with the desired thickness of the self-standing electrode 60 or 61 on porous substrate 40 or 41, or after the one or more thickness sensors detect the desired thickness of the self-standing electrode 60 or 61 on porous substrate 40 or 41, or after the timer measures the set time corresponding to the desired thickness of self-standing electrode 60 or 61 on porous substrate 40 or 41, the mixture is redirected from one porous substrate to the other. It is to be understood that the introduction of an electrolyte, 70, can be metered along with formation of the self-standing electrode upon the porous surface or thereafter. It is also to be understood that the porous substrates 40 and/or 41 may have a cross-sectional area that matches the desired cross-sectional area required for use in the battery cell to be made with the self-standing electrode 60 and/or 61. Accordingly, the flexible self-standing electrodes 60 and/or 61 would require no further processing of the cross-sectional area, such as cutting, before assembly in the final battery cell. In some embodiments, the flexible self-standing electrodes can be cut, treated, or further assembled, for example, battery tabs can be attached or electrolyte can be introduced after production.

Figure 9:
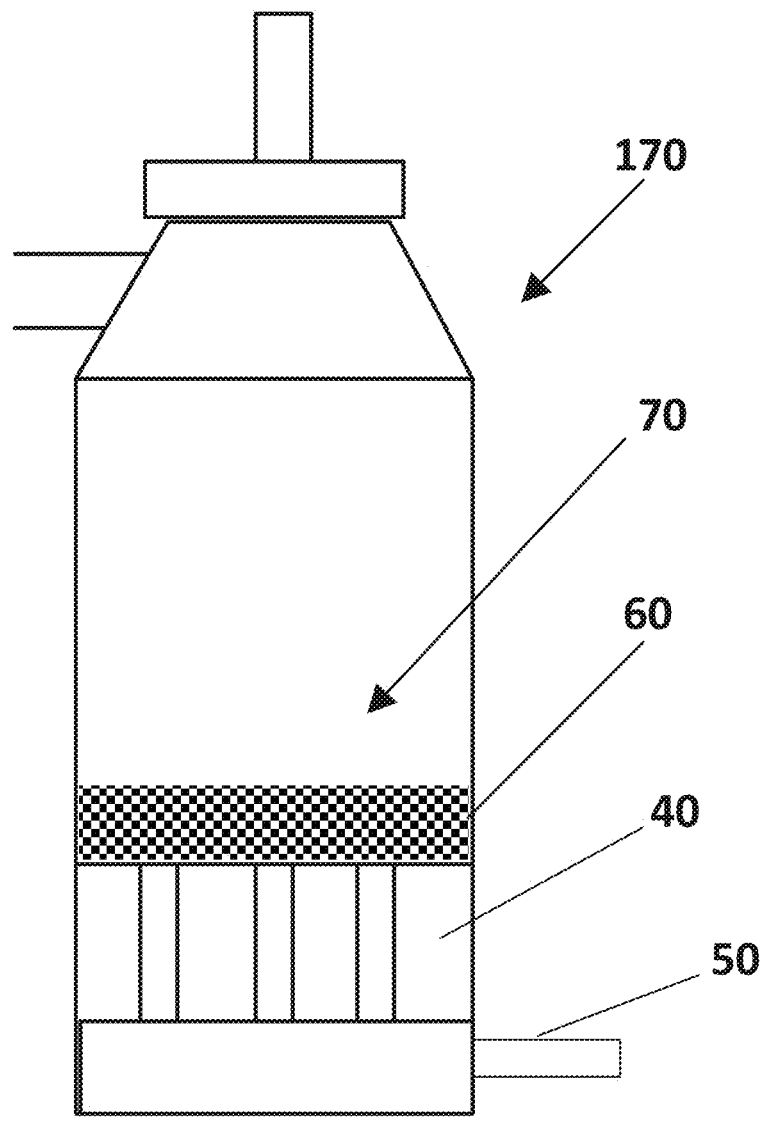
FIG. 9 illustrates a non-limiting example of an apparatus wherein electrolyte can be introduced before, during, or after formation of a flexible self-standing electrode.

As shown in a non-limiting example in FIG. 9, the electrolyte 70 may be provided before, during, or after the formation of the self-standing electrode 60 upon the porous substrate 40 with gas stream 50 exiting the collection area 170. In some embodiments, the mixture is removed from the porous substrate 40, to form the flexible self-standing electrode. It should be understood that in the various embodiments and non-limiting examples disclosed herein, introduction of an electrolyte at any step is optional, and a separator membrane can be used within the flexible battery pouch cells. In some embodiments, an electrolyte can be added to the flexible battery pouch cells after production of the flexible self-standing electrodes.

As an alternative to the specific apparatus noted above where the electrode active material is mixed with the nanotubes after the nanotubes are introduced, the electrode active material can be mixed in situ in a fluidized bed reactor or chamber with the nanotubes as the nanotubes are formed or introduced.

Carrier and fluidizing or aerosolizing gases suitable for use with the present disclosure include, but are not limited to, argon, hydrogen, nitrogen, and combinations thereof. Carrier gases may be used at any suitable pressure and at any suitable flow rate to aerosolize the nanotubes and the electrode active materials and transport the aerosolized mixture of the nanotubes and the electrode active materials to the porous substrate at a sufficient velocity to form the self-standing electrode on the surface thereof. According to some aspects, electrolyte can be fluidized or aerosolized in a carrier gas and combined with carbon nanotubes or electrode active materials. In some embodiments, the carrier gas may be argon, hydrogen, helium, or mixtures thereof.

The type of carbon nanotubes used in the present disclosure are not limited and can be single-walled (e.g., singlewalled [carbon] nanotubes (SWNT) or multi-walled. The nanotubes may be entirely carbon, or they made be substituted, that it is, have non-carbon lattice atoms. Carbon nanotubes may be externally derivatized to include one or more functional moieties at a side and/or an end location. In some aspects, carbon and inorganic nanotubes include additional components such as metals or metalloids, incorporated into the structure of the nanotube. In certain aspects, the additional components are a dopant, a surface coating, or are a combination thereof.

Carbon nanotubes may be metallic, semimetallic, or semiconducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "arm-chair", configuration is metallic, and hence highly valued for its electric and thermal conductivity. Carbon nanotubes may have diameters ranging from about 0.6 nm for single-wall carbon nanotubes up to 500 nm or greater for single-wall or multi-wall nanotubes. The nanotubes may range in length from about 50 nm to about 10 cm or greater.

Collecting the mixture of single-walled carbon nanotubes and aerosolized electrode active material powder on a surface and removing the carrier gas may be carried out by any suitable means. The collecting surface of the porous substrate 40, 41 (FIG. 8) may be a porous surface, including but not limited to a filter or a frit, where the pores are appropriately sized to retain the mixture of carbon nanotubes and the electrode active material (and electrolyte if added) thereon to form the flexible self-standing electrode while permitting passage of the carrier and fluidizing gases. The carrier and fluidizing gases may be removed after passing through the surface and by way of an outlet. In some embodiments, removal of the carrier gas may be facilitated by a vacuum source. With respect to filters, the filters may be in the form of a sheet and may include a variety of different materials such as woven and non-woven fabrics. Illustrative filter materials include, but are not limited to, cotton, polyolefins, nylons, acrylics, polyesters, fiberglass, and polytetrafluoroethylene (PTFE). To the extent the porous substrate is sensitive to high temperatures, one or more of the gas streams may be precooled with dilution gases having a lower temperature and/or by directing one or more of the streams through a heat exchanger prior to contacting the porous substrate.

The loading or weight % of carbon nanotubes in the flexible self-standing electrode is based on the relative amounts of the nanotubes (or carbon source used to form the nanotubes), the electrode active material, and optionally the electrolyte. It is within the level of ordinary skill in the art to determine the relative starting amounts of carbon source, catalyst/catalyst precursor, optional electrolyte, and electrode active material that will afford a given loading or weight % of carbon nanotubes in the flexible self-standing electrode. In a non-limiting example, the flexible selfstanding electrode may include from about 0.1% to 4% by weight carbon nanotubes, and the balance the electrode active material and optionally an electrolyte. Optionally, the flexible self-standing electrode may include from about 0.2% to 3% by weight carbon nanotubes, or about 0.75% to 2% by weight. The flexible self-standing electrode may be free of any binders. The lack of a binder results in a self-standing electrode with improved flexibility. Further, it has been discovered that a higher carbon nanotube content increases the flexibility of the self-standing electrode. Without being bound to any particular theory, this is likely due to the length and aspect ratio of the carbon nanotubes and webbed morphology of the self-standing electrode including a webbed arrangement of carbon nanotubes and interconnected spaces with the electrode active material contained or embedded within the web.

In a non-limiting example, the flexible self-standing electrode may have a density of 0.9 to 1.75 g/cc. Optionally, the self-standing electrode may have a density of 0.95 to 1.25 g/cc. Optionally, the self-standing electrode may have a density of 0.75 to 2.0 g/cc. Optionally, the self-standing electrode may have a density of 0.95 to 1.60 g/cc. If the flexible self-standing electrode includes electrolyte, in some embodiments, the density can change.

In a non-limiting example, the flexible self-standing electrode may have a thickness of up to 750 μm following collection on the porous substrate. Optionally, the self-standing electrode may have a thickness of 50 μm to 500 μm following collection on the porous substrate. Optionally, the self-standing electrode may have a thickness of from 100 μm to 450 μm following collection on the porous substrate. Optionally, the self-standing electrode may have a thickness of from 175 μm to 250 μm following collection on the porous substrate.

In some embodiments, the method of the present disclosure may further include treating the composite or flexible self-standing electrode, including but not limited to pressing the composite or flexible self-standing electrode. Without wishing to be bound to any particular theory, pressing may increase the density and/or lower the thickness of the self-standing electrode, which may improve such properties as rate performance, energy density, and battery life. Pressing of the self-standing electrodes may be carried out by applying a force to achieve a desired thickness and/or density, such as by using a rolling press or calendaring machine, platen press, or other suitable means, as will be known to those of ordinary skill in the art. Any suitable force may be applied, to achieve a desired thickness, and/or density, and/or impedance, such as but not limited to a force of about 1 ton, about 2 tons, about 3 tons, about 4 tons, about 5 tons, about 6 tons, about 7 tons, about 8 tons, about 9 tons, about 10 tons, about 15 tons, or any integer or range in between, such as between about 7 tons and about 10 tons. In some embodiments, pressing may be limited to pressing to a thickness of about 20 microns, about 30 microns, about 40 microns, about 50 microns, about 60 microns, about 70 microns, about 80 microns, about 90 microns, about 100 microns, about 150 microns, about 200 microns, about 250 microns, about 300 microns, about 350 microns, about 400 microns, or any integer or range in between. Without wishing to be bound by any particular theory, too thick of an electrode may be slow to produce energy or may not be suitably flexible. If the electrode is too thin, energy production may be rapid but it may be the case that not enough energy is produced. In addition, it may be desirable to regulate the distance between the rolls or rollers in a rolling press or calendaring machine, or between the plates of a platen press, by any suitable means known to those of ordinary skill in the art.

Determination of a suitable amount of pressing is within the level of ordinary skill in the art. As will be known to those of ordinary skill in the art, excessive pressing may cause the electrolyte to penetrate the electrode too much, as determined by measuring impedance and/or resistance to diffusion. As will be evident to those of ordinary skill in the art, it may be of interest to minimize the electrolyte diffusion resistance or coefficient for a given electrolyte, as measured by impedance. In a non-limiting example, the thickness of the self-standing electrode following pressing may be from 40% to 75% of the thickness of the untreated self-standing electrode, or the self-standing electrode following collection on the porous substrate. Optionally, the thickness of the self-standing electrode following pressing may be from 45% to 60% of the thickness of the untreated self-standing electrode, or the self-standing electrode following collection on the porous substrate.

In a non-limiting example, the density of the self-standing electrode following pressing is increased by 40% to 125% of the density of the untreated self-standing electrode, or the self-standing electrode following collection on the porous substrate. Optionally, the density of the self-standing electrode following pressing is increased by 45% to 90% of the density of the untreated self-standing electrode, or the self-standing electrode following collection on the porous substrate.

According to some aspects, each flexible self-standing electrode includes: a plurality of carbon nanotubes arranged in a webbed morphology with interconnected spaces among the carbon nanotubes, the interconnected spaces including an electrode active material and an electrolyte.

In FIG. 11, flexible self-standing electrode material is shown before treatment. FIG. 12 shows the flexible self-standing electrode material after 7 ton pressing. A side view of the pressed flexible self-standing electrode material, shown in FIG. 13, shows a thickness of about 60 microns and flexibility is illustrated by a lifted corner of the self-standing electrode. FIG. 14 is a magnified view showing a scale of one micron, the active material particles are shown with a carbon nanotube webbed morphology.

In some embodiments, the aerosolizing (or fluidization/dispersion) of the electrode active material includes distributing an aerosolizing gas through a first porous frit and a bed of an electrode active material, in an aerosolizing chamber, to produce the aerosolized electrode active material powder. The aerosolizing chamber may be constructed with an appropriately sized porous material such that gas can pass through to enable aerosolizing but that does not permit the active material to fall through the pores. The aerosolizing chamber is not limited to any particular configuration. Examples of suitable aerosolizing gases include, but are not limited to, argon, helium, or nitrogen. In some embodiments, the aerosolizing gas may be the same as the carrier gas.

As used herein, "electrode active material" refers to the conductive material in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e., higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

In some embodiments, the electrode active material is selected from graphite, hard carbon, metal oxides, lithium metal oxides, and lithium iron phosphate. In some embodiments, the electrode active material for the anode may be graphite or hard carbon. In some embodiments, the electrode active material for the cathode may be lithium metal oxides or lithium iron phosphate.

In a non-limiting example, the electrode active material may be any solid, metal oxide powder that is capable of being aerosolized. In an illustrative example, the metal oxide is a material for use in the cathode of the battery. Non-limiting examples of metal oxides include oxides of Ni, Mn, Co, Al, Mg, Ti and any mixture thereof. The metal oxide may be lithiated. In an illustrative example, the metal oxide is lithium nickel manganese cobalt oxide, $Li(Ni,Mn,Co)O_2$, $Li-Ni-Mn-Co-O$, $(LiNiMnCoO_2)$, or $(LiNi_xMn_yCo_zO_2, x+y+z=1)$. The metal oxide powders can have a particle size defined within a range between about 1 nanometer and about 100 microns. In a non-limiting example, the metal oxide particles have an average particle size of about 1 nanometer to about 10 nanometers.

Figure 7:
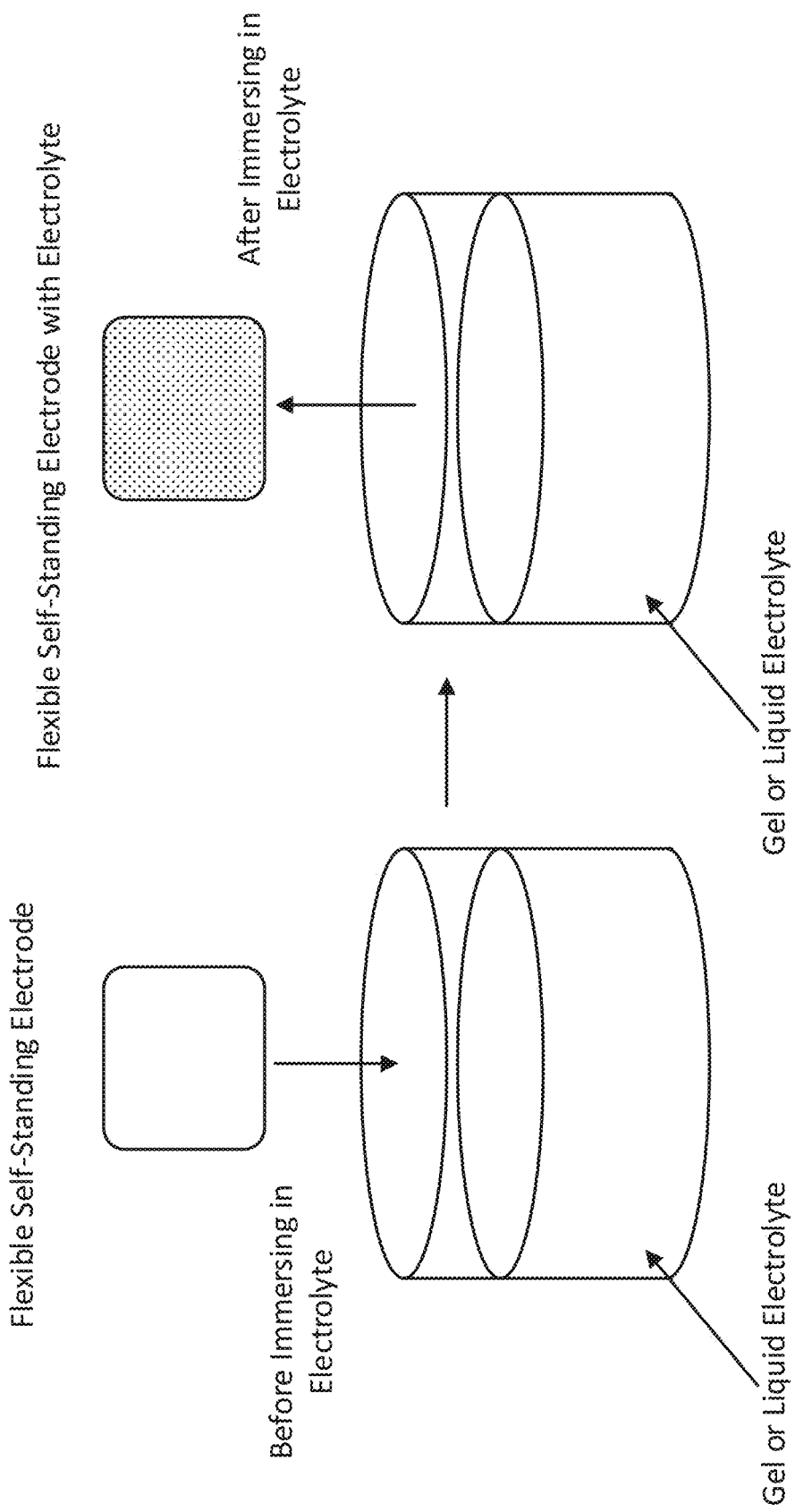
FIG. 7 shows immersion of a flexible self-standing electrode into a gel or liquid electrolyte in a non-limiting illustration.

According to some aspects, a solid electrolyte with high ionic conductivity can be introduced either by, for example, coating (depositing) (or immersing in the case of gel or liquid, as shown in FIG. 7) on the surface of the self-standing electrodes optionally followed by compressing two electrodes together. Optionally, each self-standing electrode can be compressed before combining with another self-standing electrode. As used herein, various descriptions of introduction of an electrolyte are non-limiting, as an electrolyte can be introduced at any stage or by any means to provide the self-standing electrode, the flexible battery pouch cell, the stretchable and flexible battery, or components thereof. Currently, there are different types of Li-ion solid electrolytes, for example, NASICON, garnet, perovskite, LISICON, LiPON, Li3N, sulfide, argyrodite, or anti-perovskite. In some embodiments, the solid electrolyte can be shape conformable, flexible, and with high ionic conductivity. Polymer based thin (comparable with a thickness of a separator membrane, about 10 microns) electrolytes are feasible for this purpose. According to some aspects, polymer based thin electrolytes utilized in the present disclosure can optionally be about 2-200 microns thick, about 5-40 microns thick, about 10-30 microns thick, about 15-25 microns thick, or about 20 microns thick. In some embodiments, a liquid electrolyte is utilized, and a separator membrane, not performing the role of an electrolyte, can be about 5-40 microns thick, about 10-30 microns thick, about 15-25 microns thick, or about 20 microns thick.

It should be understood that, as used herein, flexible battery pouch cells (battery cells or units) can include two or more self-standing electrodes, and one or more units can be combined to provide a stretchable and flexible lithium ion battery 110 (FIG. 1). According to some aspects, battery cells 122 without separator membranes or a polymer based insulator membrane are disclosed herein, and a solid (gel) electrolyte with high ionic conductivity, for example, a polymer based gel electrolyte can be used in the role of a separator while simultaneously performing the role of an electrolyte. Thus, the energy density of the flexible battery pouch cells can be increased. According to some aspects, the battery cells have a high energy density and are free of binder, current collector, and separator. In some embodiments, the battery cells are connected in a 3D configuration 130 as is shown in FIG. 1, further increasing the overall energy density of the stretchable and flexible lithium ion battery. In some embodiments, the average energy density of the flexible battery pouch cells is greater than about 0.5 MJ/kg, optionally greater than about 1.0 MJ/kg, optionally greater than about 1.5 MJ/kg, and optionally greater than about 2.0 MJ/kg.

As used herein, "current collector" refers to a metal based current collector, for example, copper or aluminum current collectors, as foils or sheets, utilized in lithium ion batteries. The term "free of current collector" refers to an electrode or self-standing electrode without a metal based current collector. As used herein, "separator" or "separator membrane" refers to a permeable membrane that provides a barrier between the anode and the cathode while enabling the exchange of lithium ions from one side to the other but that does not function as an electrolyte. For example, a polymer that is electrochemically inactive and that is not functioning as an electrolyte is referred to herein as a "separator membrane". As used herein, the term "free of separator" and "free of separator membrane" refers to a lithium ion battery that is free of a non-electrolyte separator. According to the various embodiments herein, stretchable and flexible lithium ion batteries are disclosed herein that are free of separator membrane, free of current collector, and free of binder.

The flexible battery pouch cells disclosed herein are flexible due, independently, to the flexible and self-standing electrodes, the flexible material packaging, and the flexibly attached battery tabs. The flexible material packaging surrounding each battery cell can be made of any suitable material and can be, in non-limiting examples, twistable, wearable, implantable, biocompatible, waterproof, thermally insulating, able to hold a fixed shape after being formed to a fixed shape, have the ability to return from a deformed shape (temporary shape) to an original (permanent) shape induced by, for example, response to an environmental change or force applied. In some embodiments, the flexible material packaging can have devices imprinted upon it, embedded in it, or attached to it, for example, environmental sensors, LEDs, processors, displays, biosensors, and connectivity devices such as GPS and Wi-Fi, while these non-limiting examples can alternatively be integrated into the entire stretchable and flexible lithium ion battery or any portions thereof. According to some aspects, the flexible material packaging is sealed by any suitable means to contain the flexible self-standing electrodes (and electrolyte, electrode active material, battery tab attachments to the electrodes) therein. In some embodiments, the stretchable and flexible lithium ion battery can surround a device, can be an integration platform for a device, can be detachable from a device, can be internal or external to a device, with a device including, for example, a processor, circuitry, and electrical components.

The conductive battery tabs can be attached to or embedded in the flexible self-standing electrodes by any means. In some embodiments, the battery tab can include a different material at or near the area of attachment to the flexible self-standing electrode and a different material external to the flexible battery pouch cell or extending from the flexible self-standing electrode. According to some aspects, flexible battery tab attachments are attached to the conductive battery tabs.

As shown in FIG. 3, each flexible battery pouch cell can have multiple flexible battery tabs or flexible battery tab attachments for connection to other flexible battery pouch cells. The configuration in FIG. 3 is non-limiting as the flexible battery tab attachments or flexible battery tabs and stretchable materials can, in some embodiments, extend vertically or downward from the flexible battery pouch cell in 3D configurations of the stretchable and flexible lithium ion battery.

According to some aspects, the stretchable and flexible lithium ion battery is further made durable because more than one flexible battery cells are bridged together by a stretchable component such as a polymer film, rubber, resin, silicon straps, metallic springs, or any other suitable bridging components. Depending on various applications, the battery cells can be connected by serial, parallel, or other electrical combinations. The battery cells can be described as units. According to some aspects, the units can be bridged in a 2D configuration 120 (FIG. 1). According to some aspects, the units can be bridged in a third dimension (3D Configuration 130, FIG. 1) or stacked configuration to further increase the energy storage/density of the flexible lithium ion battery.

In a non-limiting example as shown in FIG. 1, flexible battery pouch cells (units) are bridged together by stretchable and flexible materials that form conducting, stretchable, compressible, and flexible battery tabs to form a stretchable and flexible lithium ion battery (battery). According to some aspects, the units can be bridged in almost any final shape or configuration of a battery. It should be understood that as used herein, "bridged" and "bridging" refers to a connection between units and includes any stretchable and flexible material with the battery tabs shown in FIGS. 1 and 2 included in the stretchable and flexible material. The battery tabs shown in FIGS. 1 and 2 can be attached to or embedded in any part of the self-standing electrodes. It should be understood that the battery tabs are not current collectors as used herein. To form the stretchable and flexible lithium ion battery, the battery tabs can be any suitable material that is conductive, flexible, and stretchable and can extend from one battery cell to another in various distances.

According to some aspect, the units shown in FIG. 1 can be of any size or shape, and the flexible material packaging containing each unit can be any suitable material to contain the flexible self-standing electrodes while enabling the battery tabs or flexible battery tab attachments to extend therefrom. The flexible self-standing electrodes can be folded one or more times before placement inside the flexible material packaging. In some embodiments, the flexible material packaging is sealed using heat, adhesive, laminate, and various treatments to form the flexible battery pouch cell. The bridging between or among units can be accomplished with any suitable stretchable (compressible) and flexible material, with the conductive battery tabs being any suitable material for electrically connecting the units in series, parallel, or combinations suitable for various applications, voltages, or configurations.

FIG. 2 shows a non-limiting example of a flexible battery pouch cell with stretchable and flexible battery tabs extending. Battery tabs can be attached to the electrodes, in accordance with aspects of the present disclosure, either to protrusions extending from the main body of the respective electrode and not overlapping with the other electrode; or to the main body of the respective electrode at cutouts of the separator membrane and the opposing electrode. According to some aspects, battery tabs are embedded into the electrodes. Suitable battery tab materials and methods of attachment include those known to persons of ordinary skill in the art. In some embodiments, the conductive battery tabs can include copper or lead for the anode. In some embodiments, the conductive battery tabs can include aluminum or lead for the cathode. According to some aspects, the battery tabs can include one metal at or near attachment to the electrode and a different metal extending away from the electrode, for example, a stretchable and flexible metal as a stretchable and flexible battery tab attachment. As used herein, non-limiting examples of "spring metal" are spring steel, steels used in springs, low-alloy manganese, medium-carbon steel or high-carbon steel with a very high yield strength, enabling the extended aspects of the battery tabs to return to their original shape despite significant deflection or twisting. The spring metal can also be compressed. In FIGS. 1-2, optional joints are shown where, for example, spring metals can be attached to the flexible battery pouch cells at areas crossing through the flexible material packaging, extending away from the flexible self-standing electrodes contained inside the flexible material packaging. According to some aspects, a stretchable, durable, and flexible material forms a stretchable polymer matrix around the conductive spring metal. In some embodiments, the conductive battery tabs can surround a flexible material.

Figure 15:
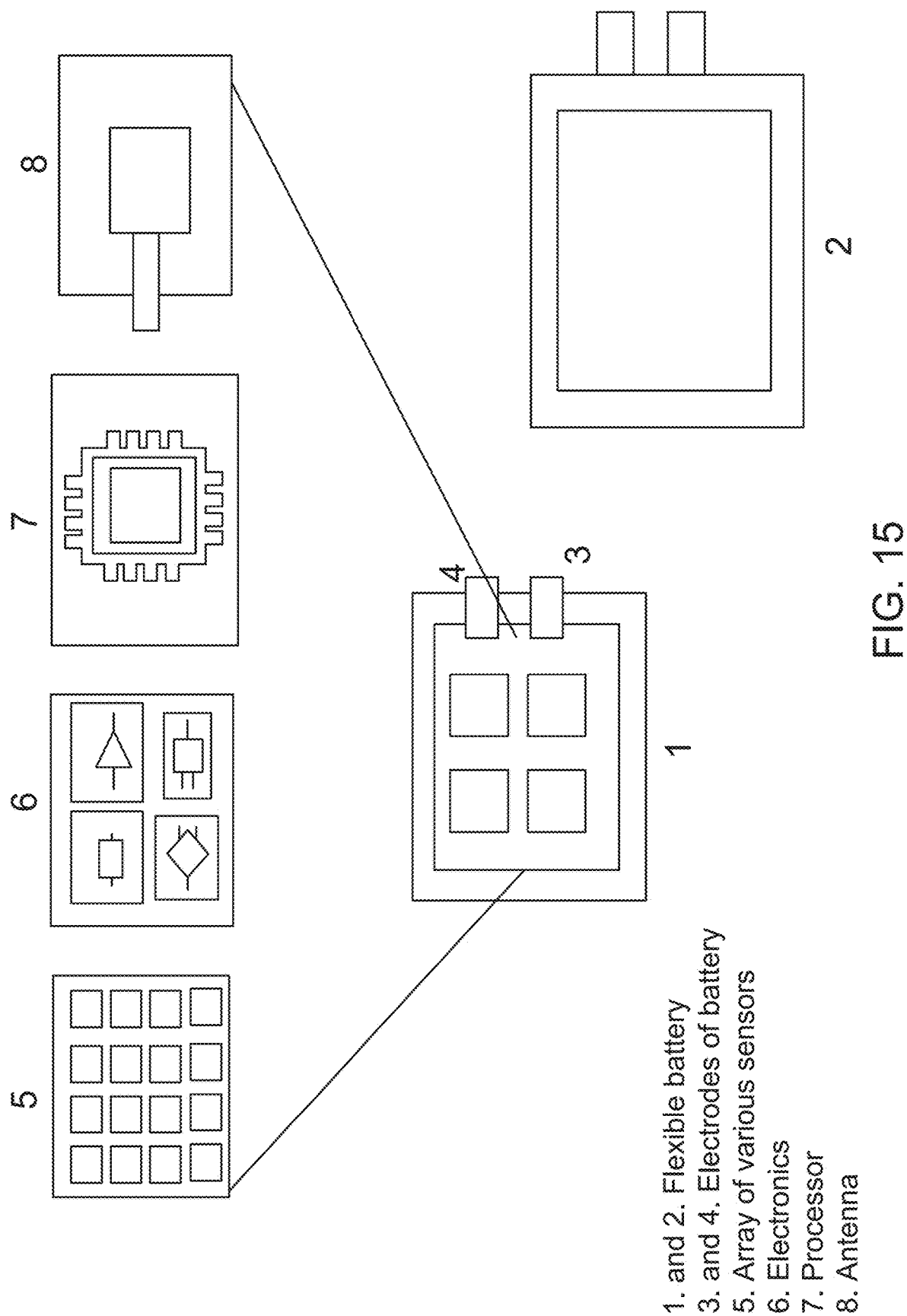
FIG. 15 is a non-limiting example of various components that can be integrated into the flexible battery pouch cells or into the stretchable and flexible lithium ion battery according to various embodiments of the present disclosure.

According to some aspects, as shown in the non-limiting illustration in FIG. 15, the stretchable and flexible lithium ion battery disclosed herein and the flexible battery pouch cells can include, for example, sensors, electronics, processors, antennae, and various other components. According to some aspects, the surface of the flexible material packaging can be used as a substrate to attach, print, and/or embed electronic devices. Non-limiting examples of suitable electronic devices include various types of sensors, microprocessors, wireless communication devices/transmitting devices (e.g. Wi-Fi), circuit boards, and other electronics (e.g. accelerometer, gyroscope). Examples of suitable sensors include those for detecting heart rate, respiratory rate, blood pressure, blood oxygen saturation, body temperature, muscle activity, seizure events, electroencephalography (EEG), epileptic crises, electroencephalogram (ECG), electromyographic data (EMG), and electrodermal activity (EDA). Additional examples of suitable sensors include those for monitoring concentrations of pollutants and movement of objects. In one embodiment, the wearable devices integrated with flexible batteries have a wide range of applications including monitoring environmental pollution, space exploration, homeland security, biology, implants, and medicine. One the of preferred applications of wearable sensors/devices is real time monitoring of human physiological parameters.

Figure 16:
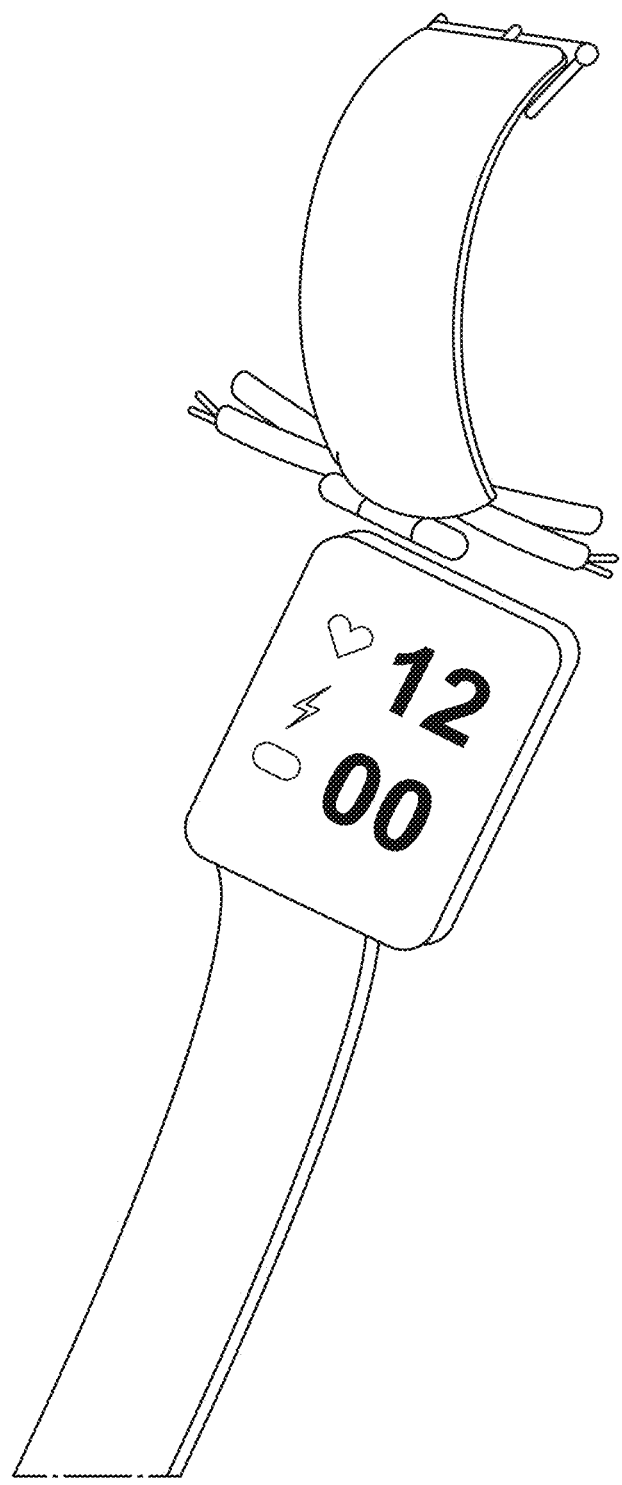
FIG. 16 shows a non-limiting example of a wearable and flexible battery in the form of a battery band as a smart watch band providing power to a watch.
Figure 17:
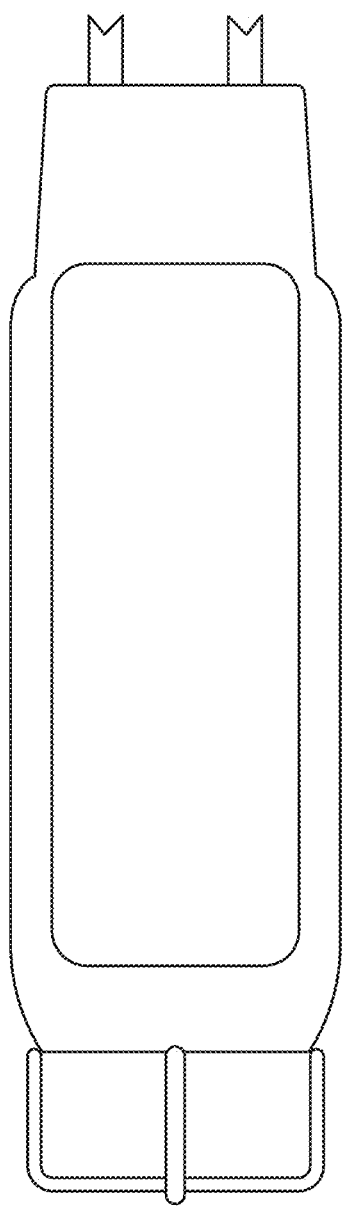
FIG. 17 shows a wearable and flexible battery in the form of a watch band with a buckle attached at one end and flexible conductive battery tabs protruding from the opposite end, according to some embodiments of the present disclosure.

A non-limiting illustration of a flexible battery, in the form of a watch band, according to various embodiments of the present disclosure, is shown in FIG. 16. As shown in FIG. 17, the flexible battery can include flexible battery tabs (Top, FIG. 16) extending from the flexible battery pouch cells, and the flexible battery in this non-limiting example includes a buckle at the bottom of FIG. 17.

Figure 18:
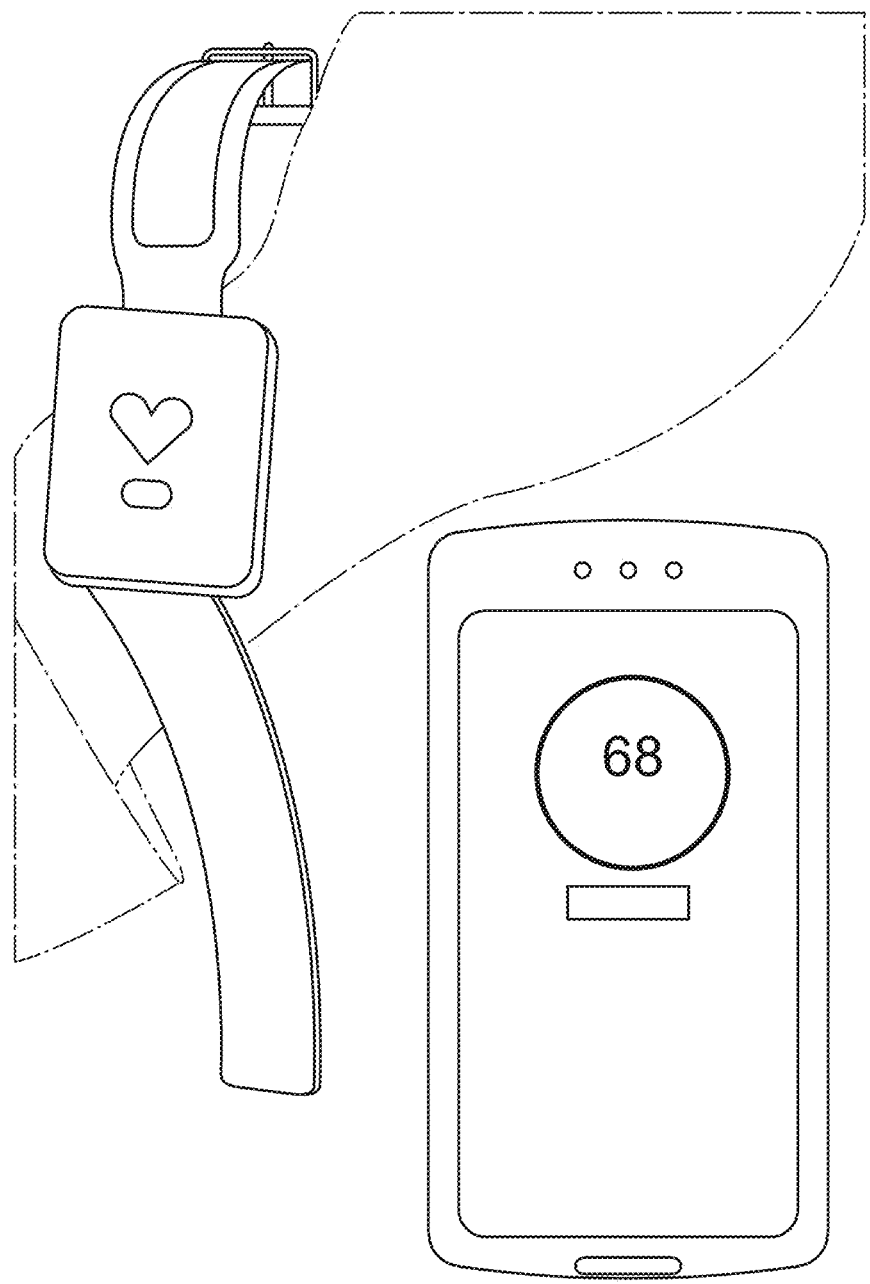
FIG. 18 shows a non-limiting example of a wearable and flexible battery in the form of a battery band as a smart watch band providing power to a watch and an embedded heart rate sensor further operative to transmit heart rate data to a cellphone via Bluetooth.
Figure 23A:
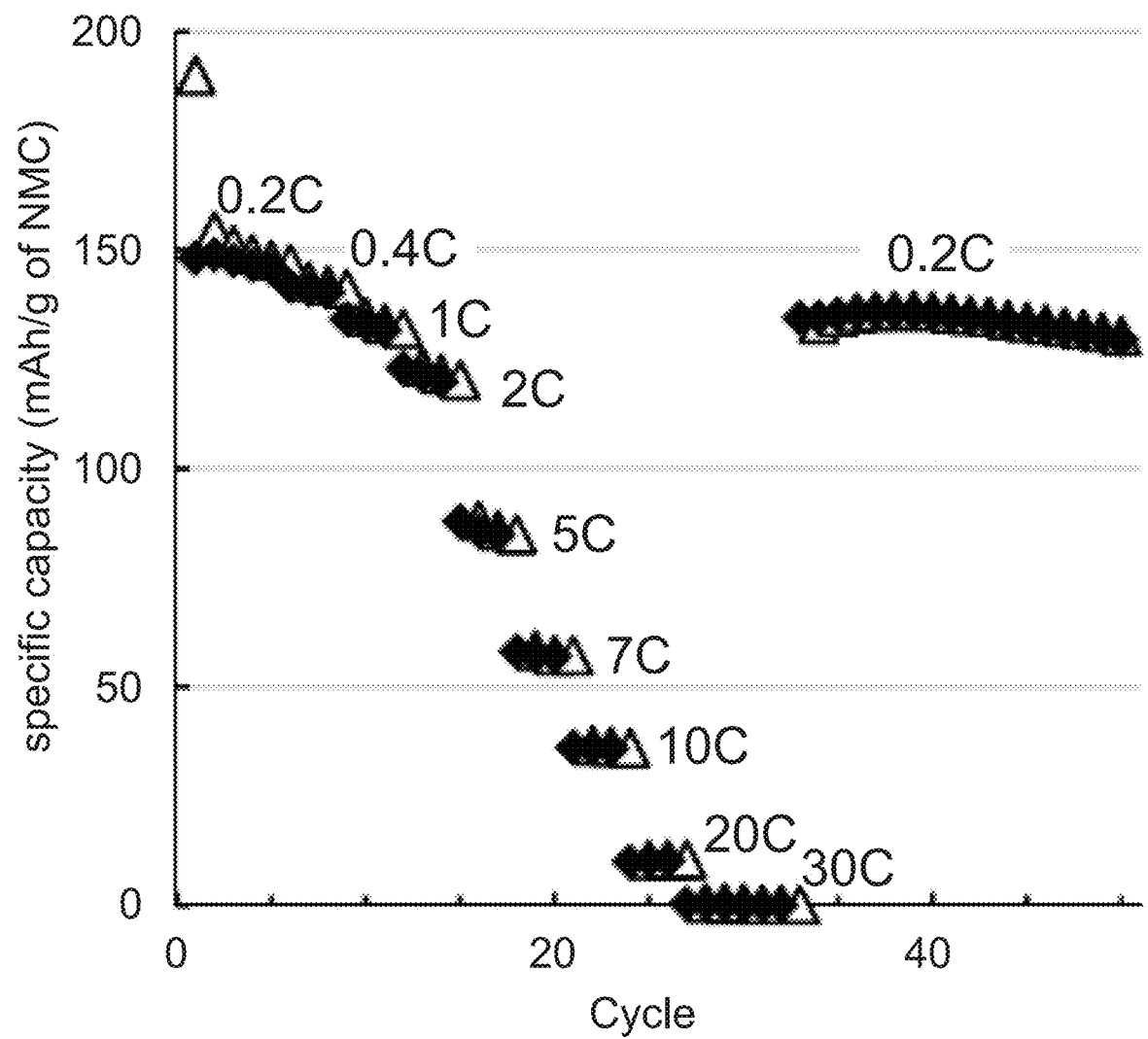
FIG. 23A shows performance of a single cathode (1.4% CNT) and single anode cell, as described in the Examples.

To further illustrate embodiments of the present disclosure, FIG. 18 shows a flexible band battery connected to a smart watch, powering the watch, while heartrate data is transmitted to a smart phone. The high energy density of the flexible battery is illustrated in FIG. 23A, wherein a discharge rate of 0.2 C has small variance after 40 cycles. The high energy density can be derived from the exclusion of electrochemically inactive components from the flexible battery, for example, current collector, binder, and separator. According to some aspects, the flexible batteries disclosed herein do not include a current collector, binder, or non-electrochemically active separator. In some embodiments, the electrolyte disclosed herein functions as an electrochemically active separator, further enhancing the high energy density of the flexible lithium ion battery.

According to some aspects, a stretchable and flexible lithium ion battery is disclosed herein, comprising: a plurality of flexible battery pouch cells, each of the plurality of flexible battery pouch cells comprising a flexible material packaging containing two or more flexible self-standing electrodes, wherein each of the two or more flexible self-standing electrodes includes a conductive battery tab, and the conductive battery tab of a first flexible battery pouch cell of the plurality of flexible battery pouch cells is electrically connected to the conductive battery tab of a second flexible battery pouch cell of the plurality of flexible battery pouch cells. In some embodiments, the conductive battery tabs can be stretchable and flexible. According to some aspects, a respective stretchable and flexible battery tab attachment can be attached to each of the conductive battery tabs, the stretchable and flexible battery tab attachments extending through the flexible material packaging and external to the flexible material packaging so as to connect the first flexible battery pouch cell to the second flexible battery pouch cell. The flexible battery tab attachments can comprise, as non-limiting examples, a spring metal, a metal mesh or gauze, a metal foil (perforated or not-perforated), a conductive polymer, a conductive fabric, a conductive thread, carbon nanotubes, a carbon nanotube yarn, or combinations thereof. In some embodiments, a stretchable polymer matrix, for example, a flexible polymer, a flexible rubber, one or more springs, a stretchable fabric, an elastic, or combinations thereof, can connect the first flexible battery pouch cell to the second flexible battery pouch cell and to other flexible pouch cells. The stretchable polymer matrix can, for example, cover the stretchable and flexible battery tab attachments. In some embodiments, the first flexible battery pouch cell is separately connected to at least a third flexible battery pouch cell of the plurality of flexible battery pouch cells. In some embodiments, joints can further connect the flexible material packaging with the conductive battery tabs. According to some aspects, the stretchable and flexible lithium ion battery is free of a separator membrane, free of a current collector, free of binder, or free of both a current collector and binder, or free of separator membrane, current collector, and binder while having a high energy density.

It should be understood that the external flexible material packaging disclosed herein is not limited and can comprise flexible polymer, foil, rubber, fabric, biocompatible material, organic material, material with components and processors embedded in and imprinted upon the flexible material packaging, and combinations thereof. In some embodiments, the flexible material packaging can form a flexible battery pouch cell, wherein each flexible battery pouch cell comprises two or more flexible self-standing electrodes comprising: carbon nanotubes; electrode active material; electrolyte; and an attached battery tab. The electrolyte therein can comprise NASICON, garnet, perovskite, LISICON, LiPON, $Li_3N$, sulfide, argyrodite, and anti-perovskite.

According to some aspects, a method of making a stretchable and flexible lithium ion battery is disclosed herein, the method comprising: providing a plurality of flexible battery pouch cells, each of the plurality of flexible battery pouch cells comprising a flexible material packaging containing two or more flexible self-standing electrodes, wherein each of the two or more flexible self-standing electrodes includes a conductive battery tab, wherein each conductive battery tab comprises a stretchable and flexible material, and electrically connecting the conductive battery tab of a first flexible battery pouch cell of the plurality of flexible battery pouch cells to the conductive battery tab of a second flexible battery pouch cell of the plurality of flexible battery pouch cells. The method can, for example, further comprise attaching a respective stretchable and flexible battery tab attachment to each of the conductive battery tabs, each stretchable and flexible battery tab attachment extending through the flexible material packaging and external to the flexible material packaging of a flexible battery pouch cell, and electrically connecting the stretchable and flexible battery tab attachment between the first flexible battery pouch cell and the second flexible battery pouch cell. According to some aspects, the method can, for example, further comprise adding a solid or gel electrolyte to the flexible self-standing electrodes. The electrolyte can be added at any stage, for example, after production of the flexible battery pouch cell. The method can further comprise connecting the flexible material packaging with the conductive battery tabs (or to the battery tab attachments) by joints. The method can further comprise connecting the first flexible battery pouch cell to the second flexible battery pouch cell with a stretchable and flexible polymer matrix.

According to some aspects, a method of using a stretchable and flexible lithium ion battery is disclosed herein, the method comprising: attachment of the stretchable and flexible lithium ion battery to an electronic device; wherein the shape of the stretchable and flexible lithium ion battery and the attachment to an electronic device is ergonomic and wearable; and the stretchable and flexible properties of the lithium ion battery are operative to a wearable comfort of the stretchable and flexible lithium ion battery.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. No claim element is to be construed as a means plus function unless the element is expressly recited using the phrase "means for."

This detailed description uses examples to present the disclosure, including the preferred aspects and variations, and also to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

Herein, the recitation of numerical ranges by endpoints can include all numbers subsumed within that range, for example, between about 30 microns and 400 microns includes 31, 52, 63, and 74 microns as endpoints within the specified range. Thus, for example, ranges 110-400, 250-320, 230-290, etc. are also ranges with endpoints subsumed within the range 30-400 depending on the starting materials used, specific applications, specific embodiments, or limitations of the claims if needed. The Examples and methods disclosed herein demonstrate the recited ranges herein subsume every point within the ranges because it is disclosed that various products can result from changing one or more endpoints. Further, the methods and Examples disclosed herein describe various aspects of the disclosed ranges and the effects if the ranges are changed individually or in combination with other recited ranges.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the disclosure is in any limited by the examples provided. Efforts have been made to ensure accuracy with respect to numbers used (e.g. amounts, dimensions, etc.) but some experimental errors and deviations should be accounted for.

EXAMPLES

Example I(a): Preparation of Self-Standing Composite Electrode

The apparatus for preparing the self-standing composite electrode included a reactor for the synthesis of SWNTs, a chamber for generating aerosolized active material powder that is in fluidic communication with a mixing chamber for mixing with SWNTs, and a chamber for co-deposition of SWNTs and active material mixture.

SWNTs were grown at ambient pressure via a floating catalyst CVD method using ferrocene and ethanol as the catalyst and carbon source, respectively. Ferrocene (0.4 wt %) and thiophene (0.2 wt %) were dissolved in ethanol through mild sonication. The quartz tube reactor was heated to the growth temperature (1025° C.) using a tube furnace under a constant flow of argon (860 sccm) and hydrogen (300 sccm). After the furnace reached the growth temperature, the ferrocene/ethanol solution was injected continuously into the reactor at a 6 mL/h rate for the duration of the CNT growth. The growth of SWNTs and their quality (G/D>70) were confirmed by SEM, TEM and Raman spectroscopy (inVia, Renishaw) and TGA analysis (TGA/DSC1, Mettler Toledo).

As-grown SWNTs may contain from few to more than 15 wt % Fe catalyst particles depending on synthesis conditions. Optimization of conditions allows for the production of nanotubes with less than 5 wt % Fe catalyst particles that are encapsulated by the multilayer carbon and thereby do not interfere with electrochemical reactions The self-standing composite sheets produced by this process contained from 0.26 to 23 wt % SWNTs, confirmed by TGA. The active cathode material used was Li—$Ni_{0.5}Mn_{0.3}Co_{0.2}O_2$ (NMC=5:3:2) (MTI Corporation) and graphite flakes for anode (Alfa Aesar 7-10 micron, 99%). SEM and Raman measurements confirmed that upon mixing with SWNTs, the active materials remained intact. The ratio between SWNTs and battery active material (LNMC or graphite flakes) was controlled by variation of carrier gas (Ar) flow.

The final electrodes were pressed from the deposited film to the desired thicknesses using a roll mill and were then cut to the required size, resulting in self-standing composite sheets of LNMC or Gr embedded in an SWNT network.

Example I(b): Physical Analysis of Self-Standing Composite Electrode

Figure 19A:
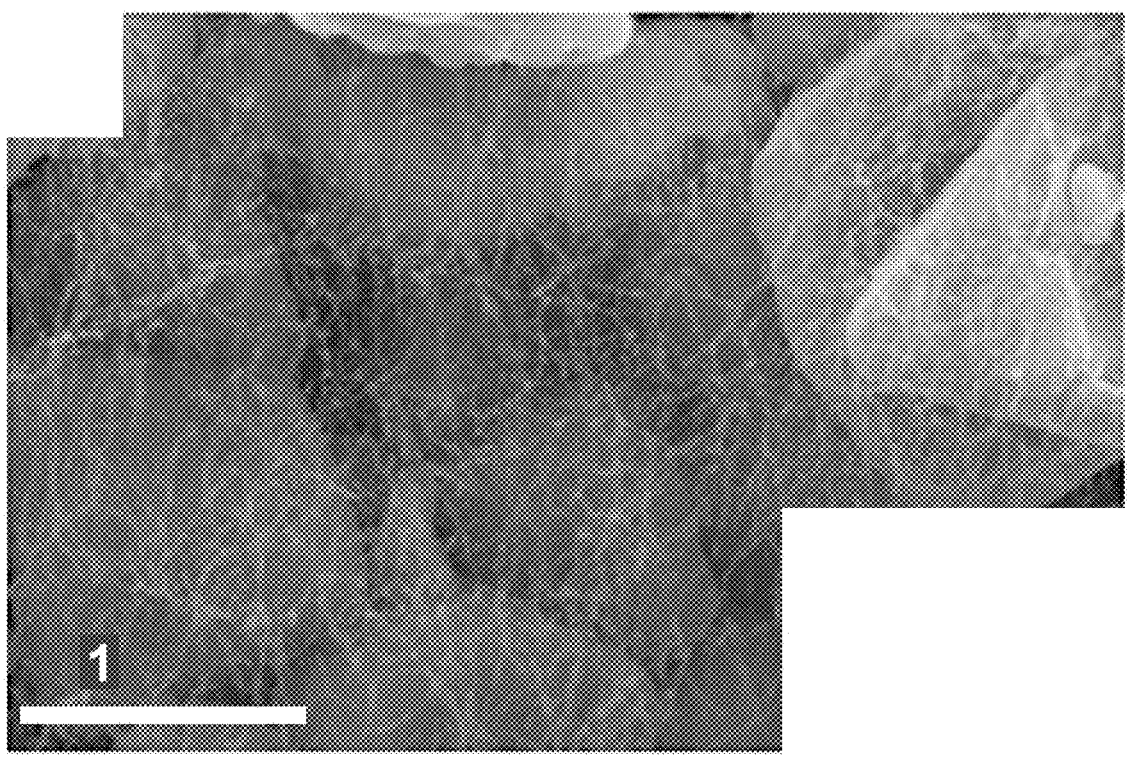
FIG. 19A is a scanning electron microscope (SEM) image of self-standing cathodes consisting of LiNMC particles and 1.5 wt % single-wall [carbon] nanotubes (SWNTs), as described in the Examples.

Scanning electron microscopy (SEM) images of as-deposited electrode materials prepared according to Example I(a) show loosely packed LNMC (Gr) particles embedded in a homogeneous three dimensional cross-linked fine SWCNT network (FIG. 19A). The SWNT network appeared to consist primarily of either individual nanotubes or small bundles of them. Moderate pressing led to denser packing of the active material particles, reduced porosity of the material, and increased mechanical robustness of the sheet.

Figure 19B:
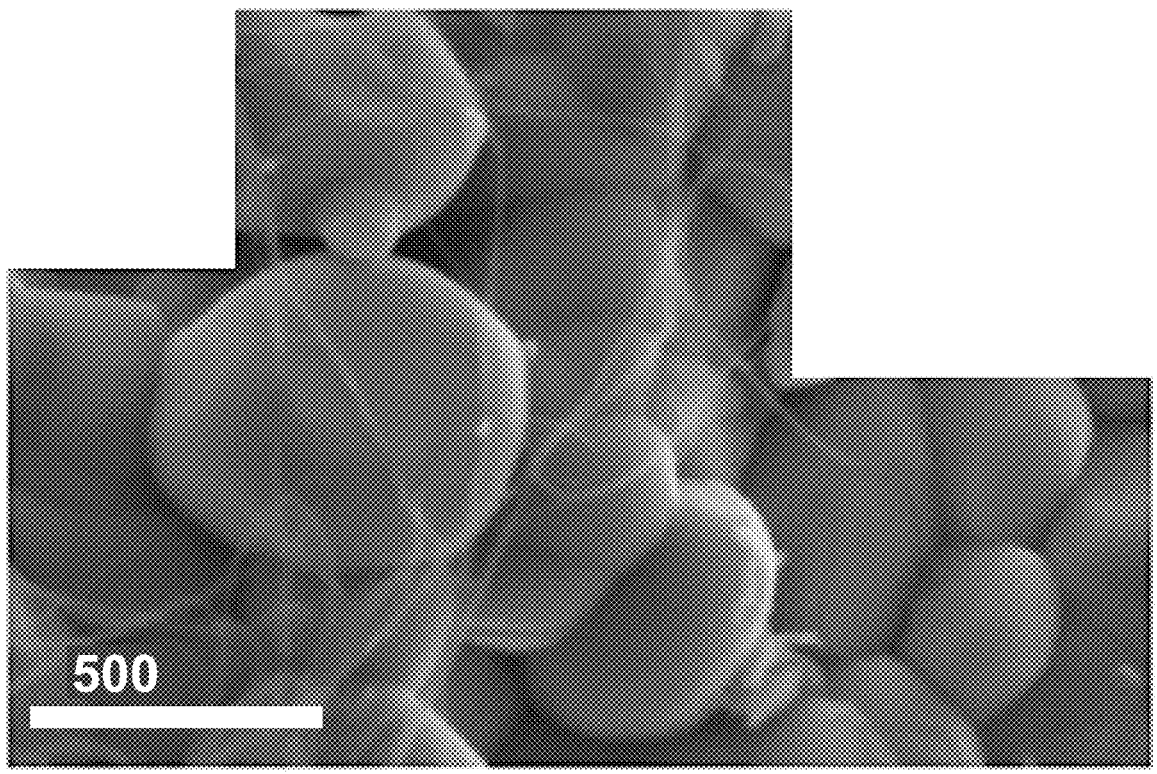
FIG. 19B is an SEM image of self-standing cathodes consisting of LiNMC particles and 1.5 wt % SWNTs, as described in the Examples.
Figure 19C:
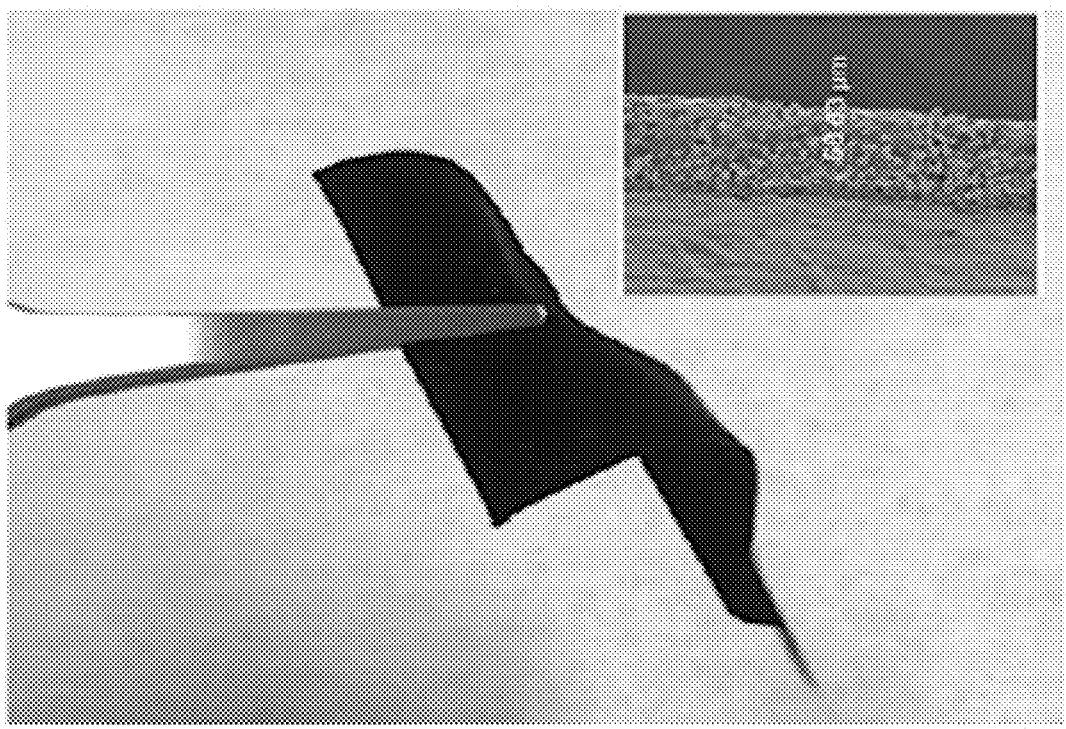
FIG. 19C is an optical image of cathode sheets, as described in the Examples.
Figure 19D:
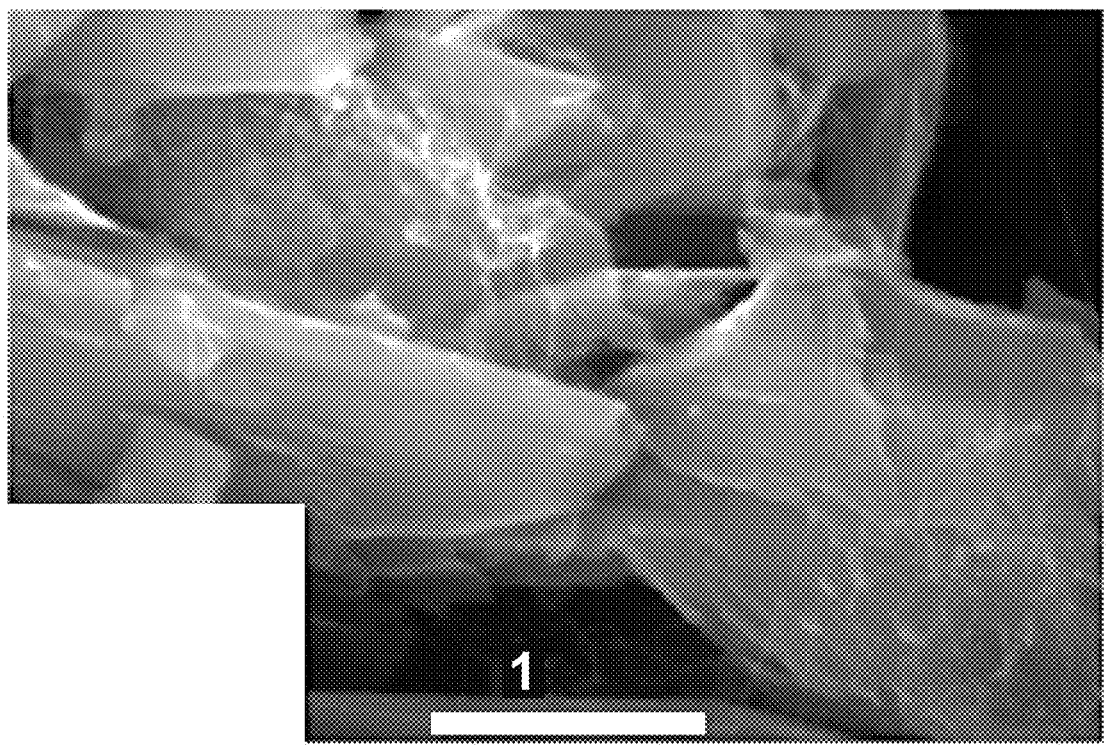
FIG. 19D is an SEM image of self-standing anodes consisting of graphite particles and 11 wt % SWNTs, as described in the Examples.
Figure 19E:
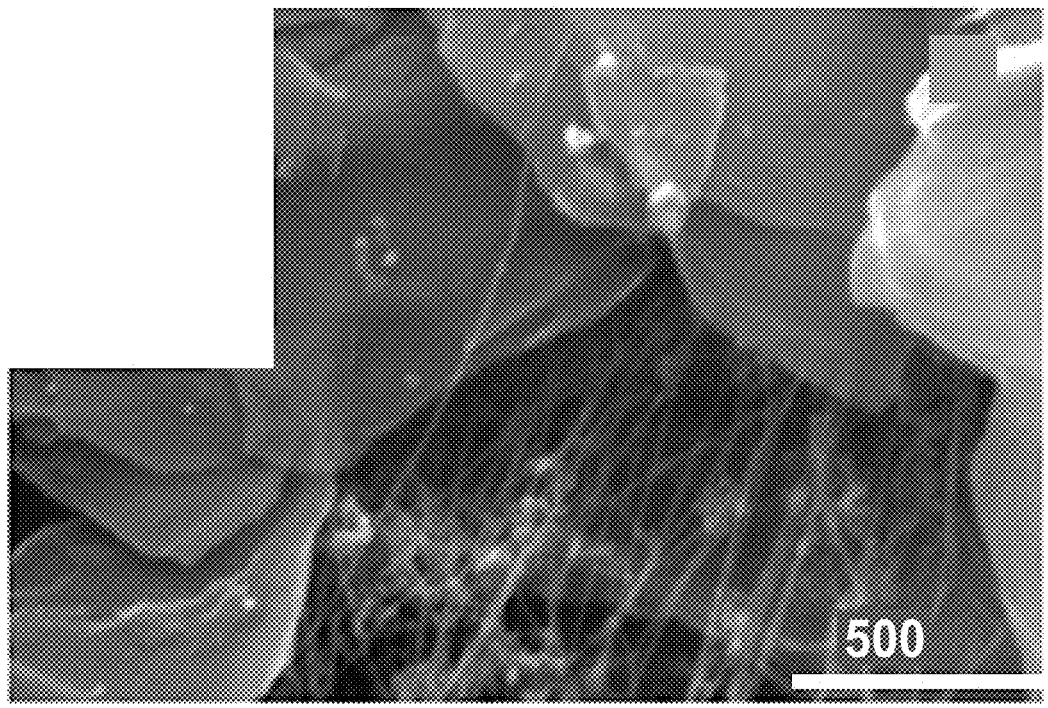
FIG. 19E is an SEM image of self-standing anodes consisting of graphite particles and 11 wt % SWNTs, as described in the Examples.
Figure 19F:
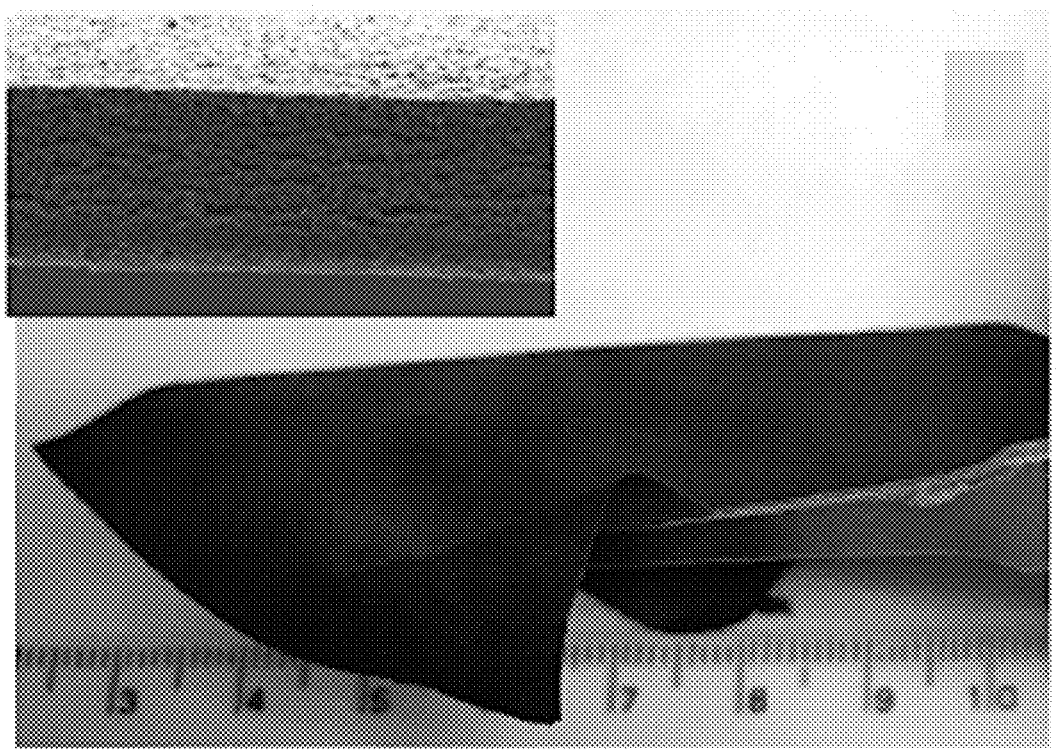
FIG. 19F is an optical image of anode sheets, as described in the Examples.
Figure 19G:
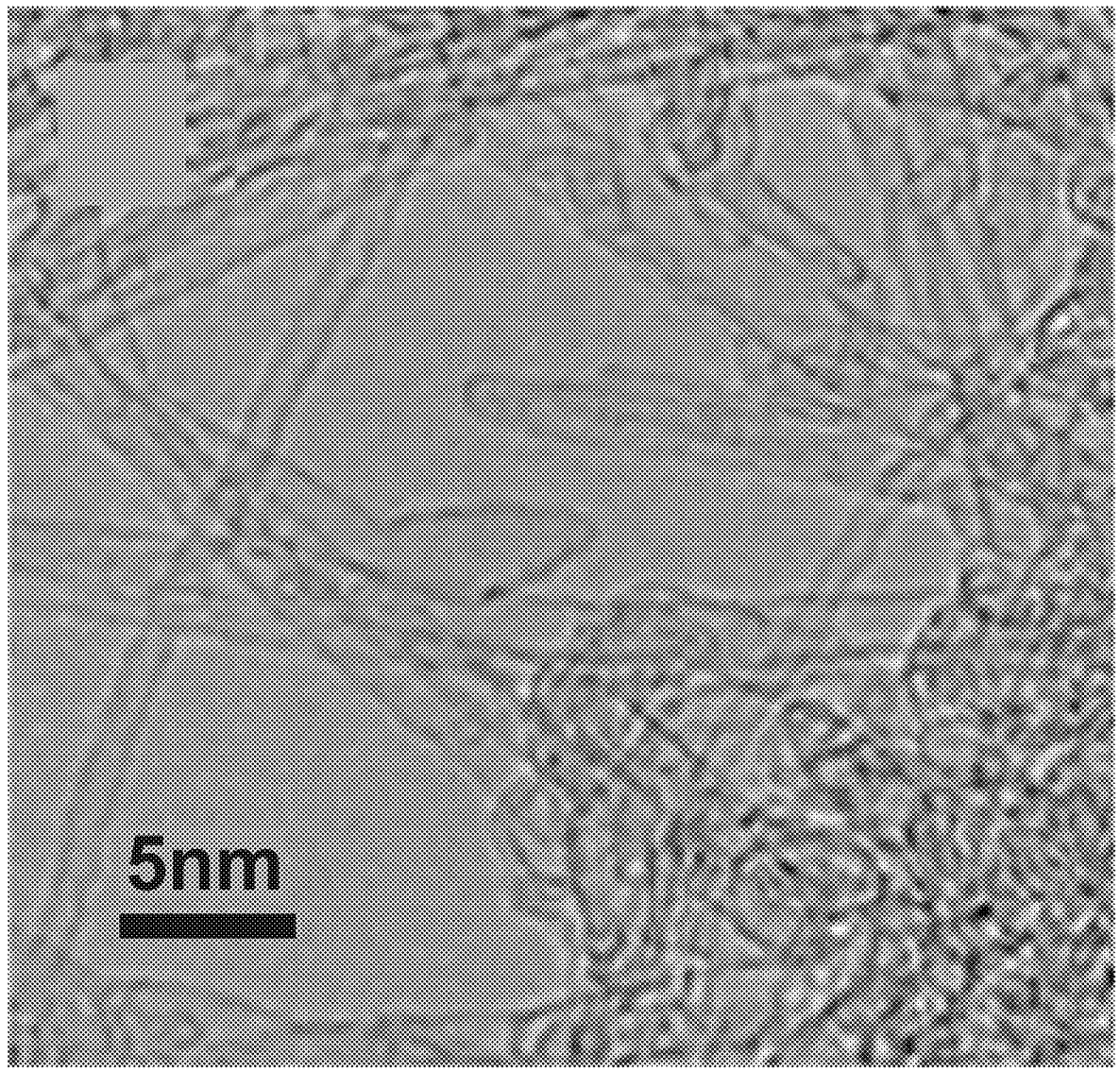
FIG. 19G is a typical TEM image of grown SWNTs, as described in the Examples.

FIGS. 19A, 19B, and 19C show an example of a flexible cathode sheet (NMC powder in 0.5 wt % SWNTs, 68.6 µm thick), while FIGS. 19D, 19E, and 19F_show an example of a flexible anode sheet (graphite flakes in 11 wt % SWNTs, 348 µm thick). The Raman spectroscopy studies confirmed that SWNTs remained intact during self-standing sheet fabrication. Cathode loading reached 170 mg of NMC per $cm^2$, translating to an areal capacity density of 25 mAh/$cm^2$.

Figure 20A:
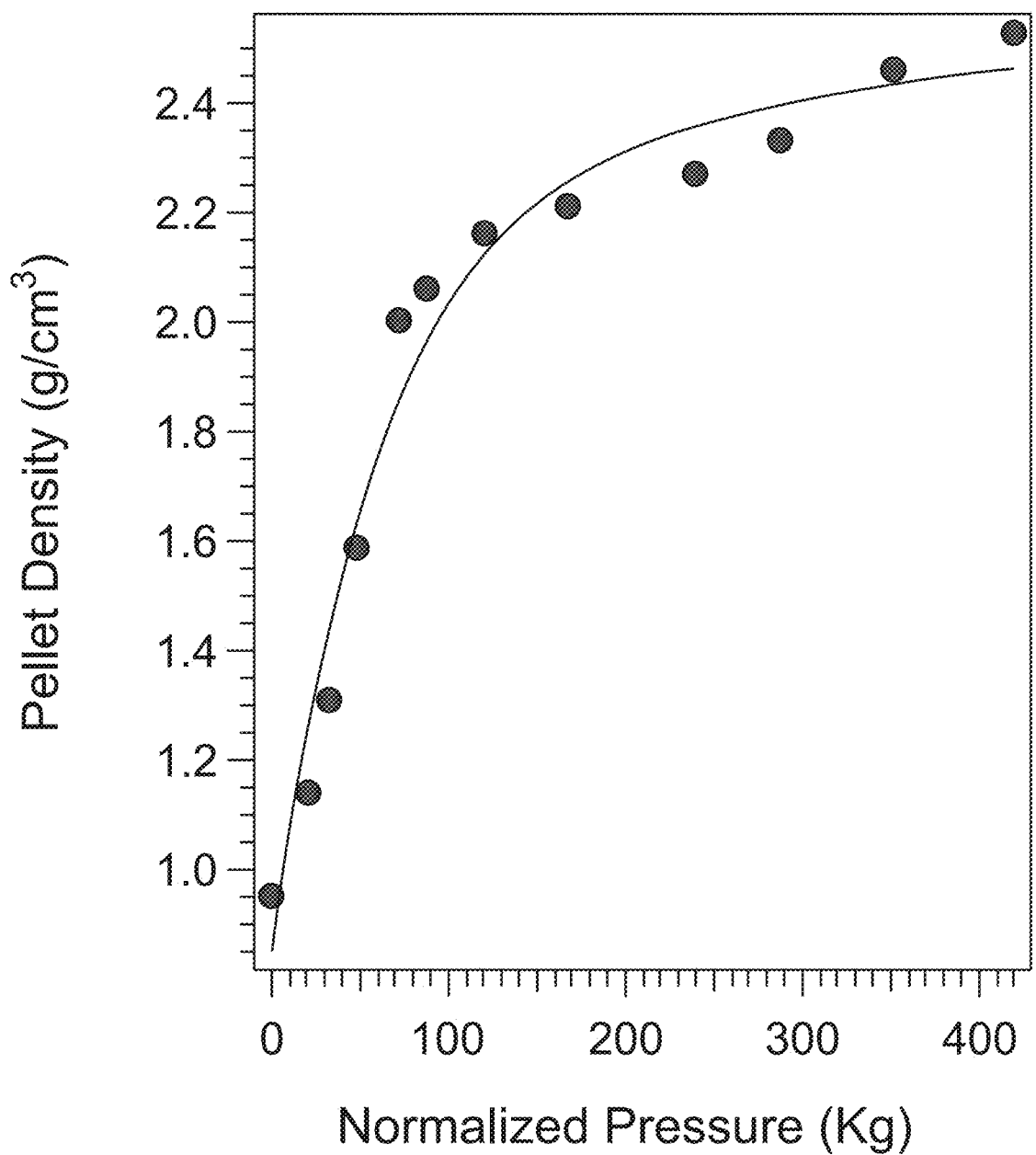
FIG. 20A shows a powder density vs. pressure curve for a composite with 1.1 wt % SWCN, as described in the Examples.
Figure 20B:
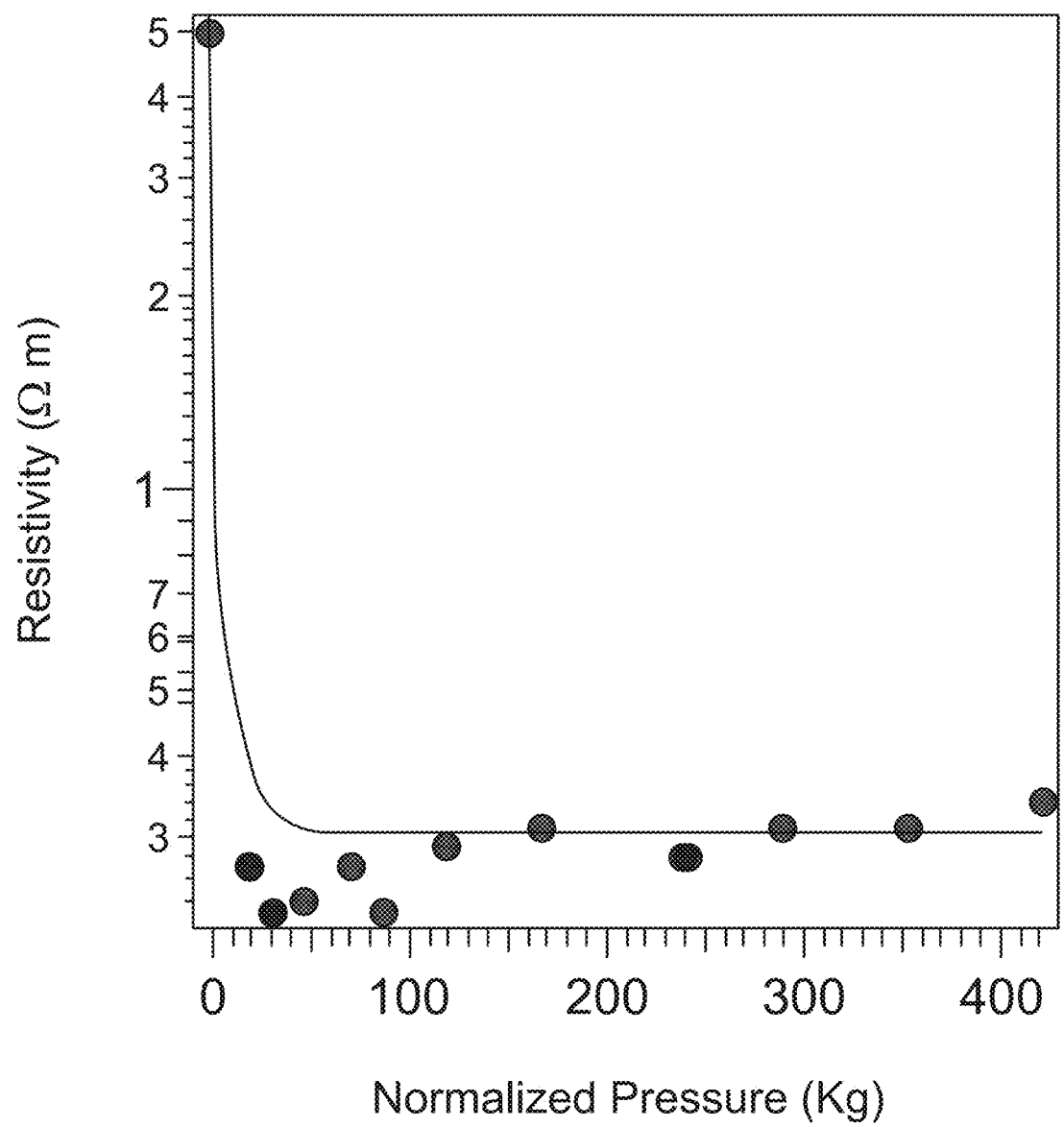
FIG. 20B shows a resistivity curve for a composite with 1.1 wt % SWCNT, as described in the Examples.
Figure 20C:
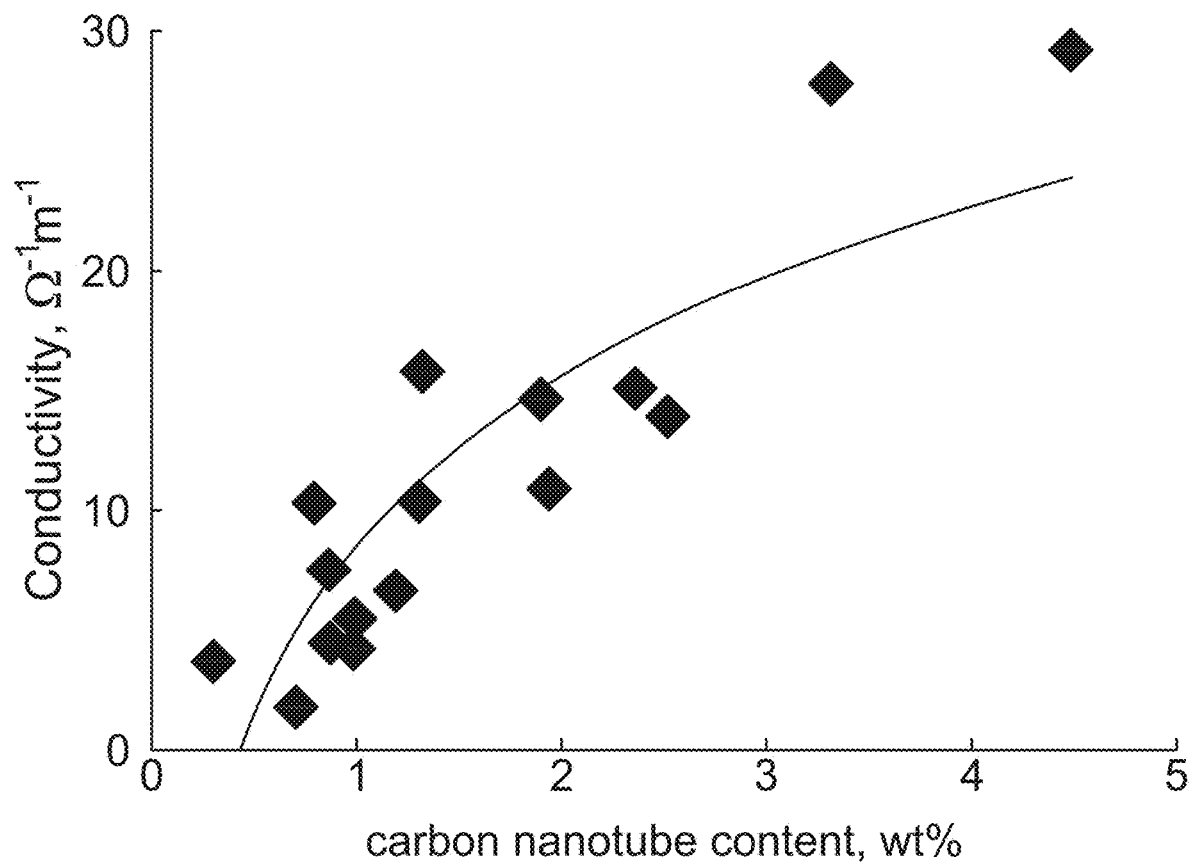
FIG. 20C shows the conductivity of compressed powder pellets depending on SWNT wt %, as described in the Examples.

Example II(a): Measurements of Electrical and Mechanical Properties of Self-Standing Composite Electrode Powder resistivity measurements of the electrodes prepared according to Example I(a) were carried out in situ with a customized die set to compress the powders while measuring their resistivity in a 4-point probe geometry. The probe measured powders under constant pressure with an Applent AT528 micro ohmmeter. The die set consisted of a stainless steel tube of either 10 mm or 5 mm diameter with an insulating ceramic insert tightly fitted within the outer wall. The resistivity was calculated by the equation:

$$\rho = \frac{A*R}{L} = \frac{\pi*\left(\frac{D}{2}\right)^2 *R}{L} = \frac{\pi D^2 R}{4L}$$

where A is the area, R is the resistance, L is the thickness, and D is the diameter of the compressed pellet. Pellet density was calculated by:

$$\rho_w = \frac{\text{Weight}}{\text{Volume}} = \frac{4W}{\pi D^2 R}$$

where W is the weight, L is the thickness, and D is the diameter of the pellet. Typical resistivity vs. pressure and pellet density vs. pressure curves followed a log like behavior as shown in FIGS. 20A, 20B, 20C, where the time interval between sequential pressure data points was 5 minutes.

Electrical resistance of electrode material was measured using a custom setup. The sample was attached by a silver-plated copper clamps, which served as electrical contacts. The same torque was used when affixing samples in the clamps for consistency. The minimal distance between the clamps/contacts was 30 mm. Resistance was measured using a 4-point probe geometry by Applent AT528 micro ohmmeter. One of the clamps was stationary, while the second one was moved by a micrometer screw, thereby stretching the sample. Changes in the sample geometry were tracked and taken into account for sheet resistance and conductivity calculations.

Stress-strain characteristics of electrode materials were measured using Expert 7600 (ADMET) testing machine at 1 mm/sec displacement. The samples were 10 mm wide and placed in the testing machine such that the distance between the clamps was 30 mm.

Example II(b): Electrical and Mechanical Analysis of Self-Standing Composite Electrode The electrical conductivity of electrodes is an important parameter, especially for cathodes, because conductivity of NMC (5:3:2) compressed powder was measured to be about $10^{-2}$ $\Omega^{-1}m^{-1}$. FIGS. 20A-20D show the dependence of electrical conductivity of the NMC and SWNT composite material on the wt % of SWNTs measured using compressed powder pellets. Even at relatively low nanotube concentrations, the conductivity of the composite material became about 100 times higher than conductivity of pristine NMC powder, which was considered to be a percolation threshold. Dependence of electrical conductivity percolation threshold on nanotube properties (e.g., diameter, length, bundle size, and dispersion homogeneity) has been studied intensively, specifically on based of rod models. Although most of the models consider the percolation problem within a 2D frame, it is noticeable that, except for the mentioned parameters, the nature of interaction or connectedness between tubes can markedly amend the percolation threshold. Without wishing to be bound by theory, it is hypothesized that the method as described herein allows exploitation of the intrinsic features of pristine SWNTs without affection by any post-synthesis treatments or presence of residual surfactants.

Figure 20D:
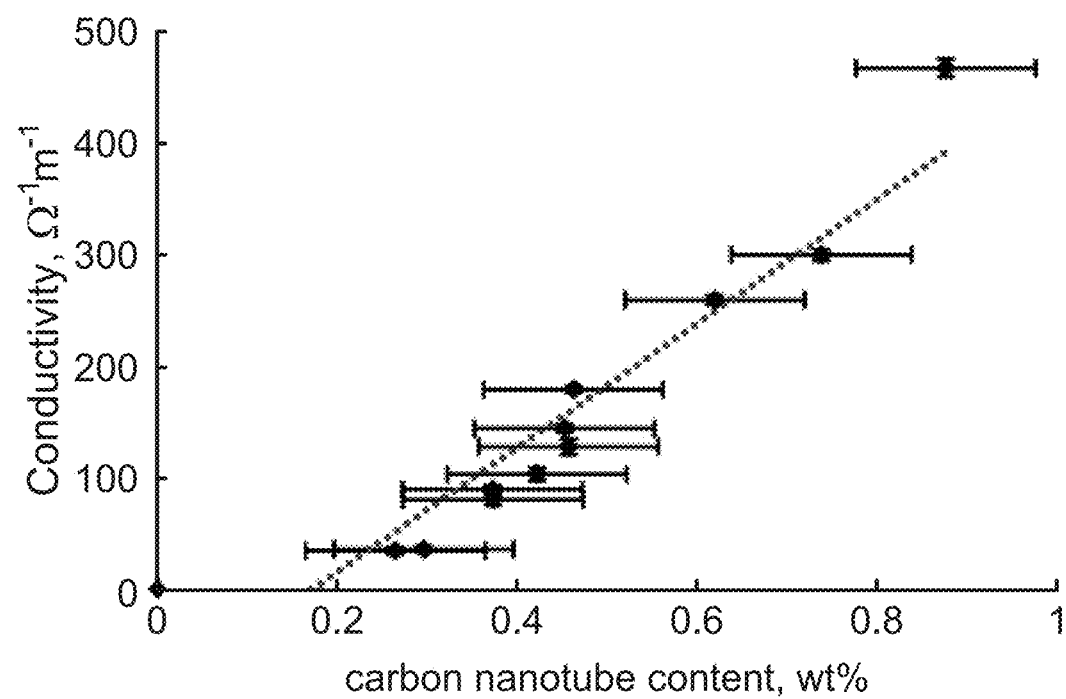
FIG. 20D shows conductivity dependence on SWNT wt % for self-standing composite sheets at low concentration ranges of nanotubes, as described in the Examples.

While using compressed composite powder pellets, the electrical conductivity percolation point was estimated and dispersion homogeneity was confirmed. In battery applications, self-standing composite sheets generally can demonstrate different behavior and even order of magnitude higher conductivity values. Therefore, conductivity dependence on nanotube concentration of the self-standing sheets was also studied (FIG. 20D). It was determined that the self-standing composite sheets demonstrated noticeable higher conductivity (FIG. 20D). The difference was attributed, among other reasons, to the nanotube arrangements in the pressed powder and the sheets.

For battery applications, a low concentration of nanotubes in the electrode sheet is believed to be preferable given that it results in higher gravimetric energy density of the battery. However, self-standing electrodes with a low concentration of nanotubes (ca. 0.25-0.5 wt %) typically possesses a conductivity about $10^{1-2}$ $\Omega^{-1}m^{-1}$ and are typically mechanically weak and prone to irreversible deformation, while electrode sheets with a high concentration of nanotubes (>5 wt %) are mechanically robust, very flexible, and have high electric conductivity ($\geq 10^3$ $\Omega^{-1}m^{-1}$), yet are also very adhesive to various surfaces and thereby hard to process. Based on the above, it was necessary to determine the optimal CNT concentration that satisfies both energy and mechanical requirements.

The thickness of the sheets is another parameter for battery electrodes. In thicker electrodes, the average diffusion distance for Li ions is generally greater than that for thinner ones, often resulting in inferior dynamic performance of the batteries with very thick electrodes and possibly reduced capacity due to underutilization of the inner parts of the electrode. Moreover, during bending of flexible batteries, thicker electrodes generally experience higher differential deformation (stretching on the outer surface and compression on the inner one), which could eventually cause damage during repeated bending. Therefore, a self-standing electrode composition should be optimized considering maximum possible Li-storage value, acceptable electrical conductivity, ease of handling and robust mechanical properties, including tolerance against various mechanical stresses.

Figure 21A:
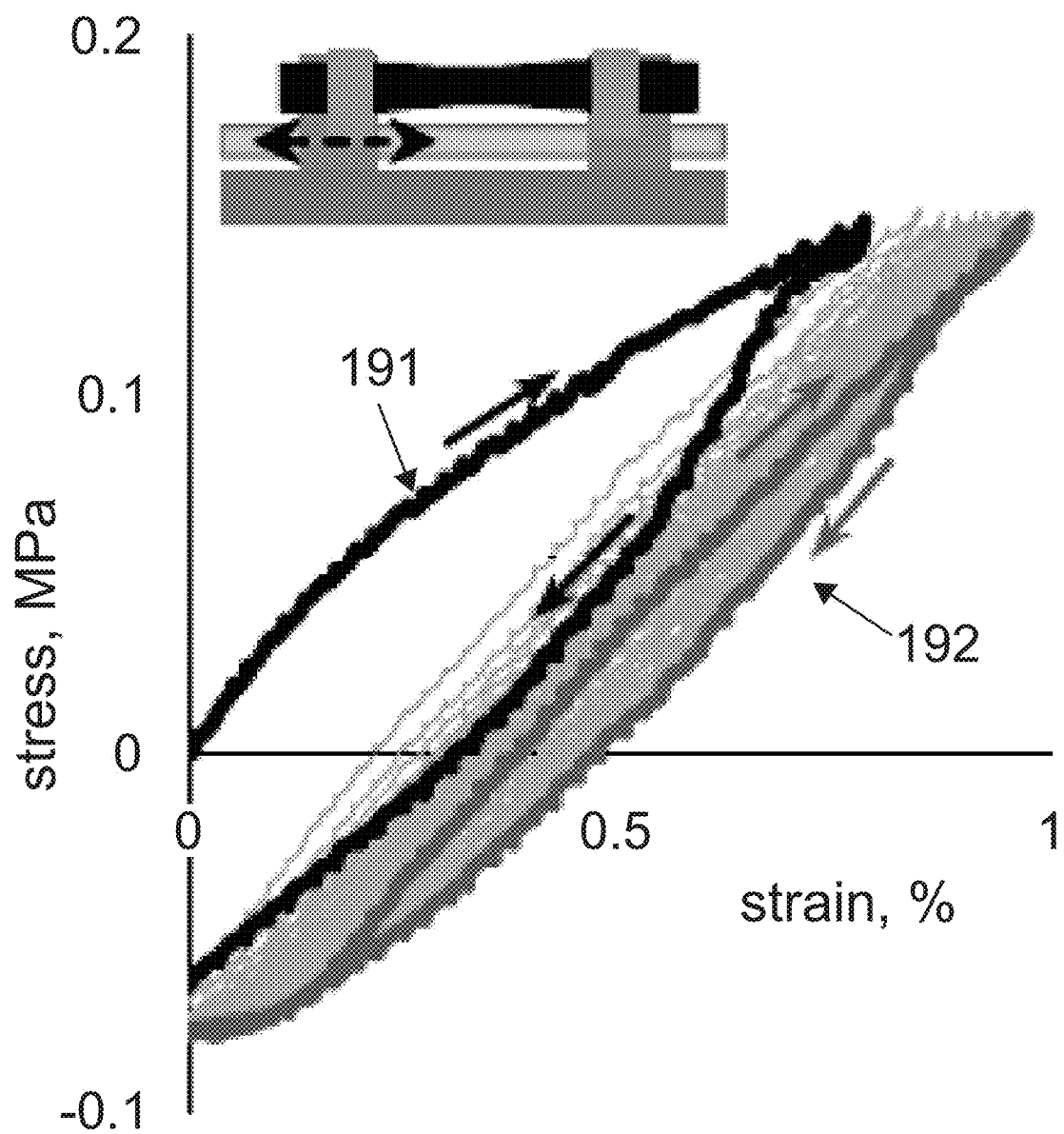
FIG. 21A shows a stress-strain curve for cathode material sheets with 0.9 wt % SWNT, specifically the evolution of hysteresis during twenty-five times strain cycling, as described in the Examples.
Figure 21B:
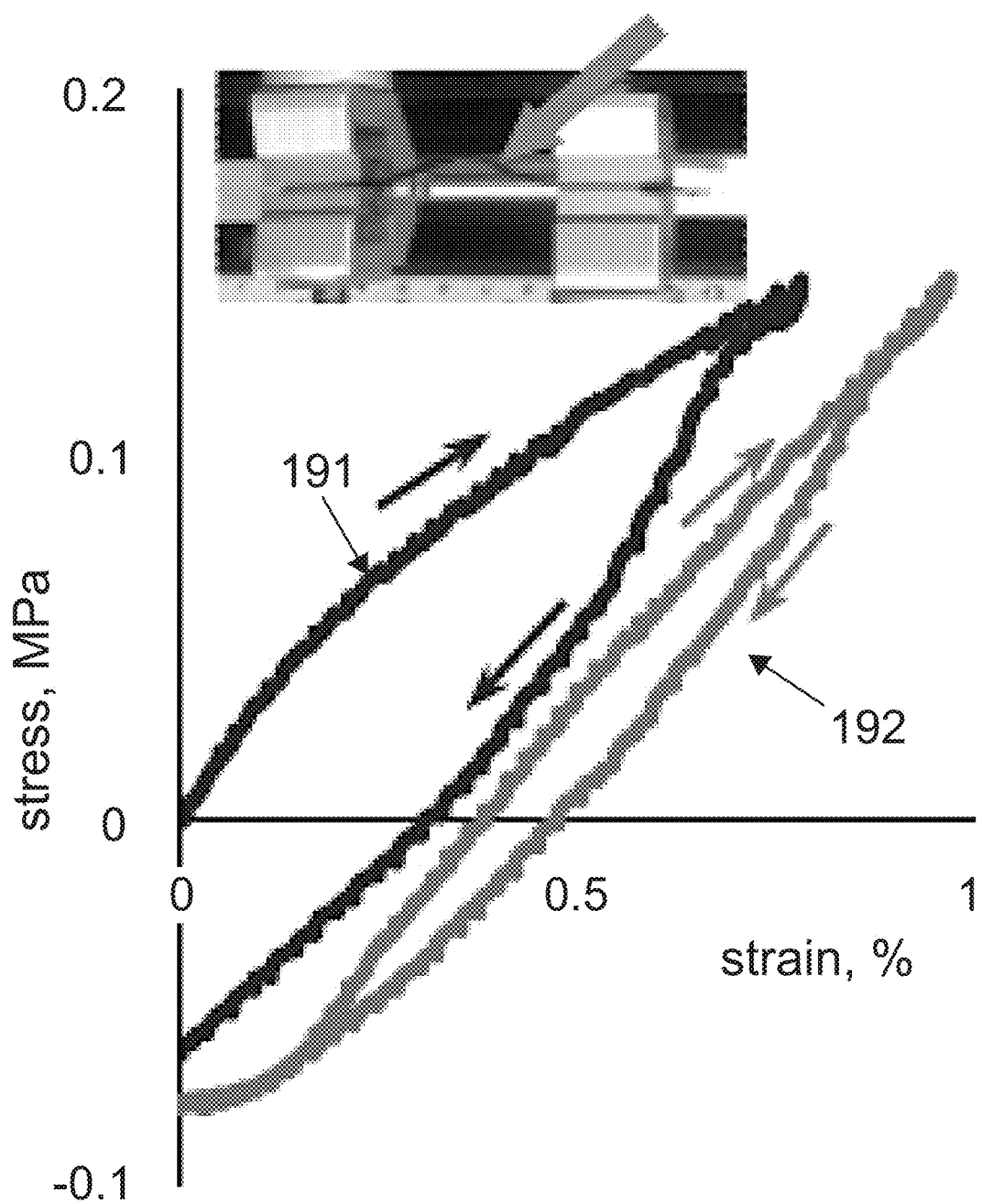
FIG. 21B shows a stress-strain curve for cathode material sheets with 0.9 wt % SWNT, specifically the hysteresis after the first and twenty-fifth strain cycling, as described in the Examples.

Based on the above, mechanical properties of composite sheets having different concentrations of SWNTs and densities as well as the tolerance of their sheet resistance to various mechanical forces were studied as described herein. FIGS. 21A and 21B show examples of strain vs. stress diagrams of self-standing cathode sheets with different nanotube concentrations, densities, and thicknesses, as described herein. FIG. 21B shows a stress-strain curve for cathode material sheets with 0.9 wt % SWNT, specifically the hysteresis after the first strain cycling 191 and twenty-fifth strain cycling 192, as described in the Examples.

Figure 21C:
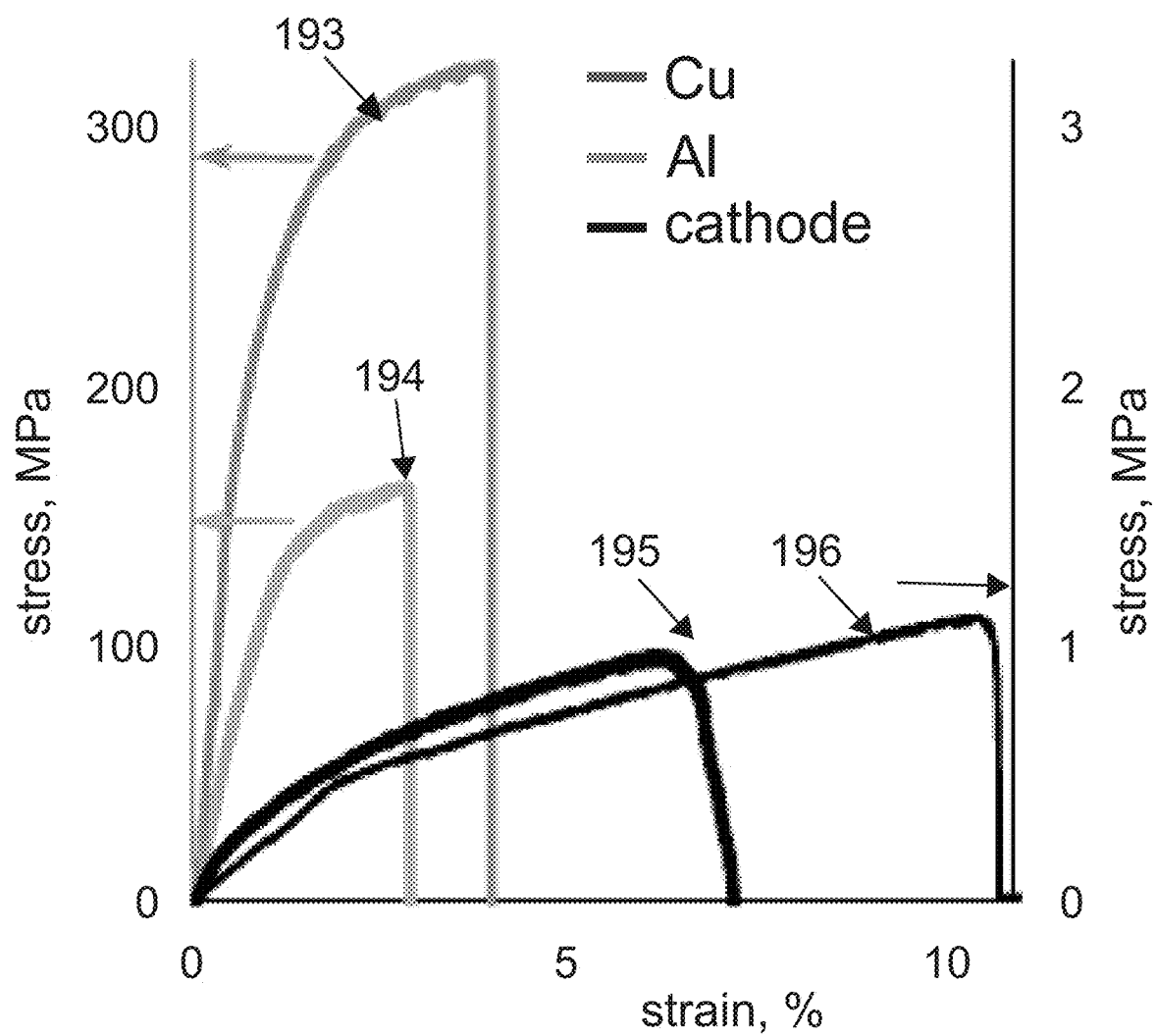
FIG. 21C shows a stress-strain curve for Cu and Al foils and self-standing sheets with 1.8 wt % SWNT, 0.9 g/cm$^3$ (boldest line), and 3.6% wt % SWCNT, 0.74 g/cm$^3$ (thin line), as described in the Examples.

Compared to aluminum and copper foils, which are used as current collectors in commercial batteries, the studied electrode sheets tolerated lower stress but tolerated about twice larger strain, as shown below in Table 1 and also in FIG. 21C. FIG. 21C shows a stress-strain curve 193 for Cu foil and a stress-strain curve 194 for Al foils, a stress-strain curve 195 self-standing sheets with 1.8 wt % SWNT, 0.9 g/cm³, and a stress-strain curve 196 for self-standing sheets with 3.6% wt % SWCNT, 0.74 g/cm³, as described in the Examples For wearable battery electrodes, strain tolerance is important because during bending of the battery, the inside components experience stretching/compression.

TABLE 1

Measured Values of Young Modulus for Self-Standing Composite and Pure Carbon Nanotube Self-Standing Sheets/Buckypapers

| Self-standing sheet | Density (g/cm³) | Young's modulus (MPa) | Tensile strength (MPA) | Strain at fracture (%) | Density (g/cm³) |
|---|---|---|---|---|---|
| LiNMC + 0.9 wt % SWNTs | 1.33 | 28.0 | 0.4 | 5.2 | 1.33 |
| LiNMC + 3.6 wt % SWNTs | 0.74 | 72.7 | 1.3 | 6.5 | 0.74 |
| Graphite + 10.0 wt % SWNTs | 0.7 | 3.7 | 0.1 | 6.0 | 0.7 |
| SWNT/Au nanoparticles buckypaper | | 5.33 | 19.55 | | |
| SWNT buckypaper | 0.65 | 6.48; 293 | 42 | | 0.65 |
| MWNT buckypaper | 0.35 | 1.39; 3.75; 282; 1370 | 11.2; 11.6; 28.7 | 2.2; 8.9 | 0.35 |

The Young modulus for the SWNT-containing composite sheets shown in Table 1 were estimated using the following formula depending on nanotube concentration and density being in the range of 0.9-3.6 wt %, and of 0.7-1.33 g/cm³:

$$E \equiv \frac{\sigma(\varepsilon)}{\varepsilon} = \frac{F/A}{\Delta L/L_0} = \frac{FL_0}{A\Delta L}$$

where σ—is stress, F—is applied force, A—is cross section area of the sheet, $L_0$ and $\Delta L$ are the initial length and elongation, respectively. In an embodiment of a wearable device, a self-standing electrode has a Young modulus of between about 20 and 75 MPa.

As it can be seen in FIG. 21B, the cathode sheet under cyclical load demonstrated hysteresis behavior similar to elastic-plastic tensile behavior. It was observed that this behavior varies depending on nanotube concentration and loading stress. The samples showed both reversible and irreversible extension components. Lower nanotube content samples showed higher plasticity. Samples with higher nanotube content were stiffer than those with low nanotube content. However, after a few cycles, the hysteresis behavior diminished, as the sample "adjusted" to its new conditions.

Figure 22A:
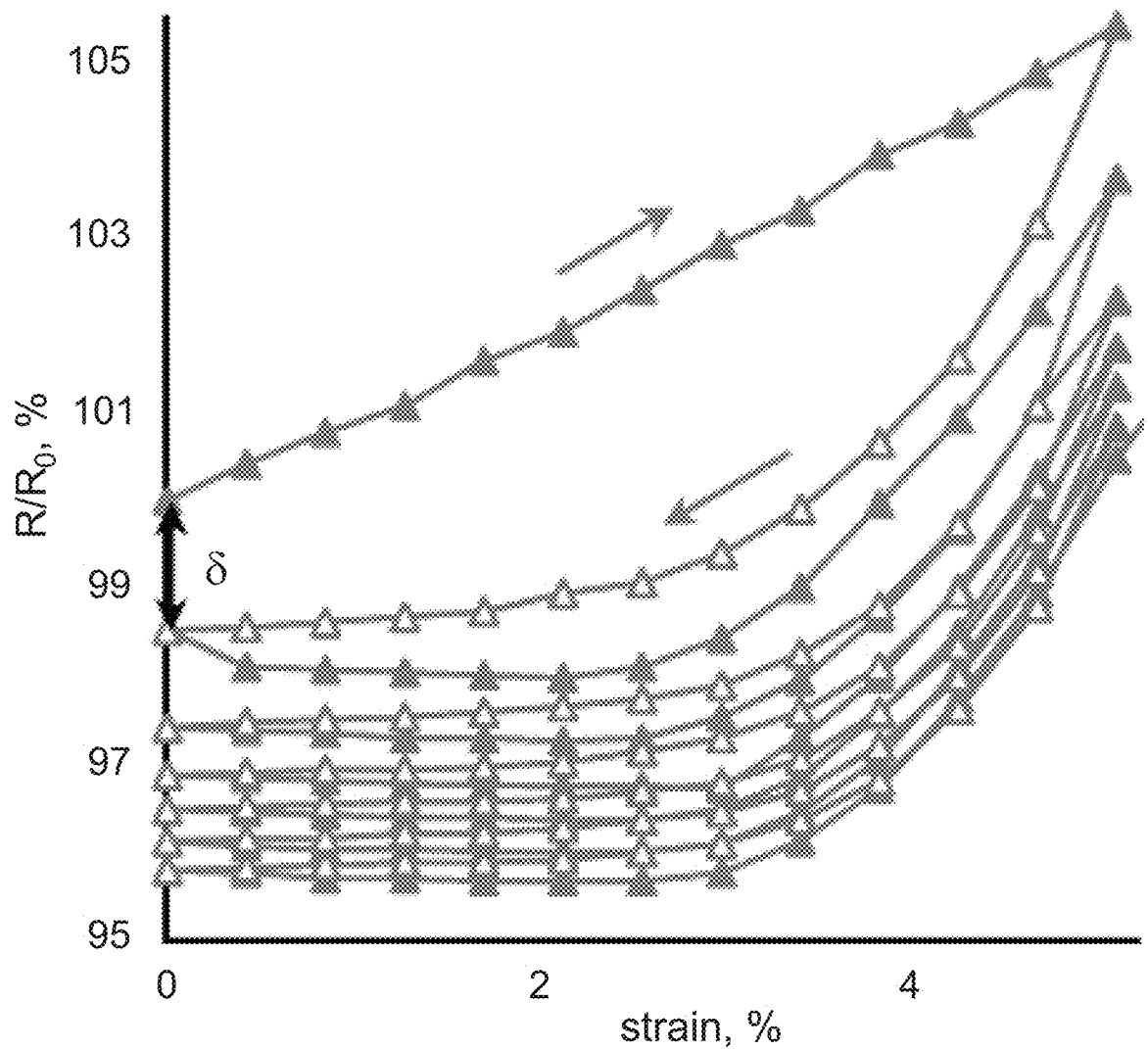
FIG. 22A shows changes in relative resistance during cyclic stretching, as described in the Examples.
Figure 22B:
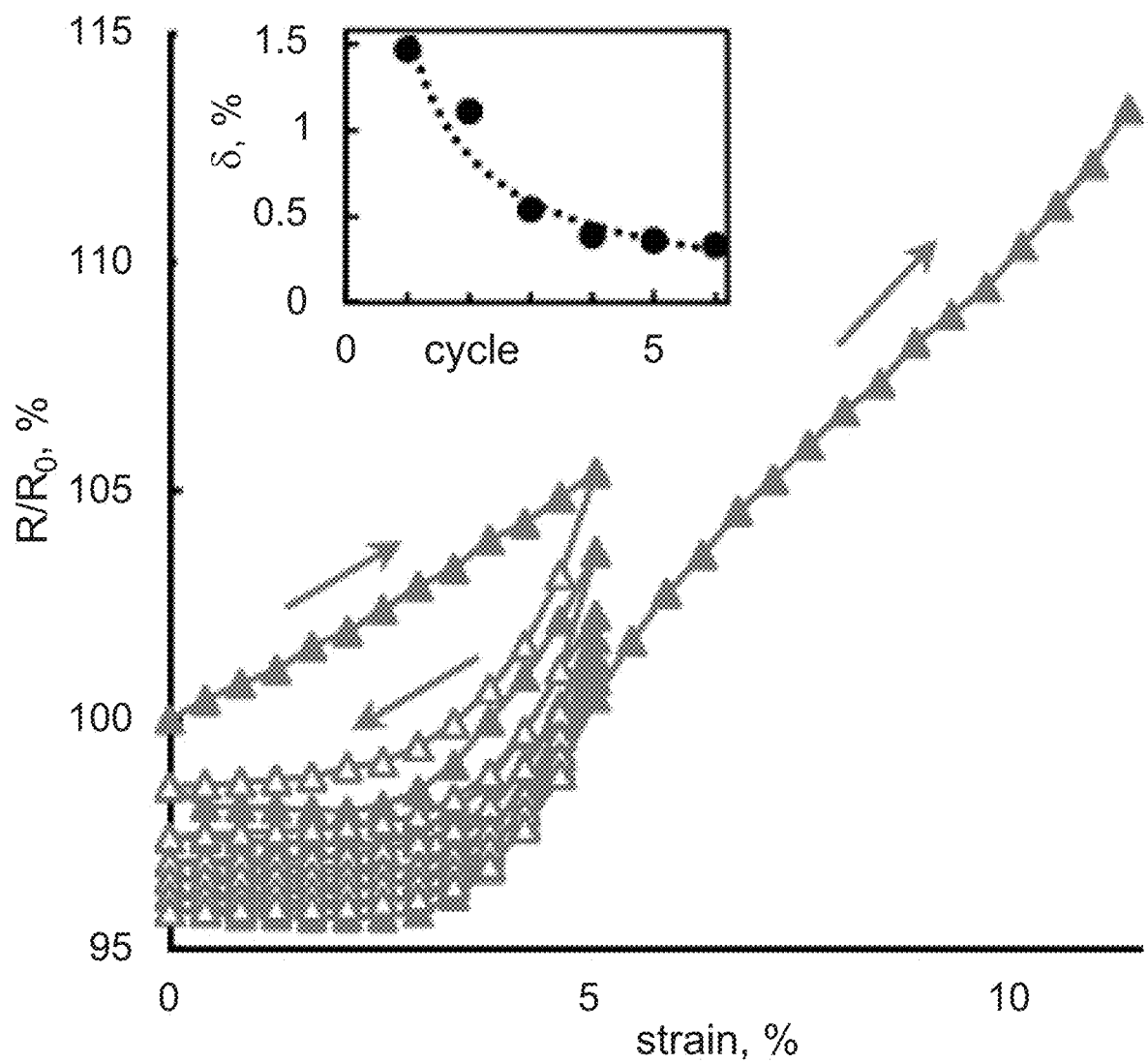
FIG. 22B shows changes in relative resistance during cyclic stretching, as described in the Examples.
Figure 22C:
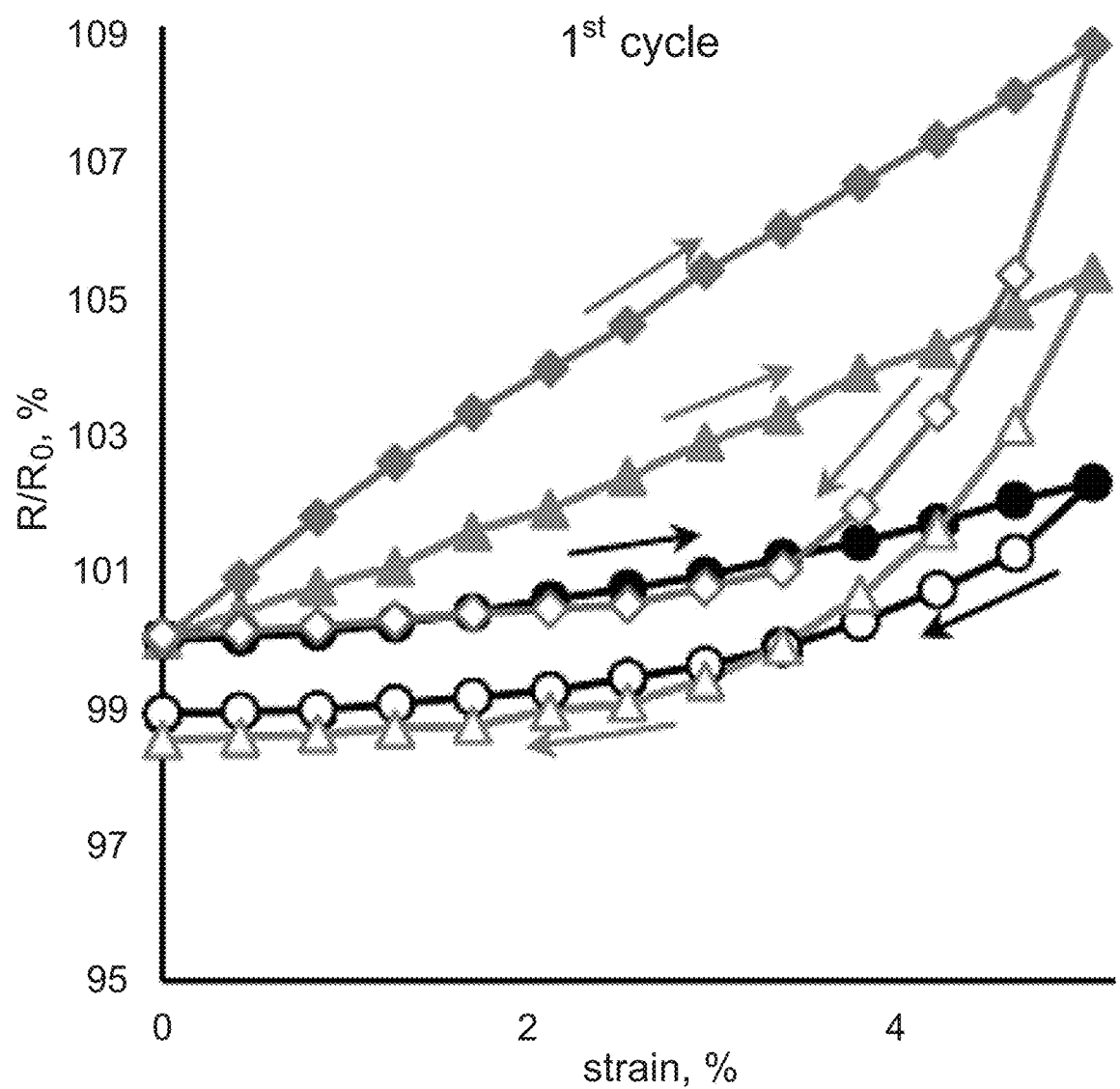
FIG. 22C shows changes in relative resistance during cyclic stretching, specifically the first stretching cycle as a function of the sample density, as described in the Examples.
Figure 22D:
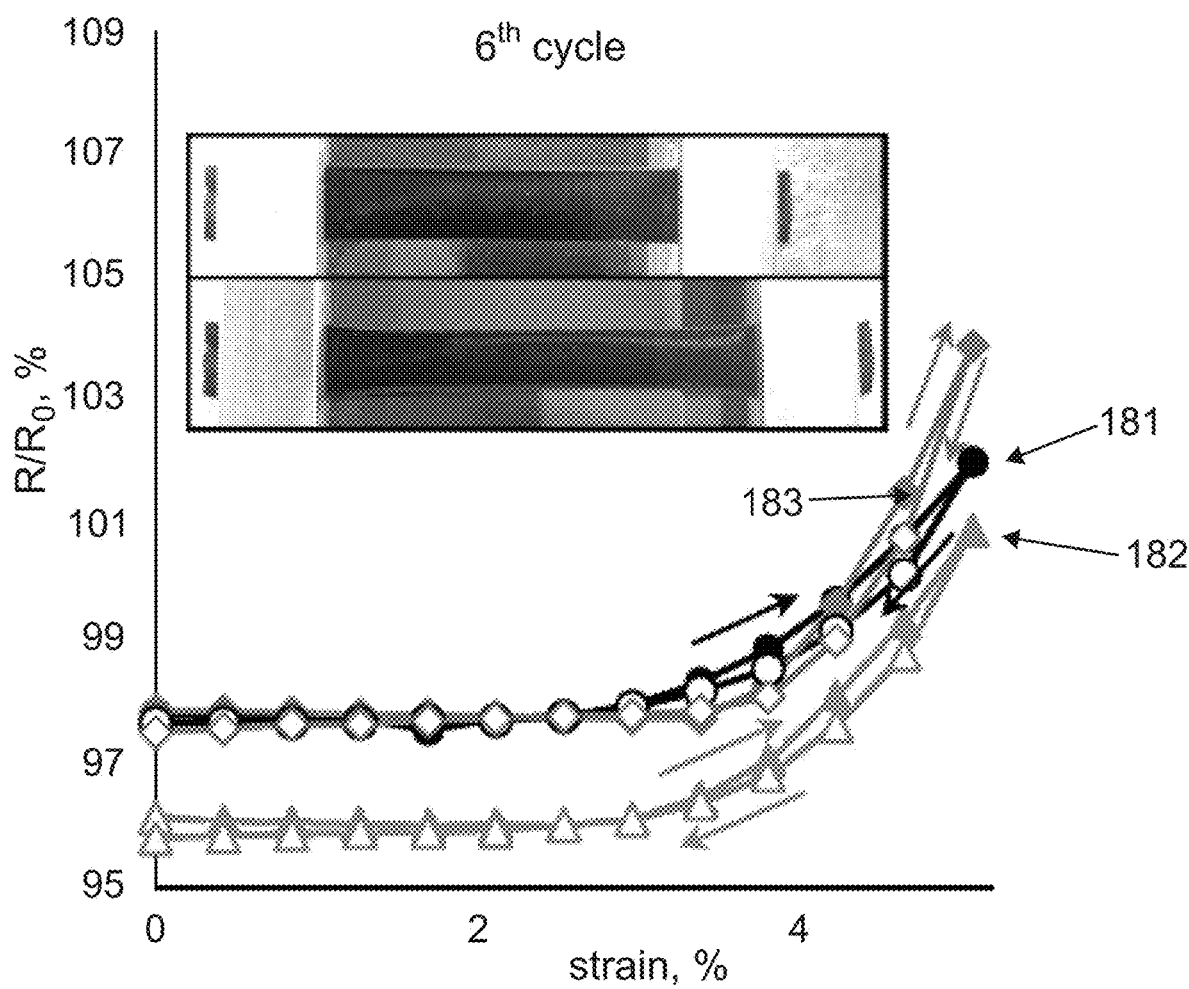
FIG. 22D shows changes in relative resistance during cyclic stretching, specifically the last stretching cycle as a function of the sample density, as described in the Examples.

The electrical resistance of sheets with various SWNT concentrations subjected to mechanical stresses was also studied, as shown in FIGS. 22A-22D. In these experiments, the electrode material was stretched at about 2 μm/sec on average, and most samples survived 10-15% elongation before they broke (FIGS. 22A and 22B), significantly more than only 5-6% breaking strain observed in experiments on the stress-strain testing machine, where they were stretched much faster at 1000 μm/sec. Cyclic resistance vs. strain measurements showed distinct hysteretic behavior of the electrode sheets. It is believed that the hysteresis parameters (not reversible resistance and length) depends not only on the nanotube content, but also on the degree of compression of the sample sheet. For example, the sample which was compressed to 2 g/cm³ density showed a much higher rate of the resistance increase during stretching and wider hysteresis than the same sample compressed to 1 g/cm³, and much wider than the "as deposited" sample (ca. 0.4 g/cm³) (FIG. 22C). After several cycles, the hysteresis became almost negligible for all samples (FIG. 22D), presumably as the composite material (and its SWNT network) adjusted to the new dimensions. In FIG. 22D, the circles 181 indicate "as deposited" sample, ca. 0.4 g/cm³ ($R_0$=42.46Ω, for 1 g/cm³ sample $R_0$=33.35Ω, for 2 g/cm³ sample $R_0$=31.11Ω); the triangles 182 indicate the sample compressed to 1 g/cm³ prior to stretching; the diamonds 183 indicate 2 g/cm³. The photo insert in FIG. 22D shows a cathode sample before and after stretching. Stationary and movable silver-plated copper clamps serving as electrical contacts are also visible.

It is noteworthy that the resistance of all samples which were stretched and released was slightly lower than the initial resistance, presumably to some ordering (and possibly cross-linking) of the nanotube network along the stretching axis. Multiple stretching cycles seemed to reinforce this effect. This is in contrast to previous studies that reported on resistance-strain behavior of carbon nanotube thin films deposited on polymeric substrate. In some previous studies, the electrical resistance of CNT thin films also exhibited a hysteretic dependence on strain under cycling loading, but the hysteresis shape was very different, and the resistance of the CNT film only increased, and never decreased, even after relaxing of the sample. It is believed that this difference in behavior may be due to the fact that the sheets as described herein are self-standing (i.e., the CNT network is the only thing keeping them together, requiring no substrate) and include three dimensional well-dispersed networks of pristine nanotubes. These networks, when compressed or stretched, can re-orient, cross-link, and bundle, thus increasing the number of electrical contacts and consequently increasing electrical conductivity. In general, conductivity of the self-standing electrode sheets increases with increase of the sheet density, until it approaches the bulk density of the active material, after which it typically starts to decline, presumably because during pressing active material particles collide and start to disrupt CNT network.

Bulk density of NMC powder was measured to be 2.79±0.1 g/cm³, while its crystal density measured using Archimedes' principle was 4.56±0.1 g/cm³. Near the bulk density the sheets started to become brittle, therefore this represents the practical upper limit for the NMC-CNT cathode density. Graphite-CNT anodes typically become fragile past ca. 1.1 g/cm³.

Example III(a): Battery Assembly and Performance Evaluation

For pouch cell battery assemblies, sheets with optimized characteristics as described in Examples I and II were cut to the required size and tabs were attached to the self-standing collector-free sheets. Freestanding cathodes were matched to freestanding anodes based on the amounts of the active materials and their theoretical capacities. Upon attaching the tabs, pouch cells were assembled using the prepared electrodes, Celgard 2325 separator of 25 μm thickness, and LP71 electrolyte (1M $LiPF_6$ in EC/DEC/DMC, 1:1:1 mixture by volume, BASF).

The rate test cycling was performed using Parstat MC (Princeton Applied Research) potentiostat between the cut-off voltages of 3.0 V and 4.3 V. Charging was done at 0.2 C; discharge was done at 0.2, 0.4, 1, 2, 5, 7, 10, 20, 30, 50 C.

Performance of flexible cells subjected to mechanical stress was tested using the following procedure: after 10 cycles of 0.2 C charge and 0.2 C discharge, the cell was bent over a one-inch diameter rod, then bent in the opposite direction over the same rod. This was repeated 10 times. Then another 10 cycles of 0.2 C charge/discharge were performed. Then another 10 bends back and forth were done, and then the procedure was repeated.

Example III(b): Battery Assembly and Performance Evaluation

Figure 23B:
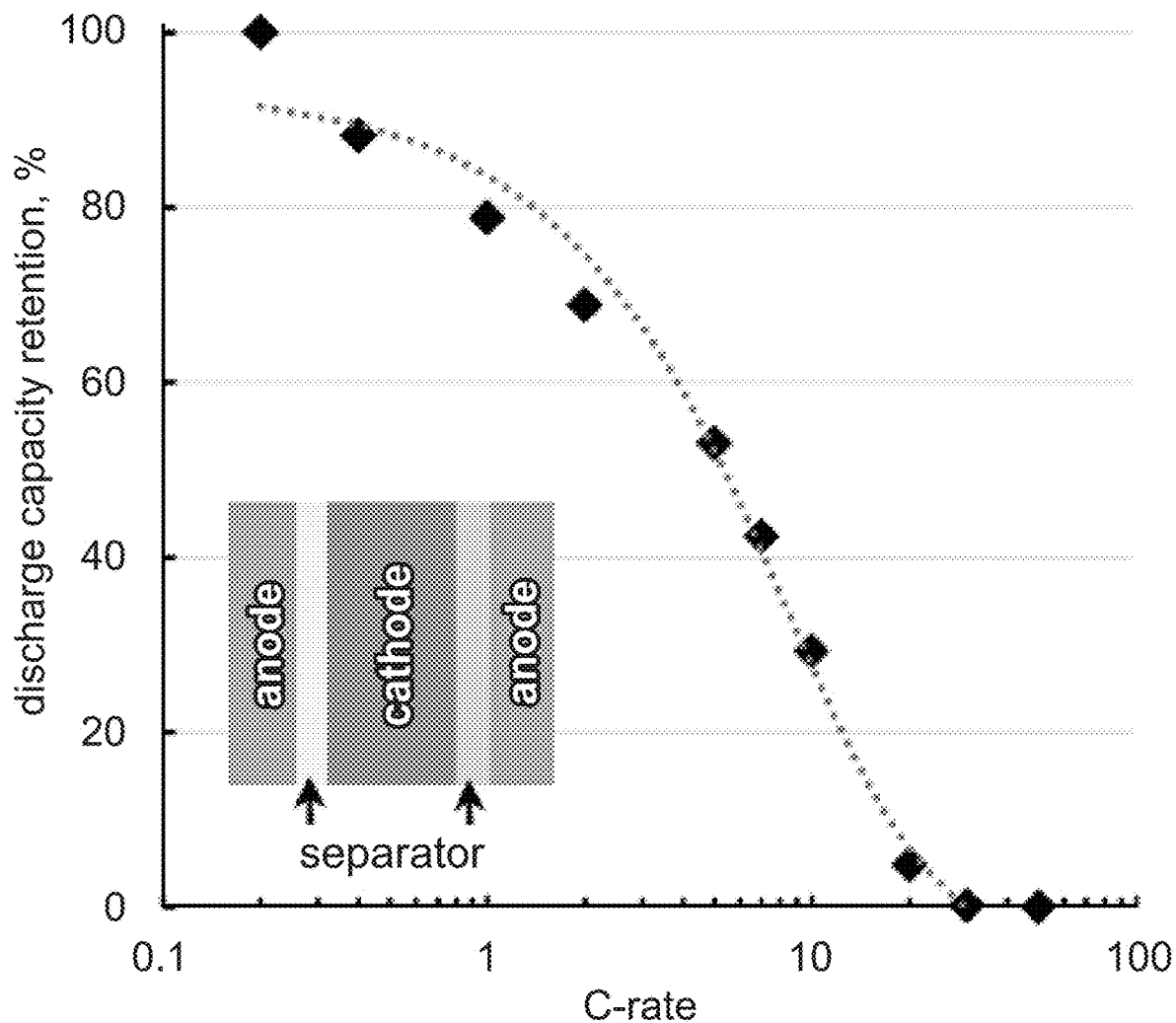
FIG. 23B shows the normalized discharge capacity of a single cathode (2.3% CNT) and double anode cell, as described in the Examples.
Figure 23C:
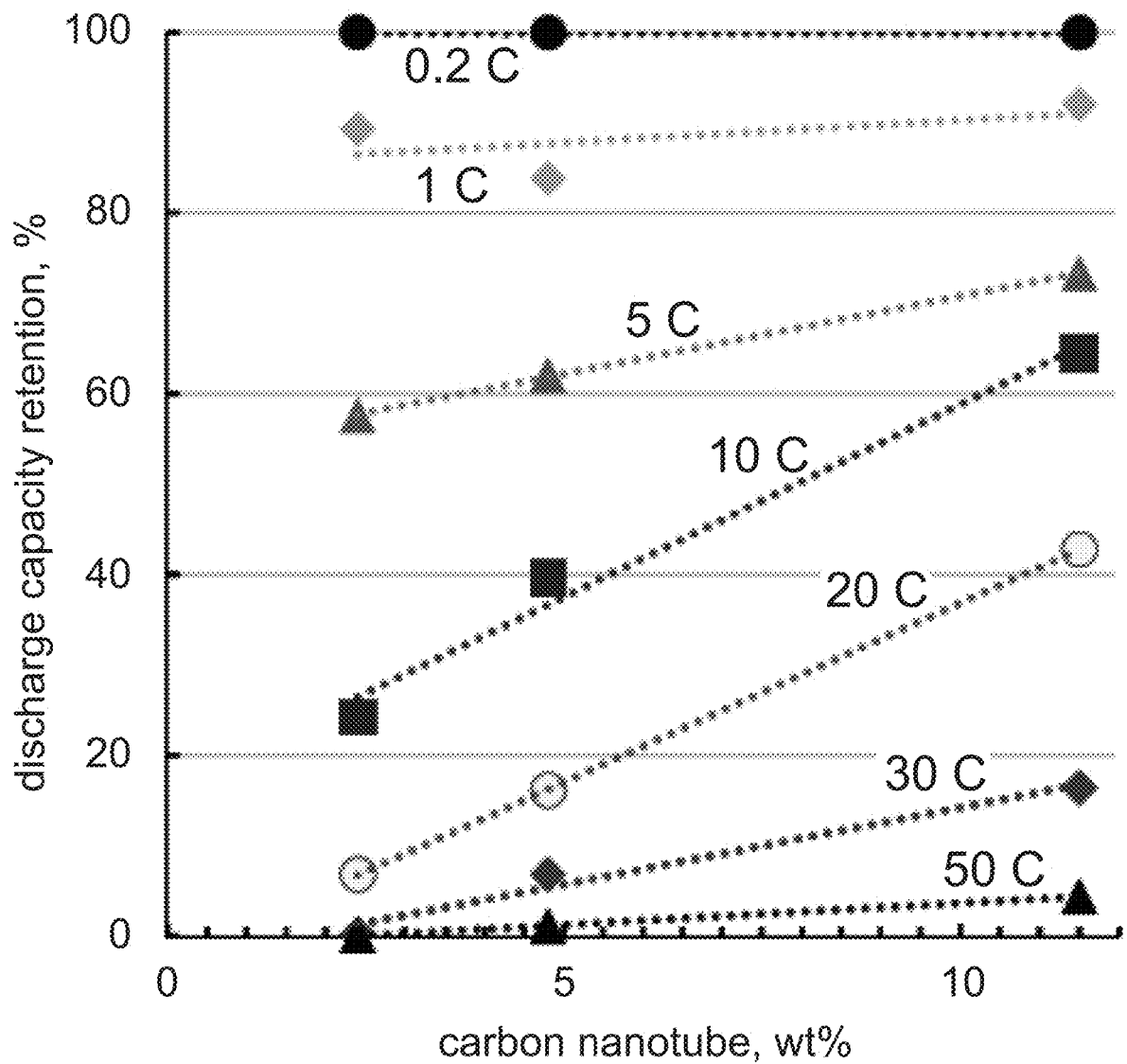
FIG. 23C shows a discharge capacity of the cells normalized to the capacity of the cell during the first full discharge cycle at 0.2 C as a function of the nanotube percent and discharge C-rate, as described in the Examples.

Two cell configurations were tested: single self-standing collector-free cathode (FIG. 23A) and single self-standing collector-free cathode with two anodes on both sides (FIG. 23B). In FIGS. 23A and 23B, open triangles indicate charging performance, and diamonds indicate discharge performance. It was observed that the self-standing collector-free cathodes with a nanotube concentration of wt % and thickness of 0.1-0.3 mm demonstrated high C-rate tolerance and retained about half of their capacity (compared to that at 0.2 C) at 5 C-rate, and retained some capacity even at 20 C (FIG. 23C). Based on these results, cells with both self-standing and collector-free cathode and anode were selected and assembled.

Figure 23D:
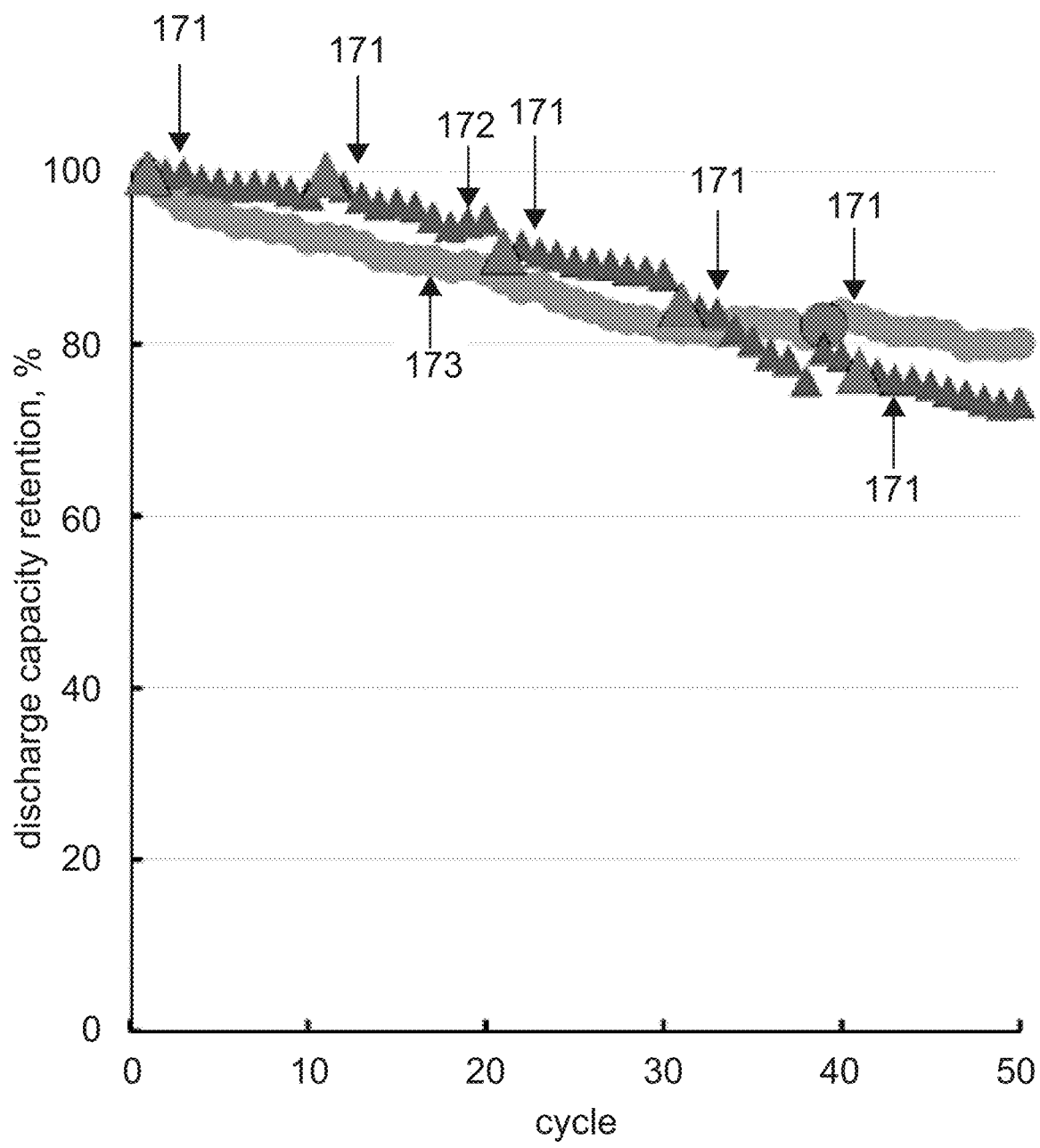
FIG. 23D shows a normalized discharge capacity of flexible full cells (percent of initial value) with collector-free, free-standing cathodes and anodes, as described in the Examples.

FIG. 23D shows the electromechanical performance of the cell (5.3 wt % SWNT in 0.18 mm thick cathode, 16.6 wt % SWCNT in 0.2 mm thick anode) that was tested while subjected to mechanical stress as described in Example III(a). In FIG. 23D, symbols 171 indicate the cycles when the cell was subjected to mechanical stresses. The cell marked with triangles 172 was subjected to mechanical stress every 10 cycles, while the cell marked in circles 173 remained undisturbed most of the experiment. The insert shows impedance of the cell before and after cycling. Performance of the flexible battery subjected to regular mechanical stress was almost identical to that of a similar battery which remained undisturbed during most of the experiments (FIG. 23D). It is believed that the observed performance detrimental effect on the cycling stability primarily was attributed to inefficient encapsulation by commercial packaging film for conventional cells, which provided insufficient compacting of electrodes to the separator membrane.

Figure 24A:
FIG. 24A shows a pouch full cell flexible battery powering LED while being bent, as described in the Examples.
Figure 24B:
FIG. 24B shows a pouch full cell flexible battery powering LED while being bent, as described in the Examples.
Figure 24C:
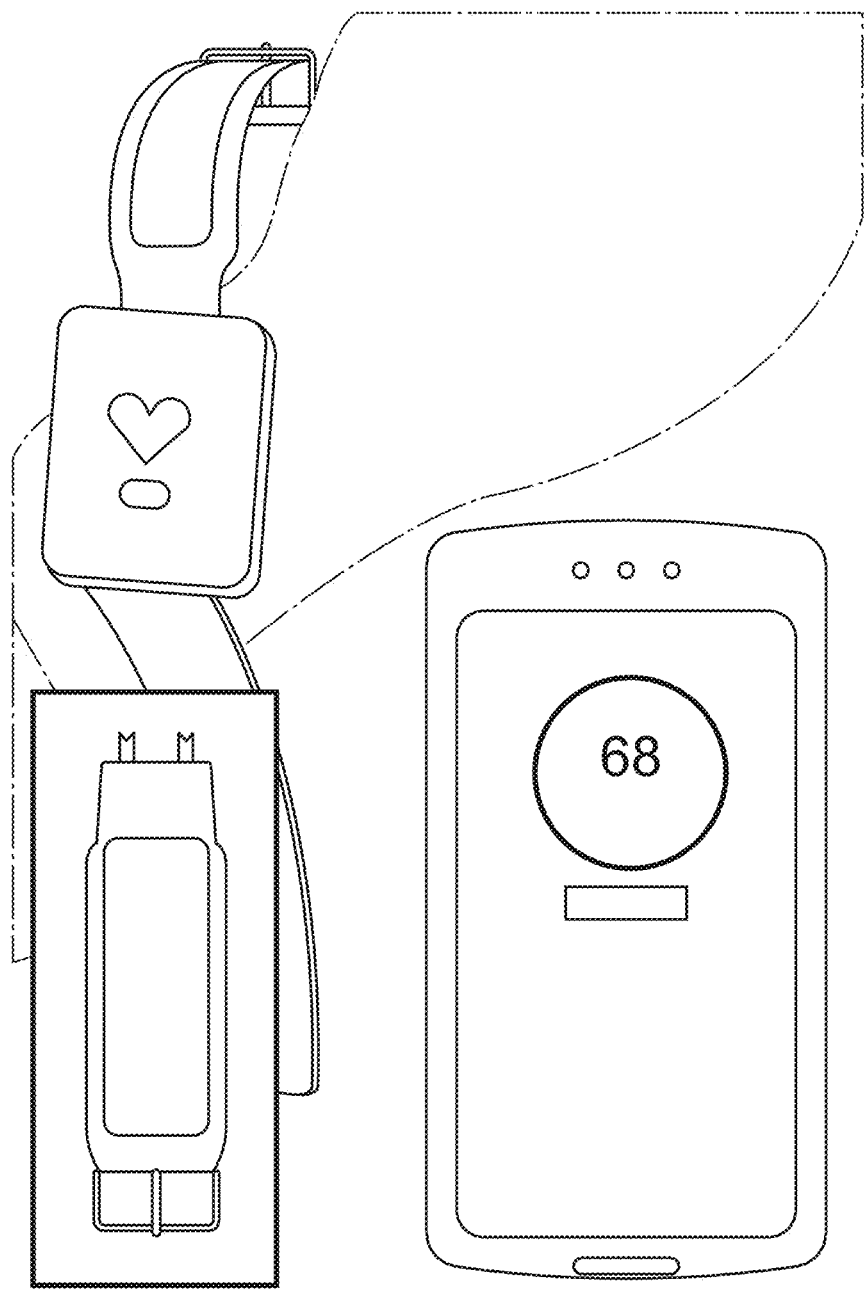
FIG. 24C shows a wristband shaped flexible battery powering a commercial smartwatch, as described in the Examples.

To demonstrate feasibility of the battery architecture as described herein, a flexible battery shaped as a wristband was fabricated and used to power a commercial smartwatch. The watch featured a heart rate monitoring sensor, was capable of transferring data to a cellphone via Bluetooth (FIG. 24C), and came with a power source of 3.7 V and 250 mAh. As shown at FIGS. 24A-24C, a battery as described herein successfully charged via the watch's USB charger, start and ran the watch, operated the sensor, and transferred data to the cellphone.

Example IV: Conclusions

Based on Examples I-III, it was concluded that the novel mixing process of as-grown floating SWNTs and aerosolized battery active material powders as described herein produced self-standing, binder free, flexible electrode composite sheets. The method provided an exceptionally homogeneous dispersion of pristine carbon nanotubes throughout the composite material. As a result, even at the low loading of nanotubes (~0.3 wt %), electrical conductivity of the material was $10^{1-2}$ $\Omega^{-1}m^{-1}$, increasing to $10^{3-4}$ $\Omega^{-1}m^{-1}$ past 5 wt % CNT.

The material showed a high tolerance against various mechanical stresses. The strain vs. stress results suggested a Young modulus in the range of 20-75 MPa depending on the nanotube concentration, and breaking strain of up to 10-15% breaking strain at 2 μm/sec extension rate.

The electrical resistance vs. strain graphs demonstrated hysteresis behavior for initial cycles, however, after 5-6 cycles, the hysteresis became negligible, demonstrating high conformity of the material.

It was concluded that the suitable parameters for the NMC-CNT freestanding cathodes may include 0.5-5 wt % SWNT, 1-2.3 g/cm$^3$ density, and 0.05-0.5 mm thickness. Gr-SWNT freestanding anodes may include 2-20 wt % SWNT, 0.5-1.1 g/cm$^3$ density, and 0.05-0.5 mm thickness. The application of such self-standing sheets as electrodes may create batteries without metal current collector foils and binders, thus eliminating electrochemically inactive components from battery structure. Therefore, such batteries are capable of approaching the limits of specific energy density values imposed by the Li-storage active material, e.g., NMC powder.

The wristband shaped flexible battery fabricated by this technology was demonstrated to successfully power a commercial smart watch with heart rate sensor and wireless data transfer capabilities. The fabrication of self-standing electrodes and proposed current collector and binder free battery architecture as described herein may therefore be used to provide secondary flexible batteries with a high energy density for wearable electronics.

Figure 25:
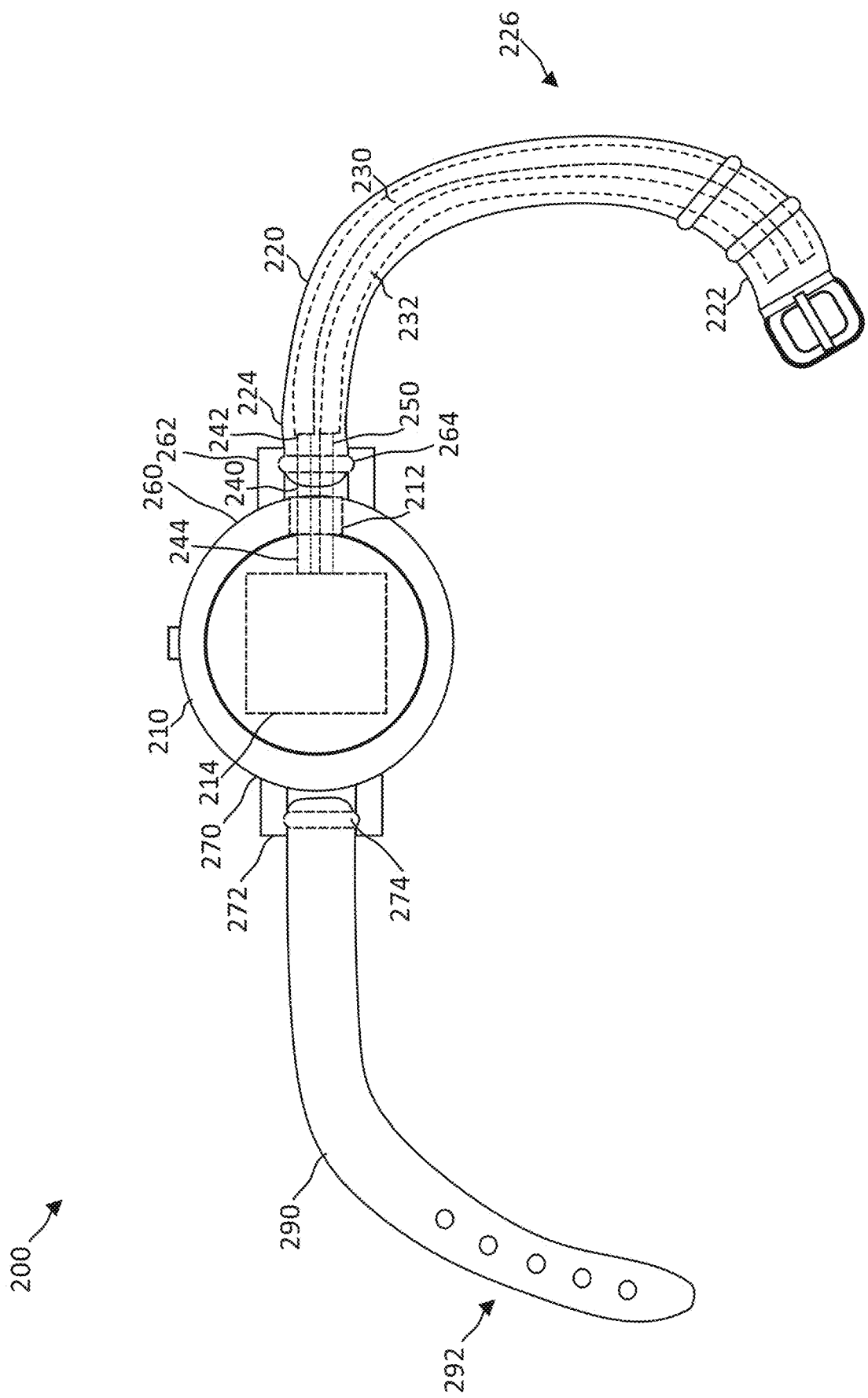
FIG. 25 shows an example of a wearable device including a wristband shaped flexible battery.

FIG. 25 shows an example wearable device 200 that includes a flexible battery as described herein. The wearable device 200 includes a housing 210. The housing 210 may define an internal space that includes an electronic component 214 positioned within the housing 210. For example, the housing 210 may be a watch case that includes a digital watch electronic component such as a printed circuit board and display. An internal wall of the housing 210 defines an opening 212 that extends from the internal space to an exterior of the housing 210. The wearable device 200 includes a first strap 220 having a first end 222 and a second end 224. A length 226 extends from the first end 222 to the second end 224. The strap may be, for example, formed of leather, plastic, or silicone. The wearable device 200 includes a first self-standing electrode 230. As described herein, the first self-standing electrode 230 includes a battery active material in a carbon nanotube network (e.g., a SWNT network). The first self-standing electrode 230 may extend continuously along the length 226 from the first end 222 to the second end 224. The wearable device 200 includes a first tab 240 including a first end 242 and a second end 244. The first end 242 is positioned in the first strap 220 in contact with the first self-standing electrode 230. The second end 244 extends outward of the second end 224 of the first strap 220 through the opening 212 and is positioned in the housing 210 in electrical communication with the electronic component 214. For example, the opening 212 may be a port that receives the first tab 240 and electrically couples the first tab 240 with the electronic component 214 when the first tab 240 is received.

In an embodiment, wearable device 250 may include a second self-standing electrode 232 that extends from the first end 222 to the second end 224. The wearable device 250 may include a second tab 250 positioned in electrical communication with the electronic component 214 and the second self-standing electrode 232.

In an embodiment, the housing 210 includes a first side 260 and a second side 270. The opening 212 is positioned on the first side 260 of the housing 210. The first end 222 of the strap 220 may be secured to the second side 270 of the housing 270. For example, the first end 222 may be permanently attached to the second side 270 and a portion of strap 220 may stretch to allow wearing and removal. As another example, the first end 222 may be secured to the second end 270 via a fastener such as a clip or buckle. The second end 224 of the strap 220 may include a lug 264 extending through the second end 224 perpendicular to the length 226 of the first strap 220. The first tab 240 and the second tab 250 may be routed around the lug 264 and insulated by the first strap 220 or a separate insulation material. The lug 264 may be secured to the first end 260 of the housing 210, for example, via a retaining arms 262.

In another embodiment, the wearable device 200 may include a buckle 280 and a buckle tongue 282. The buckle 280 and the buckle tongue 282 may be secured to the first end 222 of the first strap 220. The buckle 280 may be secured to a second strap 290, for example, via adjustment holes 292. The second strap 290 may be secured to the second end 270 via retaining arms 272 and lug 274.

What is claimed is:

1. A stretchable and flexible lithium ion battery comprising:
a plurality of flexible battery pouch cells comprising a first flexible battery pouch cell and a second flexible battery pouch cell, wherein:
the first flexible battery pouch cell comprises two or more flexible self-standing electrodes contained within a first flexible material packaging, and the second flexible battery pouch cell comprises two or more flexible self-standing electrodes contained within a second flexible material packaging, the first flexible material packaging forms a first pouch containing the first battery pouch cell, and the second flexible material packaging forms a second pouch containing the second battery pouch cell, the first pouch being discrete from the second pouch, and the first packaging material being discontinuous with the second packaging material, each of the two or more flexible self-standing electrodes comprised by the first flexible battery pouch cell and the second flexible battery pouch cell includes a conductive battery tab, and at least one of the conductive battery tabs of the first flexible battery pouch cell is electrically connected to at least one of the conductive battery tabs of the second flexible battery pouch cell.

2. The stretchable and flexible lithium ion battery of claim 1, wherein the conductive battery tabs are stretchable and flexible.

3. The stretchable and flexible lithium ion battery of claim 1, further comprising a respective stretchable and flexible battery tab attachment attached to each of the conductive battery tabs, the stretchable and flexible battery tab attachments extending through the first or second flexible material packaging and external to the first or second flexible material packaging so as to connect the first flexible battery pouch cell to the second flexible battery pouch cell.

4. The stretchable and flexible lithium ion battery of claim 3, wherein the flexible battery tab attachments comprise a spring metal, a metal mesh or gauze, a metal foil, a conductive polymer, a conductive fabric, a conductive thread, carbon nanotubes, a carbon nanotube yarn, or combinations thereof.

5. The stretchable and flexible lithium ion battery of claim 1, wherein the stretchable and flexible lithium ion battery is free of a current collector, free of binder, or free of both a current collector and binder.

6. The stretchable and flexible lithium ion battery of claim 1, further comprising a stretchable polymer matrix connecting the first flexible battery pouch cell to the second flexible battery pouch cell.

7. The stretchable and flexible lithium ion battery of claim 6, wherein the stretchable polymer matrix comprises a flexible polymer, a flexible rubber, one or more springs, a stretchable fabric, an elastic, or combinations thereof.

8. The stretchable and flexible lithium ion battery of claim 1, further comprising one or more springs extending between and connecting the first flexible battery pouch cell to the second flexible battery pouch cell.

9. The stretchable and flexible lithium ion battery of claim 3, further comprising a stretchable polymer matrix between the first flexible battery pouch cell and the second flexible battery pouch cell, the stretchable polymer matrix covering the stretchable and flexible battery tab attachments.

10. The stretchable and flexible lithium ion battery of claim 9, wherein the stretchable polymer matrix comprises a flexible polymer, a stretchable fabric, an elastic, or combinations thereof.

11. The stretchable and flexible lithium ion battery of claim 1, further comprising joints connecting the first and second flexible material packaging with the conductive battery tabs.

12. The stretchable and flexible lithium ion battery of claim 1, wherein the first flexible battery pouch cell is separately connected to at least a third flexible battery pouch cell of the plurality of flexible battery pouch cells.

13. The stretchable and flexible lithium ion battery of claim 1, wherein the first and second flexible material packaging comprises flexible polymer, foil, rubber, fabric, biocompatible material, organic material, or combinations thereof.

14. The stretchable and flexible lithium ion battery of claim 1, wherein the conductive battery tabs comprise a spring metal, a conductive polymer, a conductive fabric, carbon nanotubes, or any combination thereof.

15. The stretchable and flexible lithium ion battery of claim 1, wherein each flexible self-standing electrode comprises:

a plurality of carbon nanotubes arranged in a webbed morphology with interconnected spaces among the carbon nanotubes, the interconnected spaces comprising an electrode active material and an electrolyte.

16. The stretchable and flexible lithium ion battery of claim 15, wherein the electrolyte comprises NASICON, garnet, perovskite, LISICON, LiPON, $Li_3N$, sulfide, argyrodite, and/or anti-perovskite.

17. The stretchable and flexible lithium ion battery of claim 15, wherein the electrolyte is a solid electrolyte having a thickness from about 10 microns to 20 microns.

18. A method of making the stretchable and flexible lithium ion battery of claim 1, the method comprising:

providing the plurality of flexible battery pouch cells; and
electrically connecting the conductive battery tab of the first flexible battery pouch cell of the plurality of flexible battery pouch cells to the conductive battery tab of the second flexible battery pouch cell of the plurality of flexible battery pouch cells.

19. The method of claim 18, further comprising attaching a respective stretchable and flexible battery tab attachment to each of the conductive battery tabs, each stretchable and flexible battery tab attachment extending through the first and second flexible material packagings and external to the first and second flexible material packagings; and electrically connecting the stretchable and flexible battery tab attachment between the first flexible battery pouch cell and the second flexible battery pouch cell.

20. The method of claim 18, further comprising adding a solid or gel electrolyte to the flexible self-standing electrodes.

21. The method of claim 18, further comprising connecting the first and second flexible material packagings with the conductive battery tabs by joints.

22. The method of claim 18, further comprising connecting the first flexible battery pouch cell to the second flexible battery pouch cell with a stretchable and flexible polymer matrix.

23. The stretchable and flexible lithium ion battery of claim 15, wherein the electrolyte is a gel.

24. The stretchable and flexible lithium ion battery of claim 1, wherein the first battery pouch cell contained in the first pouch is sealed off from the second battery pouch cell contained in the second pouch.

* * * * *